United States Patent
Iverson et al.

(10) Patent No.: US 7,127,380 B1
(45) Date of Patent: Oct. 24, 2006

(54) SYSTEM FOR PERFORMING COUPLED FINITE ANALYSIS

(75) Inventors: Michael P. Iverson, Brigham City, UT (US); Daron A. Isaac, Brigham City, UT (US)

(73) Assignee: Alliant Techsystems Inc., Edina, MN (US)

( * ) Notice: Subject to any disclaimer, the term of this patent is extended or adjusted under 35 U.S.C. 154(b) by 811 days.

(21) Appl. No.: 10/005,752

(22) Filed: Nov. 7, 2001

Related U.S. Application Data

(60) Provisional application No. 60/246,399, filed on Nov. 7, 2000.

(51) Int. Cl.
*G06F 17/10* (2006.01)
*G06F 13/00* (2006.01)

(52) U.S. Cl. .................. 703/2; 703/9; 345/420

(58) Field of Classification Search .......... 703/2, 703/7, 9; 716/20; 345/420, 423; 700/204, 700/281; 382/276; 707/3
See application file for complete search history.

(56) References Cited

U.S. PATENT DOCUMENTS

| | | | |
|---|---|---|---|
| 4,742,473 A | 5/1988 | Shugar et al. | |
| 5,136,687 A * | 8/1992 | Edelman et al. | 706/20 |
| 5,287,529 A | 2/1994 | Pentland | |
| 5,315,537 A | 5/1994 | Blacker | |
| 5,553,206 A | 9/1996 | Meshkat | |
| 5,581,468 A * | 12/1996 | White et al. | 700/204 |
| 5,581,489 A | 12/1996 | Groothuis et al. | |
| 5,671,403 A * | 9/1997 | Shekita et al. | 707/3 |
| 5,677,846 A * | 10/1997 | Kumashiro | 716/20 |
| 5,729,670 A | 3/1998 | Strumolo et al. | |
| 5,731,817 A | 3/1998 | Hahs, Jr. et al. | |
| 5,768,156 A | 6/1998 | Tautges et al. | |
| 5,838,594 A * | 11/1998 | Kojima | 716/20 |
| 5,894,308 A * | 4/1999 | Isaacs | 345/420 |
| 5,901,072 A | 5/1999 | Shimmell | |
| 5,907,640 A * | 5/1999 | Delean | 382/276 |
| 5,930,494 A * | 7/1999 | Akiyama | 703/7 |
| 5,940,309 A * | 8/1999 | White et al. | 703/7 |
| 5,956,500 A | 9/1999 | Shimmell | |
| 6,198,979 B1 * | 3/2001 | Konno | 700/98 |
| 6,307,555 B1 * | 10/2001 | Lee | 345/423 |
| 6,377,281 B1 * | 4/2002 | Rosenbluth et al. | 715/700 |
| 6,515,660 B1 * | 2/2003 | Marshall et al. | 345/420 |
| 6,611,736 B1 * | 8/2003 | Waite et al. | 700/281 |
| 2002/0010571 A1 * | 1/2002 | Daniel et al. | 703/21 |
| 2004/0034514 A1 * | 2/2004 | Langemyr et al. | 703/2 |

* cited by examiner

*Primary Examiner*—Thai Phan
(74) *Attorney, Agent, or Firm*—TraskBritt

(57) ABSTRACT

A graphical user interface, together with a comparable scripting interface, couples a plurality of finite element, finite volume, or finite difference analytical programs and permits iterative convergence of multiple programs through one set of predefined commands. The user is permitted to select the joint problem for solution by choosing program selections. Data linkages that couple the program are predefined by an expert system administrator to permit less skilled modelers access to a comprehensive and multifaceted solution that would not be possible for the less skilled modelers to complete absent the graphical user interface.

46 Claims, 48 Drawing Sheets

Node Key:
- ✕ Corner and Mid-side node (Required)
- O Mid-side node (Optional)
- + Face center node (Optional)
- ◇ Element center node (Optional)
| TYPE | LINEAR | PARABOLIC | VARIABLE |
|---|---|---|---|
| Point | ✕ 0 | | |
| Line | ✕—✕ 0   1 | ✕—✕—✕ 2 | |
| Triangle Face 0=0,1, 3  Face 1=1,2, 4  Face 2=2,0, 5 | 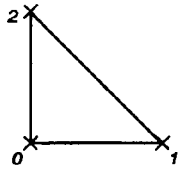 | 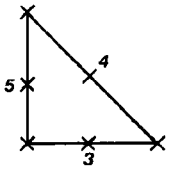 | 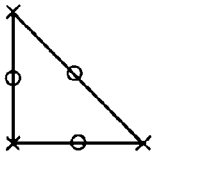 |
| Quadrilateral Face 0=0,1, 4  Face 1=1,2, 5  Face 2=2,3, 6  Face 3=3,0, 7 | 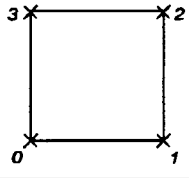 | 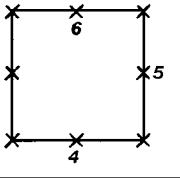 | 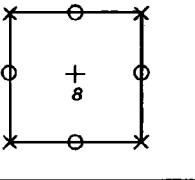 |
| Tetrahedron Face 0=0,2,1 6,5,4  Face 1=0,1,3 4,8,7  Face 2=1,2,3 5,9,8  Face 3=2,0,3 6,7,9 | 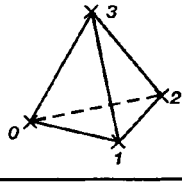 | 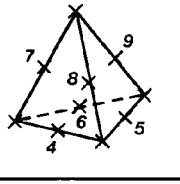 | 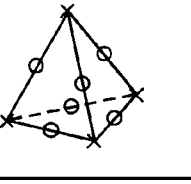 |
| Wedge Face 0=0,2,1 8,7,6  Face 1=3,4,5 9,10,11  Face 2=0,1,4,3 6,13,9,12,15  Face 3=1,2,5,4 7,14,10,13,16  Face 4=2,0,3,5 8,12,11,14,17 | 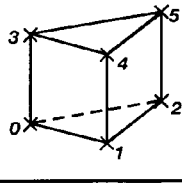 | 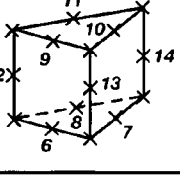 | 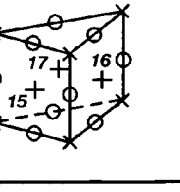 |
| Brick Face 0=0,3,2,1 11,10,9,8,21  Face 1=4,5,6,7 12,13,14,15,22  Face 2=0,1,5,4 8,17,12,16,23  Face 3=1,2,6,5 9,18,13,17,24  Face 4=2,3,7,6 10,19,14,18,25  Face 5=3,0,4,7 11,16,15,19,26 | 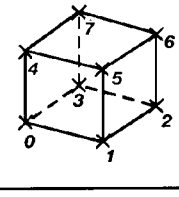 | 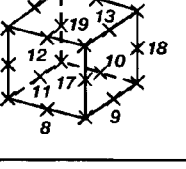 | 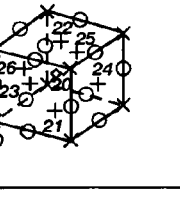 |
*FIG. 6*

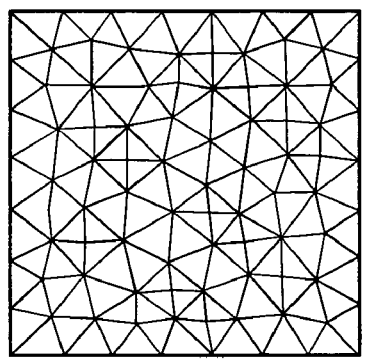 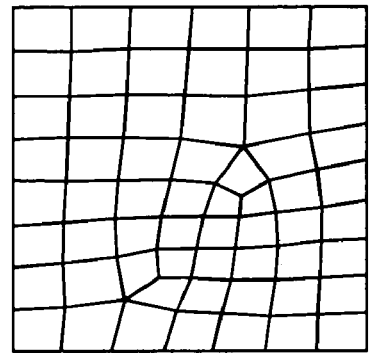
FIG. 9
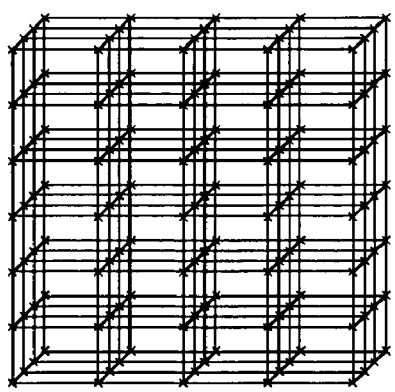 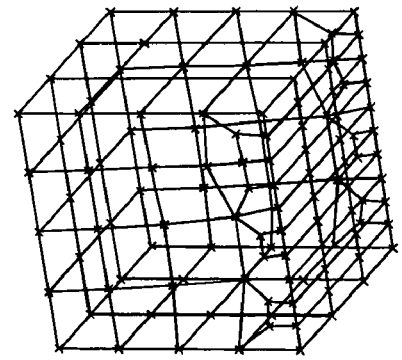
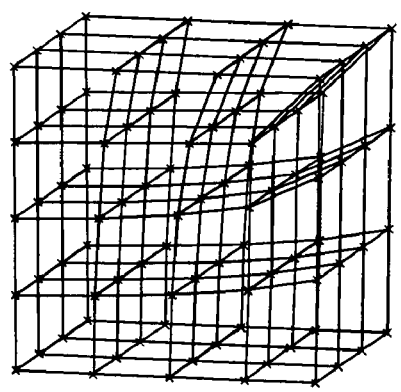 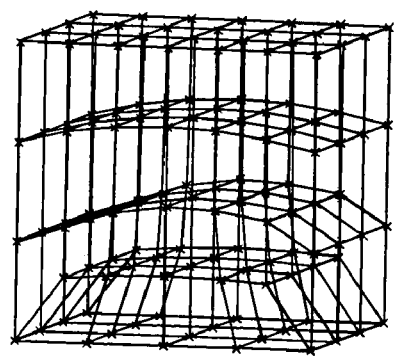
FIG. 10

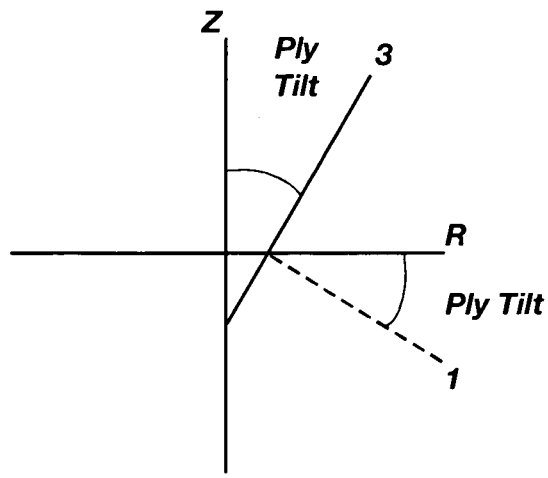

*FIG. 11*

| □ Exploring -D:\ | | | | _ | ⌐ | × |
|---|---|---|---|---|---|---|
| File  Edit  View  Go  Favorites  Tools  Help | | | | | | |
| Name | Size | Type | Modified | | | ▲ |
| ⌐Ccm | | File Folder | 9/21/01 9:21 AM | | | |
| ⌐Cdca | | File Folder | 9/21/01 9:21 AM | | | |
| ⌐FEM Builder 1.2 | | File Folder | 9/21/01 9:21 AM | | | |
| ⌐Recess | | File Folder | 9/21/01 9:21 AM | | | |
| _inst32i.ex_ | 294KB | EX_File | 11/19/97 4:05 PM | | | |
| _isdel.exe | 8KB | Application | 11/19/97 4:05 PM | | | |
| _setup.dll | 11KB | Application Extension | 11/19/97 4:08 PM | | | |
| _sys1.cab | 187KB | Cabinet | 9/21/01 8:29 AM | | | |
| _user1.cab | 50KB | Cabinet | 9/21/01 8:29 AM | | | |
| Data.tag | 1KB | TAG File | 9/21/01 8:29 AM | | | |
| data1.cab | 129KB | Cabinet | 9/21/01 8:29 AM | | | |
| lang.dat | 5KB | Movie Clip | 5/30/97 11:31 AM | | | |
| layout.bin | 1KB | BIN File | 9/21/01 8:29 AM | | | |
| Mscreate.dir | 0KB | Macromedia Director.. | 9/26/00 12:45 PM | | | |
| os.dat | 1KB | Movie Clip | 5/6/97 2:15 PM | | | |
| py152.exe | 4,911KB | Application | 7/16/99 10:54 AM | | | |
| setup.bmp | 81KB | Bitmap Image | 9/17/01 11:32 AM | | | |
| Setup.exe | 59KB | Application | 11/19/97 4:09 PM | | | |
| Setup.ini | 1KB | Configuration Settings | 9/21/01 8:29 AM | | | |
| Setup.lns | 58KB | Internet Communicati... | 9/21/01 8:28 AM | | | |
| setup.lid | 1KB | LID File | 9/21/01 8:29 AM | | | |
| win32all-125.exe | 2,953KB | Application | 2/22/00 10:51 AM | | | |
| | | | | | | ▼ |
| 22 object(s) | 8.54MB (Disk free space: 0 bytes) | | □ My Computer | | | |

*FIG. 12*

| Exploring -D:\FEM Builder 1.2\Doc\Test | | | | |
|---|---|---|---|---|
| File Edit View Go Favorites Tools Help | | | | |
| Name | Size | Type | Modified | |
| FEMBuilderTest.doc | 168KB | Microsoft Word Doc... | 9/18/01 7:09 AM | |
| FEMBuilderTestCoincidentNode_1.doc | 43KB | Microsoft Word Doc... | 9/20/01 10:38 AM | |
| FEMBuilderTestConstrain2d_1.doc | 79KB | Microsoft Word Doc... | 9/20/01 10:38 AM | |
| FEMBuilderTestConstrain2d_2.doc | 76KB | Microsoft Word Doc... | 9/20/01 10:38 AM | |
| FEMBuilderTestConstrain2d_3.doc | 77KB | Microsoft Word Doc... | 9/20/01 10:38 AM | |
| FEMBuilderTestConstrain3d_1.doc | 117KB | Microsoft Word Doc... | 9/20/01 10:38 AM | |
| FEMBuilderTestConstrain3d_2.doc | 91KB | Microsoft Word Doc... | 9/20/01 10:38 AM | |
| FEMBuilderTestConstrain3d_3.doc | 102KB | Microsoft Word Doc... | 9/20/01 10:38 AM | |
| FEMBuilderTestCopyPrint_1.doc | 96KB | Microsoft Word Doc... | 9/20/01 10:38 AM | |
| FEMBuilderTestCopyPrint_2.doc | 28KB | Microsoft Word Doc... | 9/20/01 10:38 AM | |
| FEMBuilderTestCreateBC_1.doc | 111KB | Microsoft Word Doc... | 9/20/01 10:38 AM | |
| FEMBuilderTestCreateBC_10.doc | 49KB | Microsoft Word Doc... | 9/18/01 7:09 AM | |
| FEMBuilderTestCreateBC_11.doc | 49KB | Microsoft Word Doc... | 9/18/01 7:09 AM | |
| FEMBuilderTestCreateBC_12.doc | 98KB | Microsoft Word Doc... | 9/20/01 10:38 AM | |
| FEMBuilderTestCreateBC_13.doc | 56KB | Microsoft Word Doc... | 9/18/01 7:09 AM | |
| FEMBuilderTestCreateBC_2.doc | 41KB | Microsoft Word Doc... | 9/18/01 7:09 AM | |
| FEMBuilderTestCreateBC_3.doc | 39KB | Microsoft Word Doc... | 9/20/01 10:38 AM | |
| FEMBuilderTestCreateBC_4.doc | 38KB | Microsoft Word Doc... | 9/18/01 7:09 AM | |
| FEMBuilderTestCreateBC_5.doc | 47KB | Microsoft Word Doc... | 9/18/01 7:09 AM | |
| FEMBuilderTestCreateBC_6.doc | 39KB | Microsoft Word Doc... | 9/20/01 10:38 AM | |
| FEMBuilderTestCreateBC_7.doc | 41KB | Microsoft Word Doc... | 9/18/01 7:09 AM | |
| FEMBuilderTestCreateBC_8.doc | 40KB | Microsoft Word Doc... | 9/18/01 7:09 AM | |
| FEMBuilderTestCreateBC_9.doc | 48KB | Microsoft Word Doc... | 9/18/01 7:09 AM | |
| 210 object(s) | 13.6MB (Disk free space: 0 bytes) | My Computer | | |

FIG. 17

| Exploring -D:\FEM Builder 1.2\Doc\Test | | | | |
|---|---|---|---|---|
| File Edit View Go Favorites Tools Help | | | | |
| Name | Size | Type | Modified | |
| FEMBuilderTestCreateChemReaction_1.doc | 32KB | Microsoft Word Doc... | 9/18/01 7:09 AM | |
| FEMBuilderTestCreateGeometry_1.doc | 130KB | Microsoft Word Doc... | 9/18/01 7:09 AM | |
| FEMBuilderTestCreateGeometry_2.doc | 108KB | Microsoft Word Doc... | 9/18/01 7:10 AM | |
| FEMBuilderTestCreateGeometry_3.doc | 109KB | Microsoft Word Doc... | 9/18/01 7:10 AM | |
| FEMBuilderTestCreateGeometry_4.doc | 109KB | Microsoft Word Doc... | 9/18/01 7:10 AM | |
| FEMBuilderTestCreateGeometry_5.doc | 148KB | Microsoft Word Doc... | 9/18/01 7:10 AM | |
| FEMBuilderTestCreateGeometry_6.doc | 59KB | Microsoft Word Doc... | 9/18/01 7:10 AM | |
| FEMBuilderTestCreateIC_1.doc | 106KB | Microsoft Word Doc... | 9/18/01 7:10 AM | |
| FEMBuilderTestCreateSystem_1.doc | 44KB | Microsoft Word Doc... | 9/18/01 7:10 AM | |
| FEMBuilderTestDeform_1.doc | 39KB | Microsoft Word Doc... | 9/18/01 7:10 AM | |
| FEMBuilderTestDeform_2.doc | 40KB | Microsoft Word Doc... | 9/18/01 7:10 AM | |
| FEMBuilderTestDeform_3.doc | 37KB | Microsoft Word Doc... | 9/18/01 7:10 AM | |
| FEMBuilderTestDeleteBCs_1.doc | 412KB | Microsoft Word Doc... | 9/18/01 7:09 AM | |
| FEMBuilderTestDeDeleteMaterial_1.doc | 36KB | Microsoft Word Doc... | 9/18/01 12:26 PM | |
| FEMBuilderTestDeleteSystem_1.doc | 73KB | Microsoft Word Doc... | 9/18/01 7:10 AM | |
| FEMBuilderTestDistortionCheck2d_1.doc | 56KB | Microsoft Word Doc... | 9/18/01 7:10 AM | |
| FEMBuilderTestDistortionCheck3d_1.doc | 66KB | Microsoft Word Doc... | 9/18/01 7:10 AM | |
| FEMBuilderTestEditBCColor_1.doc | 28KB | Microsoft Word Doc... | 9/18/01 7:10 AM | |
| FEMBuilderTestEditCurve_1.doc | 87KB | Microsoft Word Doc... | 9/18/01 12:26 PM | |
| FEMBuilderTestEditCurve_2.doc | 126KB | Microsoft Word Doc... | 9/18/01 7:10 AM | |
| FEMBuilderTestEditCurve_1.doc | 69KB | Microsoft Word Doc... | 9/18/01 7:10 AM | |
| FEMBuilderTestEditElementOrientation_1.doc | 76KB | Microsoft Word Doc... | 9/18/01 7:10 AM | |
| FEMBuilderTestEditElementOrientation_2.doc | 118KB | Microsoft Word Doc... | 9/18/01 7:10 AM | |
| 210 object(s) | 13.6MB (Disk free space: 0 bytes) | My Computer | | |

FIG. 18

| Exploring -D:\FEM Builder 1.2\Doc\Test | | | |
|---|---|---|---|
| File Edit View Go Favorites Tools Help | | | |
| Name | Size | Type | Modified |
| FEMBuilderTestInsertFlaw2D_2.doc | 69KB | Microsoft Word Doc... | 9/18/01 7:10 AM |
| FEMBuilderTestInterfaceAbaqus_1.doc | 30KB | Microsoft Word Doc... | 9/18/01 7:10 AM |
| FEMBuilderTestInterfaceAbaqus_2.doc | 28KB | Microsoft Word Doc... | 9/18/01 7:10 AM |
| FEMBuilderTestInterfaceAnsys_1.doc | 73KB | Microsoft Word Doc... | 9/18/01 7:10 AM |
| FEMBuilderTestInterfaceAnsys_2.doc | 44KB | Microsoft Word Doc... | 9/18/01 7:10 AM |
| FEMBuilderTestInterfaceAschar_1.doc | 100KB | Microsoft Word Doc... | 9/18/01 7:10 AM |
| FEMBuilderTestInterfaceAschar_2.doc | 51KB | Microsoft Word Doc... | 9/18/01 7:10 AM |
| FEMBuilderTestInterfaceFemDB_1.doc | 28KB | Microsoft Word Doc... | 9/18/01 7:10 AM |
| FEMBuilderTestInterfaceFemDB_2.doc | 27KB | Microsoft Word Doc... | 9/18/01 7:10 AM |
| FEMBuilderTestInterfaceFluent_1.doc | 31KB | Microsoft Word Doc... | 9/18/01 7:10 AM |
| FEMBuilderTestInterfaceFluent_2.doc | 98KB | Microsoft Word Doc... | 9/18/01 7:10 AM |
| FEMBuilderTestInterfaceGridGen_1.doc | 28KB | Microsoft Word Doc... | 9/18/01 7:10 AM |
| FEMBuilderTestInterfaceGridGen_2.doc | 36KB | Microsoft Word Doc... | 9/18/01 7:10 AM |
| FEMBuilderTestInterfaceIdeas_1.doc | 44KB | Microsoft Word Doc... | 9/18/01 7:11 AM |
| FEMBuilderTestInterfaceIdeas_2.doc | 29KB | Microsoft Word Doc... | 9/18/01 7:11 AM |
| FEMBuilderTestInterfaceMaterialProperty_1.doc | 29KB | Microsoft Word Doc... | 9/18/01 7:11 AM |
| FEMBuilderTestInterfacePatran_1.doc | 46KB | Microsoft Word Doc... | 9/18/01 7:11 AM |
| FEMBuilderTestInterfaceRdCCm_1.doc | 30KB | Microsoft Word Doc... | 9/18/01 12:26 PM |
| FEMBuilderTestInterfaceRdCCm_2.doc | 31KB | Microsoft Word Doc... | 9/18/01 12:26 PM |
| FEMBuilderTestInterfaceRdCDCA_1.doc | 30KB | Microsoft Word Doc... | 9/20/01 12:26 PM |
| FEMBuilderTestInterfaceRdCDCA_2.doc | 31KB | Microsoft Word Doc... | 9/18/01 12:26 PM |
| FEMBuilderTestInterfaceRdRecess_1-10.doc | 36KB | Microsoft Word Doc... | 9/18/01 7:11 AM |
| FEMBuilderTestInterfaceRdSharp_1.doc | 42KB | Microsoft Word Doc... | 9/18/01 12:26 PM |
| 210 object(s) | 13.6MB (Disk free space: 0 bytes) | My Computer | |

FIG. 19

| Exploring -D:\FEM Builder 1.2\Doc\Test | | | |
|---|---|---|---|
| File Edit View Go Favorites Tools Help | | | |
| Name | Size | Type | Modified |
| FEMBuilderTestEditMeshAttribute_1.doc | 37KB | Microsoft Word Doc... | 9/18/01 7:10 AM |
| FEMBuilderTestEditNode_1.doc | 68KB | Microsoft Word Doc... | 9/18/01 7:10 AM |
| FEMBuilderTestEditWorkplane_1.doc | 32KB | Microsoft Word Doc... | 9/18/01 7:10 AM |
| FEMBuilderTestEditWorkplane_2.doc | 42KB | Microsoft Word Doc... | 9/18/01 7:10 AM |
| FEMBuilderTestExecuteAbaqus_1.doc | 36KB | Microsoft Word Doc... | 9/18/01 7:10 AM |
| FEMBuilderTestExecuteCCM_1.doc | 32KB | Microsoft Word Doc... | 9/18/01 7:10 AM |
| FEMBuilderTestExecuteCDCA_1.doc | 33KB | Microsoft Word Doc... | 9/18/01 7:10 AM |
| FEMBuilderTestExecuteFluent_1.doc | 37KB | Microsoft Word Doc... | 9/18/01 7:10 AM |
| FEMBuilderTestExecuteRecess_1.doc | 33KB | Microsoft Word Doc... | 9/18/01 7:10 AM |
| FEMBuilderTestFemCreate_1.doc | 80KB | Microsoft Word Doc... | 9/18/01 7:10 AM |
| FEMBuilderTestFemCreateGroup.doc | 49KB | Microsoft Word Doc... | 9/18/01 7:10 AM |
| FEMBuilderTestFemDelete_1.doc | 93KB | Microsoft Word Doc... | 9/18/01 7:10 AM |
| FEMBuilderTestFemDelete_2.doc | 36KB | Microsoft Word Doc... | 9/18/01 7:10 AM |
| FEMBuilderTestFemEditColor_1.doc | 91KB | Microsoft Word Doc... | 9/18/01 7:10 AM |
| FEMBuilderTestFracture_1.doc | 105KB | Microsoft Word Doc... | 9/18/01 7:10 AM |
| FEMBuilderTestFracture_2.doc | 65KB | Microsoft Word Doc... | 9/18/01 7:10 AM |
| FEMBuilderTestFracture_3.doc | 71KB | Microsoft Word Doc... | 9/18/01 7:10 AM |
| FEMBuilderTestFracture_4.doc | 112KB | Microsoft Word Doc... | 9/18/01 7:10 AM |
| FEMBuilderTestGeometryCreateGroup.doc | 55KB | Microsoft Word Doc... | 9/18/01 7:10 AM |
| FEMBuilderTestGeometryDelete_1.doc | 154KB | Microsoft Word Doc... | 9/18/01 7:10 AM |
| FEMBuilderTestGeometryEditColor_1.doc | 175KB | Microsoft Word Doc... | 9/18/01 7:10 AM |
| FEMBuilderTestHelp_1.doc | 23KB | Microsoft Word Doc... | 9/18/01 7:10 AM |
| FEMBuilderTestInsertFlaw2D_1.doc | 77KB | Microsoft Word Doc... | 9/18/01 7:10 AM |
| 210 object(s) | 13.6MB (Disk free space: 0 bytes) | My Computer | |

FIG. 20

| Name | Size | Type | Modified |
|---|---|---|---|
| FEMBuilderTestInterfaceRdSharp_2.doc | 42KB | Microsoft Word Doc... | 9/18/01 12:26 PM |
| FEMBuilderTestInterfaceRdSharp_3.doc | 42KB | Microsoft Word Doc... | 9/18/01 12:26 PM |
| FEMBuilderTestInterfaceRdSharp_4.doc | 99KB | Microsoft Word Doc... | 9/18/01 12:26 PM |
| FEMBuilderTestInterfaceRdSinda_1.doc | 28KB | Microsoft Word Doc... | 9/18/01 7:11 AM |
| FEMBuilderTestInterfaceRdSinda_2.doc | 28KB | Microsoft Word Doc... | 9/18/01 7:11 AM |
| FEMBuilderTestInterfaceRdTexChem_1.doc | 27KB | Microsoft Word Doc... | 9/18/01 7:11 AM |
| FEMBuilderTestInterfaceRwRecess_1.doc | 31KB | Microsoft Word Doc... | 9/18/01 12:26 PM |
| FEMBuilderTestInterfaceRwRecess_2.doc | 33KB | Microsoft Word Doc... | 9/18/01 12:26 PM |
| FEMBuilderTestInterfaceRwRecess_3.doc | 34KB | Microsoft Word Doc... | 9/18/01 12:26 PM |
| FEMBuilderTestInterfaceRwRecess_4.doc | 34KB | Microsoft Word Doc... | 9/18/01 12:26 PM |
| FEMBuilderTestInterfaceWrCCM_1.doc | 30KB | Microsoft Word Doc... | 9/18/01 7:11 AM |
| FEMBuilderTestInterfaceWrCCM_2.doc | 31KB | Microsoft Word Doc... | 9/18/01 7:11 AM |
| FEMBuilderTestInterfaceWrCDCA_1.doc | 30KB | Microsoft Word Doc... | 9/18/01 7:11 AM |
| FEMBuilderTestInterfaceWrCDCA_2.doc | 30KB | Microsoft Word Doc... | 9/18/01 7:11 AM |
| FEMBuilderTestInterfaceWrRecess_1.doc | 32KB | Microsoft Word Doc... | 9/18/01 7:11 AM |
| FEMBuilderTestInterfaceWrRecess_2.doc | 41KB | Microsoft Word Doc... | 9/18/01 7:11 AM |
| FEMBuilderTestInterfaceWrRecess_3.doc | 41KB | Microsoft Word Doc... | 9/18/01 7:11 AM |
| FEMBuilderTestInterfaceWrRecess_4.doc | 45KB | Microsoft Word Doc... | 9/18/01 7:11 AM |
| FEMBuilderTestInterfaceWrRecess_5.doc | 46KB | Microsoft Word Doc... | 9/18/01 7:11 AM |
| FEMBuilderTestInterfaceWrSinda_1.doc | 28KB | Microsoft Word Doc... | 9/18/01 7:11 AM |
| FEMBuilderTestInterfaceWrSinda_2.doc | 28KB | Microsoft Word Doc... | 9/18/01 7:11 AM |
| FEMBuilderTestInterfaceWrTexChem_1.doc | 28KB | Microsoft Word Doc... | 9/18/01 7:11 AM |
| FEMBuilderTestInterpolateResults_1.doc | 50KB | Microsoft Word Doc... | 9/18/01 7:11 AM |

210 object(s) — 13.6MB (Disk free space: 0 bytes) — My Computer

FIG. 21

| Name | Size | Type | Modified |
|---|---|---|---|
| FEMBuilderTestList_1.doc | 34KB | Microsoft Word Doc... | 9/18/01 7:11 AM |
| FEMBuilderTestList_2.doc | 44KB | Microsoft Word Doc... | 9/18/01 7:11 AM |
| FEMBuilderTestList_3.doc | 37KB | Microsoft Word Doc... | 9/18/01 7:11 AM |
| FEMBuilderTestListBC_1.doc | 111KB | Microsoft Word Doc... | 9/18/01 7:11 AM |
| FEMBuilderTestListBC_2.doc | 52KB | Microsoft Word Doc... | 9/18/01 7:11 AM |
| FEMBuilderTestMaterialProperty_1.doc | 38KB | Microsoft Word Doc... | 9/18/01 7:11 AM |
| FEMBuilderTestMaterialProperty_2.doc | 26KB | Microsoft Word Doc... | 9/18/01 7:11 AM |
| FEMBuilderTestMaterialProperty_3.doc | 23KB | Microsoft Word Doc... | 9/18/01 7:11 AM |
| FEMBuilderTestMesh2d_1-12.doc | 280KB | Microsoft Word Doc... | 9/18/01 7:11 AM |
| FEMBuilderTestMesh2d_13.doc | 133KB | Microsoft Word Doc... | 9/18/01 7:11 AM |
| FEMBuilderTestMesh3d_13.doc | 107KB | Microsoft Word Doc... | 9/18/01 7:11 AM |
| FEMBuilderTestMesh3d_14.doc | 106KB | Microsoft Word Doc... | 9/18/01 7:11 AM |
| FEMBuilderTestMesh3d_1-8.doc | 310KB | Microsoft Word Doc... | 9/18/01 7:11 AM |
| FEMBuilderTestModel_1.doc | 256KB | Microsoft Word Doc... | 9/18/01 7:11 AM |
| FEMBuilderTestModelSweep_1.doc | 69KB | Microsoft Word Doc... | 9/18/01 7:11 AM |
| FEMBuilderTestModelSweep_2.doc | 62KB | Microsoft Word Doc... | 9/18/01 7:11 AM |
| FEMBuilderTestModelSweep_3.doc | 49KB | Microsoft Word Doc... | 9/18/01 7:11 AM |
| FEMBuilderTestModelSweep_4.doc | 62KB | Microsoft Word Doc... | 9/18/01 7:11 AM |
| FEMBuilderTestMoveCopy_1.doc | 55KB | Microsoft Word Doc... | 9/18/01 12:26 PM |
| FEMBuilderTestMoveCopy_10.doc | 63KB | Microsoft Word Doc... | 9/18/01 7:11 AM |
| FEMBuilderTestMoveCopy_11.doc | 52KB | Microsoft Word Doc... | 9/18/01 12:26 PM |
| FEMBuilderTestMoveCopy_2.doc | 57KB | Microsoft Word Doc... | 9/18/01 12:26 PM |
| FEMBuilderTestMoveCopy_3.doc | 56KB | Microsoft Word Doc... | 9/18/01 12:26 PM |

210 object(s) — 13.6MB (Disk free space: 0 bytes) — My Computer

FIG. 22

| Exploring -D:\FEM Builder 1.2\Doc\Test | | | |
|---|---|---|---|
| File Edit View Go Favorites Tools Help | | | |
| Name | Size | Type | Modified |
| FEMBuilderTestStandardEdgeNotched2D.doc | 164KB | Microsoft Word Doc... | 9/18/01 7:12 AM |
| FEMBuilderTestStandardEdgeNotched3D.doc | 217KB | Microsoft Word Doc... | 9/18/01 7:12 AM |
| FEMBuilderTestStandardFluidCFD1.doc | 36KB | Microsoft Word Doc... | 9/18/01 7:12 AM |
| FEMBuilderTestStandardHeat0.doc | 44KB | Microsoft Word Doc... | 9/18/01 7:12 AM |
| FEMBuilderTestStandardHeat1.doc | 47KB | Microsoft Word Doc... | 9/18/01 7:12 AM |
| FEMBuilderTestStandardHTAxisym1.doc | 50KB | Microsoft Word Doc... | 9/18/01 7:12 AM |
| FEMBuilderTestStandardNozzle1.doc | 38KB | Microsoft Word Doc... | 9/18/01 7:12 AM |
| FEMBuilderTestStandardPlaneE1.doc | 25KB | Microsoft Word Doc... | 9/18/01 7:12 AM |
| FEMBuilderTestStandardPlaneE2.doc | 30KB | Microsoft Word Doc... | 9/18/01 7:12 AM |
| FEMBuilderTestStandardPlaneS1.doc | 25KB | Microsoft Word Doc... | 9/18/01 7:12 AM |
| FEMBuilderTestStandardPlaneS2.doc | 30KB | Microsoft Word Doc... | 9/18/01 7:12 AM |
| FEMBuilderTestStandardSolid1L.doc | 26KB | Microsoft Word Doc... | 9/18/01 7:12 AM |
| FEMBuilderTestStandardSolid1Q.doc | 27KB | Microsoft Word Doc... | 9/18/01 7:12 AM |
| FEMBuilderTestStandardSolidCFD1.doc | 36KB | Microsoft Word Doc... | 9/18/01 7:12 AM |
| FEMBuilderTestSubModel_1.doc | 53KB | Microsoft Word Doc... | 9/18/01 12:26 PM |
| FEMBuilderTestSubModel_2.doc | 51KB | Microsoft Word Doc... | 9/18/01 7:12 AM |
| FEMBuilderTestSubModel_3.doc | 54KB | Microsoft Word Doc... | 9/18/01 7:12 AM |
| FEMBuilderTestThermalAblation_1.doc | 68KB | Microsoft Word Doc... | 9/18/01 12:26 PM |
| FEMBuilderTestThermalAblation_2.doc | 100KB | Microsoft Word Doc... | 9/18/01 7:12 AM |
| FEMBuilderTestToolsOptions_1.doc | 28KB | Microsoft Word Doc... | 9/18/01 7:12 AM |
| FEMBuilderTestViewBlankUnblank_1.doc | 65KB | Microsoft Word Doc... | 9/18/01 7:12 AM |
| FEMBuilderTestViewDisplaySettings_1.doc | 252KB | Microsoft Word Doc... | 9/18/01 7:12 AM |
| FEMBuilderTestViewOrientation_1.doc | 41KB | Microsoft Word Doc... | 9/18/01 7:12 AM |
| 210 object(s) | 13.6MB (Disk free space: 0 bytes) | My Computer | |

FIG. 25

| Exploring -D:\FEM Builder 1.2\Doc\Test | | | |
|---|---|---|---|
| File Edit View Go Favorites Tools Help | | | |
| Name | Size | Type | Modified |
| FEMBuilderTestStandardHeat1.doc | 47KB | Microsoft Word Doc... | 9/18/01 7:12 AM |
| FEMBuilderTestStandardHTAxisym1.doc | 50KB | Microsoft Word Doc... | 9/18/01 7:12 AM |
| FEMBuilderTesStandardNozzle1.doc | 38KB | Microsoft Word Doc... | 9/18/01 7:12 AM |
| FEMBuilderTestStandardPlaneE1.doc | 25KB | Microsoft Word Doc... | 9/18/01 7:12 AM |
| FEMBuilderTestStandardPlaneE2.doc | 30KB | Microsoft Word Doc... | 9/18/01 7:12 AM |
| FEMBuilderTestStandardPlaneS1.doc | 25KB | Microsoft Word Doc... | 9/18/01 7:12 AM |
| FEMBuilderTestStandardPlaneS2.doc | 30KB | Microsoft Word Doc... | 9/18/01 7:12 AM |
| FEMBuilderTestStandardSolid1L.doc | 26KB | Microsoft Word Doc... | 9/18/01 7:12 AM |
| FEMBuilderTestStandardSolid1Q.doc | 27KB | Microsoft Word Doc... | 9/18/01 7:12 AM |
| FEMBuilderTestStandardSolidCFD1.doc | 36KB | Microsoft Word Doc... | 9/18/01 7:12 AM |
| FEMBuilderTestSubModel_1.doc | 53KB | Microsoft Word Doc... | 9/18/01 12:26 PM |
| FEMBuilderTestSubModel_2.doc | 51KB | Microsoft Word Doc... | 9/18/01 7:12 AM |
| FEMBuilderTestSubModel_3.doc | 54KB | Microsoft Word Doc... | 9/18/01 7:12 AM |
| FEMBuilderTestThermalAblation_1.doc | 68KB | Microsoft Word Doc... | 9/18/01 12:26 PM |
| FEMBuilderTestThermalAblation_2.doc | 100KB | Microsoft Word Doc... | 9/18/01 7:12 AM |
| FEMBuilderTestToolsOptions_1.doc | 28KB | Microsoft Word Doc... | 9/18/01 7:12 AM |
| FEMBuilderTestViewBlankUnblank_1.doc | 65KB | Microsoft Word Doc... | 9/18/01 7:12 AM |
| FEMBuilderTestViewDisplaySettings_1.doc | 252KB | Microsoft Word Doc... | 9/18/01 7:12 AM |
| FEMBuilderTestViewOrientation_1.doc | 41KB | Microsoft Word Doc... | 9/18/01 7:12 AM |
| FEMBuilderTestViewOrientation_2.doc | 228KB | Microsoft Word Doc... | 9/18/01 7:12 AM |
| FEMBuilderTestViewOrientation_3.doc | 69KB | Microsoft Word Doc... | 9/18/01 7:12 AM |
| FEMBuilderTestViewScreenOptions_1.doc | 59KB | Microsoft Word Doc... | 9/18/01 7:12 AM |
| 210 object(s) | 13.6MB (Disk free space: 0 bytes) | My Computer | |

FIG. 26

| Exploring -D:\FEM Builder 1.2\Source\FACLib | | | |
|---|---|---|---|
| File  Edit  View  Go  Favorites  Tools  Help | | | |
| Name | Size | Type | Modified |
| ArbArray.hpp | 10KB | HPP File | 9/17/01 11:30 AM |
| ArbBdrySeg.hpp | 6KB | HPP File | 9/17/01 11:30 AM |
| ArbBSpline2D.cpp | 24KB | CPP File | 9/17/01 11:30 AM |
| ArbBSpline2D.hpp | 8KB | HPP File | 9/17/01 11:30 AM |
| ArbCoord2D.hpp | 12KB | HPP File | 9/17/01 11:30 AM |
| ArbFeasableRegion.cpp | 10KB | CPP File | 9/17/01 11:30 AM |
| ArbFeasableRegion.hpp | 5KB | HPP File | 9/17/01 11:30 AM |
| ArbGeom2DMixIn.cpp | 10KB | CPP File | 9/17/01 11:30 AM |
| ArbGeom2DMixIn.hpp | 2KB | HPP File | 9/17/01 11:30 AM |
| ArbHashTable.hpp | 35KB | HPP File | 9/17/01 11:30 AM |
| ArbHeap.hpp | 16KB | HPP File | 9/17/01 11:30 AM |
| ArbKDTree2D.cpp | 16KB | CPP File | 9/17/01 11:30 AM |
| ArbKDTree2D.hpp | 9KB | HPP File | 9/17/01 11:30 AM |
| ArbMsh.hpp | 5KB | HPP File | 9/17/01 11:30 AM |
| ArbMshCleanup.cpp | 31KB | CPP File | 9/17/01 11:30 AM |
| ArbMshCrackRegion2D.cpp | 68KB | CPP File | 9/17/01 11:30 AM |
| ArbMshCrackRegion2D.hpp | 50KB | HPP File | 9/17/01 11:30 AM |
| ArbMshEdgeList.cpp | 86KB | CPP File | 9/17/01 11:30 AM |
| ArbMshEdgeList.hpp | 28KB | HPP File | 9/17/01 11:30 AM |
| ArbMshQuad2D.cpp | 179KB | CPP File | 9/17/01 11:30 AM |
| ArbMshRegion2D.cpp | 102KB | CPP File | 9/17/01 11:30 AM |
| ArbMshRegion2D.hpp | 62KB | HPP File | 9/17/01 11:30 AM |
| ArbMshSmooth2D.cpp | 51KB | CPP File | 9/17/01 11:30 AM |
| 37 object(s) | 133MB (Disk free space: 0 bytes) | My Computer | |

FIG. 31

| Exploring -D:\FEM Builder 1.2\Source\FACLib | | | |
|---|---|---|---|
| File  Edit  View  Go  Favorites  Tools  Help | | | |
| Name | Size | Type | Modified |
| ArbMshCrackRegion2D.cpp | 68KB | CPP File | 9/17/01 11:30 AM |
| ArbMshCrackRegion2D.hpp | 50KB | HPP File | 9/17/01 11:30 AM |
| ArbMshEdgeList.cpp | 86KB | CPP File | 9/17/01 11:30 AM |
| ArbMshEdgeList.hpp | 28KB | HPP File | 9/17/01 11:30 AM |
| ArbMshQuad2D.cpp | 179KB | CPP File | 9/17/01 11:30 AM |
| ArbMshRegion2D.cpp | 102KB | CPP File | 9/17/01 11:30 AM |
| ArbMshRegion2D.hpp | 62KB | HPP File | 9/17/01 11:30 AM |
| ArbMshSmooth2D.cpp | 51KB | CPP File | 9/17/01 11:30 AM |
| ArbMshSmooth2D.hpp | 18KB | HPP File | 9/17/01 11:30 AM |
| ArbMshTopo2D.cpp | 92KB | CPP File | 9/17/01 11:30 AM |
| ArbMshTopo2D.hpp | 54KB | HPP File | 9/17/01 11:30 AM |
| ArbQuadTree.cpp | 26KB | CPP File | 9/17/01 11:30 AM |
| ArbQuadTree.hpp | 14KB | HPP File | 9/17/01 11:30 AM |
| ArbQueue.hpp | 6KB | HPP File | 9/17/01 11:30 AM |
| ArbRectangle.hpp | 3KB | HPP File | 9/17/01 11:30 AM |
| ArbRmshRegion2D.cpp | 286KB | CPP File | 9/17/01 11:30 AM |
| ArbRmshRegion2D.hpp | 15KB | HPP File | 9/17/01 11:30 AM |
| ArbSet.cpp | 26KB | CPP File | 9/17/01 11:30 AM |
| ArbSet.hpp | 8KB | HPP File | 9/17/01 11:30 AM |
| ArbSmallSet.hpp | 4KB | HPP File | 9/17/01 11:30 AM |
| FACLib.dsp | 6KB | DSP File | 9/17/01 11:30 AM |
| FACLib.dsw | 1KB | DSW File | 9/17/01 11:30 AM |
| 37 object(s) | 1.33MB (Disk free space: 0 bytes) | My Computer | |

FIG. 32

| Exploring -D:\FEM Builder 1.2\Source\FemBuilder | | | | |
|---|---|---|---|---|
| File Edit View Go Favorites Tools Help | | | | |
| Name | Size | Type | Modified | |
| res_1 | | File Folder | 9/21/01 9:21 AM | |
| CCoordinateInput.cpp | 9KB | CPP File | 9/17/01 11:31 AM | |
| CCoordinateInput.h | 2KB | H File | 9/17/01 11:31 AM | |
| CFemDBUtil.cpp | 8KB | CPP File | 9/17/01 11:31 AM | |
| CFemDBUtil.h | 1KB | H File | 9/17/01 11:31 AM | |
| CGridControl.cpp | 13KB | CPP File | 9/17/01 11:31 AM | |
| CGridControl.h | 4KB | H File | 9/17/01 11:31 AM | |
| CGridInput.cpp | 15KB | CPP File | 9/17/01 11:31 AM | |
| CGridInput.h | 6KB | H File | 9/17/01 11:31 AM | |
| CheckCoincidenceDlg.cpp | 6KB | CPP File | 9/17/01 11:31 AM | |
| CheckCoincidenceDlg.h | 4KB | H File | 9/17/01 11:31 AM | |
| CheckDistortionDlg.cpp | 3KB | CPP File | 9/17/01 11:31 AM | |
| CheckDistortionDlg.h | 2KB | H File | 9/17/01 11:31 AM | |
| ChildFrm.cpp | 2KB | CPP File | 9/17/01 11:31 AM | |
| ChildFrm.h | 2KB | H File | 9/17/01 11:31 AM | |
| CListFileMFC.cpp | 3KB | CPP File | 9/17/01 11:31 AM | |
| CListFileMFC.h | 2KB | H File | 9/17/01 11:31 AM | |
| ColorDlg.cpp | 9KB | CPP File | 9/17/01 11:31 AM | |
| ColorDlg.h | 3KB | H File | 9/17/01 11:31 AM | |
| CopyMatPropertyDlg.cpp | 8KB | CPP File | 9/17/01 11:31 AM | |
| CopyMatPropertyDlg.h | 3KB | H File | 9/17/01 11:31 AM | |
| CreateArcDlg.cpp | 14KB | CPP File | 9/17/01 11:31 AM | |
| CreateArcDlg.h | 3KB | H File | 9/17/01 11:31 AM | |
| 320 object(s) | 3.31MB (Disk free space: 0 bytes) | My Computer | | |

FIG. 33

| Exploring -D:\FEM Builder 1.2\Source\FemBuilder | | | | |
|---|---|---|---|---|
| File Edit View Go Favorites Tools Help | | | | |
| Name | Size | Type | Modified | |
| CreateBCDlg.h | 11KB | H File | 9/17/01 11:31 AM | |
| CreateBCFluid.cpp | 22KB | CPP File | 9/17/01 11:31 AM | |
| CreateBCFluid.h | 9KB | H File | 9/17/01 11:31 AM | |
| CreateBCInterpolateDlg.cpp | 11KB | CPP File | 9/18/01 12:26 PM | |
| CreateBCInterpolateDlg.h | 4KB | H File | 9/17/01 11:31 AM | |
| CreateBCInsentropicDlg.cpp | 6KB | CPP File | 9/17/01 11:31 AM | |
| CreateBCInsentropicDlg.h | 3KB | H File | 9/17/01 11:31 AM | |
| CreateBCTabular.cpp | 9KB | CPP File | 9/17/01 11:31 AM | |
| CreateBCTabular.h | 3KB | H File | 9/17/01 11:31 AM | |
| CreateChemReactionDlg.cpp | 5KB | CPP File | 9/17/01 11:31 AM | |
| CreateChemReactionDlg.h | 2KB | H File | 9/17/01 11:31 AM | |
| CreateChemSpeciesDlg.cpp | 3KB | CPP File | 9/17/01 11:31 AM | |
| CreateChemSpeciesDlg.h | 2KB | H File | 9/17/01 11:31 AM | |
| CreateCircleDlg.cpp | 10KB | CPP File | 9/17/01 11:31 AM | |
| CreateCircleDlg.h | 3KB | H File | 9/17/01 11:31 AM | |
| CreateConstraintDlg.cpp | 9KB | CPP File | 9/17/01 11:31 AM | |
| CreateConstraintDlg.h | 4KB | H File | 9/17/01 11:31 AM | |
| CreateCurveOffsetDlg.cpp | 6KB | CPP File | 9/17/01 11:31 AM | |
| CreateCurveOffsetDlg.h | 3KB | H File | 9/17/01 11:31 AM | |
| CreateGroupDlg.cpp | 9KB | CPP File | 9/17/01 11:31 AM | |
| CreateGroupDlg.h | 3KB | H File | 9/17/01 11:31 AM | |
| CreateInitialConditionsDlg.cpp | 22KB | CPP File | 9/17/01 11:31 AM | |
| CreateInitialConditionsDlg.h | 8KB | H File | 9/17/01 11:31 AM | |
| 320 object(s) | 3.31MB (Disk free space: 0 bytes) | My Computer | | |

FIG. 34

| Exploring -D:\FEM Builder 1.2\Source\FemBuilder | | | |
|---|---|---|---|
| File Edit View Go Favorites Tools Help | | | |
| Name | Size | Type | Modified |
| CreateLineDlg.h | 3KB | H File | 9/17/01 11:31 AM |
| CreateNodeDlg.cpp | 2KB | CPP File | 9/17/01 11:31 AM |
| CreateNodeDlg.h | 2KB | H File | 9/17/01 11:31 AM |
| CreatePointBetweenDlg.cpp | 12KB | CPP File | 9/17/01 11:31 AM |
| CreatePointBetweenDlg.h | 3KB | H File | 9/17/01 11:31 AM |
| CreatePointCoordinateDlg.cpp | 6KB | CPP File | 9/17/01 11:31 AM |
| CreatePointCoordinateDlg.h | 3KB | H File | 9/17/01 11:31 AM |
| CreatePointOnCurveDlg.cpp | 15KB | CPP File | 9/17/01 11:31 AM |
| CreatePointOnCurveDlg.h | 3KB | H File | 9/17/01 11:31 AM |
| CreateSplineDlg.cpp | 18KB | CPP File | 9/17/01 11:31 AM |
| CreateSplineDlg.h | 3KB | H File | 9/17/01 11:31 AM |
| CreateSurfaceBoundaryDlg.cpp | 8KB | CPP File | 9/17/01 11:31 AM |
| CreateSurfaceBoundaryDlg.h | 2KB | H File | 9/17/01 11:31 AM |
| CreateSurfaceExtrudeDlg.cpp | 13KB | CPP File | 9/17/01 11:31 AM |
| CreateSurfaceExtrudeDlg.h | 3KB | H File | 9/17/01 11:31 AM |
| CreateSurfaceRevolveDlg.cpp | 12KB | CPP File | 9/17/01 11:31 AM |
| CreateSurfaceRevolveDlg.h | 3KB | H File | 9/17/01 11:31 AM |
| CreateSurfaceSweepDlg.cpp | 7KB | CPP File | 9/17/01 11:31 AM |
| CreateSurfaceSweepDlg.h | 3KB | H File | 9/17/01 11:31 AM |
| CreateSystemDlg.cpp | 12KB | CPP File | 9/17/01 11:31 AM |
| CopySystemDlg.h | 3KB | H File | 9/17/01 11:31 AM |
| CreateVolumeBoundaryDlg.cpp | 6KB | CPP File | 9/17/01 11:31 AM |
| CreateVolumeBoundaryDlg.h | 2KB | H File | 9/17/01 11:31 AM |
| 320 object(s) | 3.31MB (Disk free space: 0 bytes) | My Computer | |

FIG. 35

| Exploring -D:\FEM Builder 1.2\Source\FemBuilder | | | |
|---|---|---|---|
| File Edit View Go Favorites Tools Help | | | |
| Name | Size | Type | Modified |
| CreateVolumeExtrudeDlg.cpp | 11KB | CPP File | 9/17/01 11:31 AM |
| CreateVolumeExtrudeDlg.h | 3KB | H File | 9/17/01 11:31 AM |
| CreateVolumeRevolveDlg.cpp | 10KB | CPP File | 9/17/01 11:31 AM |
| CreateVolumeRevolveDlg.h | 3KB | H File | 9/18/01 12:26 PM |
| CreateVolumeSweepDlg.cpp | 2KB | CPP File | 9/17/01 11:31 AM |
| CreateVolumeSweepDlg.h | 2KB | H File | 9/17/01 11:31 AM |
| CWizardPage.cpp | 2KB | CPP File | 9/17/01 11:31 AM |
| CWizardPage.h | 2KB | H File | 9/17/01 11:31 AM |
| CWizardSheet.cpp | 10KB | CPP File | 9/17/01 11:31 AM |
| CWizardSheet.h | 2KB | H File | 9/17/01 11:31 AM |
| DefineVectorDlg.cpp | 14KB | CPP File | 9/17/01 11:31 AM |
| DefineVectorDlg.h | 3KB | H File | 9/17/01 11:31 AM |
| DeformMeshDlg.cpp | 4KB | CPP File | 9/17/01 11:31 AM |
| DeformMeshDlg.h | 2KB | H File | 9/17/01 11:31 AM |
| DisplayOptionDlg.cpp | 25KB | CPP File | 9/17/01 3:00 PM |
| DisplayOptionDlg.h | 8KB | H File | 9/17/01 11:31 AM |
| EditBCColorDlg.cpp | 6KB | CPP File | 9/17/01 11:31 AM |
| EditBCColorDlg.h | 3KB | H File | 9/17/01 11:31 AM |
| EditColorPS.cpp | 9KB | CPP File | 9/17/01 11:31 AM |
| EditColorPS.h | 3KB | H File | 9/17/01 11:31 AM |
| EditCurveSplitDlg.cpp | 11KB | CPP File | 9/17/01 11:31 AM |
| EditCurveSplitDlg.h | 3KB | H File | 9/17/01 11:31 AM |
| EditCurveSubdivisionDlg.cpp | 9KB | CPP File | 9/17/01 11:31 AM |
| 320 object(s) | 3.31MB (Disk free space: 0 bytes) | My Computer | |

FIG. 36

| Exploring -D:\FEM Builder 1.2\Source\FemBuilder | | | |
|---|---|---|---|
| File Edit View Go Favorites Tools Help | | | |
| Name | Size | Type | Modified |
| EditCurveSubdivison.Dlg.h | 3KB | H File | 9/17/01 11:31 AM |
| EditCurveTrim.Dlg.cpp | 9KB | CPP File | 9/17/01 11:31 AM |
| EditCurveTrim.Dlg.h | 3KB | H File | 9/17/01 11:31 AM |
| EditElementAttributesDlg.cpp | 14KB | CPP File | 9/17/01 11:31 AM |
| EditElementAttributesDlg.h | 4KB | H File | 9/17/01 11:31 AM |
| EditElementDlg.cpp | 18KB | CPP File | 9/17/01 11:31 AM |
| EditElementDlg.h | 4KB | H File | 9/17/01 11:31 AM |
| EditElementOrientDlg.cpp | 46KB | CPP File | 9/17/01 11:31 AM |
| EditElementOrientDlg.h | 15KB | H File | 9/17/01 11:31 AM |
| EditGravityDlg.cpp | 2KB | CPP File | 9/17/01 11:31 AM |
| EditGravityDlg.h | 2KB | H File | 9/17/01 11:31 AM |
| EditMeshAttributeDlg.cpp | 6KB | CPP File | 9/17/01 11:31 AM |
| EditMeshAttributeDlg.h | 3KB | H File | 9/17/01 11:31 AM |
| EditMultipleElementsDlg.cpp | 2KB | CPP File | 9/17/01 11:31 AM |
| EditMultipleElementsDlg.h | 2KB | H File | 9/17/01 11:31 AM |
| EditNodeDlg.cpp | 11KB | CPP File | 9/17/01 11:31 AM |
| EditNodeDlg.h | 3KB | H File | 9/17/01 11:31 AM |
| EditNodeDSystemDlg.cpp | 6KB | CPP File | 9/17/01 11:31 AM |
| EditNodeDSystemDlg.h | 3KB | H File | 9/17/01 11:31 AM |
| EditWorkPlaneDlg.cpp | 10KB | CPP File | 9/17/01 11:31 AM |
| EditWorkPlaneDlg.h | 3KB | H File | 9/17/01 11:31 AM |
| EditWorkPlaneMoveDlg.cpp | 11KB | CPP File | 9/17/01 11:31 AM |
| EditWorkPlaneMoveDlg.h | 3KB | H File | 9/17/01 11:31 AM |
| 320 object(s) | 3.31MB (Disk free space: 0 bytes) | My Computer | |

FIG. 37

| Exploring -D:\FEM Builder 1.2\Source\FemBuilder | | | |
|---|---|---|---|
| File Edit View Go Favorites Tools Help | | | |
| Name | Size | Type | Modified |
| error.wav | 25KB | Wave Sound | 8/3/96 1:00 AM |
| ExecuteAbaqusDlg.cpp | 6KB | CPP File | 9/17/01 11:31 AM |
| ExecuteAbaqusDlg.h | 3KB | H File | 9/17/01 11:31 AM |
| ExecuteFluentDlg.cpp | 8KB | CPP File | 9/17/01 11:31 AM |
| ExecuteFluentDlg.h | 3KB | H File | 9/17/01 11:31 AM |
| ExecuteParameterPP.cpp | 20KB | CPP File | 9/17/01 11:31 AM |
| ExecuteParameterPP.h | 5KB | H File | 9/17/01 11:31 AM |
| Fem.aps | 621KB | APS File | 9/20/01 10:36 AM |
| Fem.cpp | 16KB | CPP File | 9/20/01 11:07 AM |
| Fem.dsp | 30KB | DSP File | 9/17/01 11:31 AM |
| Fem.dsw | 2KB | DSW File | 9/17/01 11:31 AM |
| Fem.h | 3KB | H File | 9/20/01 10:37 AM |
| Fem.rc | 353KB | RC File | 9/20/01 11:36 AM |
| FemDoc.cpp | 44KB | CPP File | 9/17/01 11:31 AM |
| FemDoc.h | 17KB | H File | 9/17/01 11:31 AM |
| FemDocBlank.cpp | 4KB | CPP File | 9/17/01 11:31 AM |
| FemDocCreateBC.cpp | 11KB | CPP File | 9/17/01 11:31 AM |
| FemDocDelete.cpp | 8KB | CPP File | 9/17/01 11:31 AM |
| FemDocEditBC.cpp | 2KB | CPP File | 9/17/01 11:31 AM |
| FemDocFEM.cpp | 3KB | CPP File | 9/17/01 11:31 AM |
| FemDocGeometry.cpp | 9KB | CPP File | 9/17/01 11:31 AM |
| FemDocInterfaces.cpp | 6KB | CPP File | 9/17/01 11:31 AM |
| FemDocList.cpp | 10KB | CPP File | 9/17/01 11:31 AM |
| 320 object(s) | 3.31MB (Disk free space: 0 bytes) | My Computer | |

FIG. 38

| Exploring -D:\FEM Builder 1.2\Source\FemBuilder | | | |
|---|---|---|---|
| File  Edit  View  Go  Favorites  Tools  Help | | | |
| Name | Size | Type | Modified |
| FemDocMatProp.cpp | 6KB | CPP File | 9/17/01 11:31 AM |
| FemDocOrient.cpp | 1KB | CPP File | 9/17/01 11:31 AM |
| FemDocPost.cpp | 4KB | CPP File | 9/17/01 11:31 AM |
| FemDocTools.cpp | 4KB | CPP File | 9/17/01 11:31 AM |
| FemUserMessage.h | 1KB | H File | 9/17/01 11:31 AM |
| FemView.cpp | 52KB | CPP File | 9/21/01 7:06 AM |
| FemView.h | 11KB | H File | 9/17/01 11:31 AM |
| FilterOptionsDlg.cpp | 5KB | CPP File | 9/17/01 11:31 AM |
| FilterOptionsDlg.h | 2KB | H File | 9/17/01 11:31 AM |
| FlowModelParameters.cpp | 17KB | CPP File | 9/17/01 11:31 AM |
| FlowModelParameters.h | 5KB | H File | 9/17/01 11:31 AM |
| FractureMechanicsDlg.cpp | 4KB | CPP File | 9/17/01 11:31 AM |
| FractureMechanicsDlg.h | 2KB | H File | 9/17/01 11:31 AM |
| GPropertySheetFun.cpp | 3KB | CPP File | 9/17/01 11:31 AM |
| GPropertySheetFun.h | 1KB | H File | 9/17/01 11:31 AM |
| Insert2DFlawDlg.cpp | 15KB | CPP File | 9/17/01 11:31 AM |
| Insert2DFlawDlg.h | 5KB | H File | 9/17/01 11:31 AM |
| Insert2DFlawEllipseDlg.cpp | 8KB | CPP File | 9/17/01 11:31 AM |
| Insert2DFlawEllipseDlg.h | 2KB | H File | 9/17/01 11:31 AM |
| Interface.cpp | 41KB | CPP File | 9/17/01 11:31 AM |
| Interface.h | 3KB | H File | 9/17/01 11:31 AM |
| InterpolateProjectionDlg.cpp | 9KB | CPP File | 9/17/01 11:31 AM |
| InterpolateProjectionDlg.h | 3KB | H File | 9/17/01 11:31 AM |
| 320 object(s) | 3.31MB (Disk free space: 0 bytes) | | My Computer |

FIG. 39

| Exploring -D:\FEM Builder 1.2\Source\FemBuilder | | | |
|---|---|---|---|
| File  Edit  View  Go  Favorites  Tools  Help | | | |
| Name | Size | Type | Modified |
| listFileDlg.cpp | 5KB | CPP File | 8/3/96 1:00 AM |
| listFileDlg.h | 2KB | H File | 9/17/01 11:31 AM |
| ListResultValuesDlg.cpp | 7KB | CPP File | 9/17/01 11:31 AM |
| ListResultValuesDlg.h | 3KB | H File | 9/17/01 11:31 AM |
| MainFrm.cpp | 17KB | CPP File | 9/20/01 10:37 AM |
| MainFrm.h | 3KB | H File | 9/17/01 11:31 AM |
| MaterialPropertyDlg.cpp | 20KB | CPP File | 9/17/01 11:31 AM |
| MaterialPropertyDlg.h | 5KB | H File | 9/20/01 10:36 AM |
| MeshDlg.cpp | 42KB | CPP File | 9/20/01 11:07 AM |
| MeshDlg.h | 10KB | H File | 9/17/01 11:31 AM |
| ModelFileNamePP.cpp | 12KB | CPP File | 9/17/01 11:31 AM |
| ModelFileNamePP.h | 4KB | H File | 9/20/01 10:37 AM |
| ModelInfoDlg.cpp | 17KB | CPP File | 9/20/01 11:36 AM |
| ModelInfoDlg.h | 6KB | H File | 9/17/01 11:31 AM |
| MoveCopyDlg.cpp | 34KB | CPP File | 9/17/01 11:31 AM |
| MoveCopyDlg.h | 10KB | H File | 9/17/01 11:31 AM |
| OptionsDlg.cpp | 21KB | CPP File | 9/18/01 12:26 PM |
| OptionsDlg.h | 9KB | H File | 9/17/01 11:31 AM |
| OrientViewDlg.cpp | 6KB | CPP File | 9/21/01 7:06 AM |
| OrientViewDlg.h | 4KB | H File | 9/17/01 11:31 AM |
| PostContourDlg.cpp | 17KB | CPP File | 9/17/01 11:31 AM |
| PostContourDlg.h | 4KB | H File | 9/17/01 11:31 AM |
| PostDeformedDlg.cpp | 13KB | CPP File | 9/17/01 11:31 AM |
| 320 object(s) | 3.31MB (Disk free space: 0 bytes) | | My Computer |

FIG. 40

| Exploring -D:\FEM Builder 1.2\Source\FemBuilder | | | |
|---|---|---|---|
| File Edit View Go Favorites Tools Help | | | |
| Name | Size | Type | Modified |
| PostDeformedDlg.h | 3KB | H File | 9/17/01 11:31 AM |
| PostDlg.cpp | 33KB | CPP File | 9/21/01 7:06 AM |
| PostDlg.h | 11KB | H File | 9/17/01 11:31 AM |
| PostVectorDlg.cpp | 17KB | CPP File | 9/17/01 11:31 AM |
| PostVectorDlg.h | 4KB | H File | 9/17/01 11:31 AM |
| PostView.cpp | 15KB | CPP File | 9/21/01 7:06 AM |
| PostView.h | 4KB | H File | 9/17/01 11:31 AM |
| PostXYAnalysisResultDlg.cpp | 30KB | CPP File | 9/17/01 11:31 AM |
| PostXYAnalysisResultDlg.h | 7KB | H File | 9/17/01 11:31 AM |
| PostXYPlotParmDlg.cpp | 35KB | CPP File | 9/17/01 11:31 AM |
| PostXYPlotParmDlg.h | 9KB | H File | 9/17/01 11:31 AM |
| PostXYPlotViewDlg.cpp | 2KB | CPP File | 9/17/01 11:31 AM |
| PostXYPlotViewDlg.h | 2KB | H File | 9/17/01 11:31 AM |
| PostXYTimeHistoryDlg.cpp | 21KB | CPP File | 9/17/01 11:31 AM |
| PostXYTimeHistoryDlg.h | 4KB | H File | 9/17/01 11:31 AM |
| ReadAbaqusDlg.cpp | 3KB | CPP File | 9/17/01 11:31 AM |
| ReadAbaqusDlg.h | 2KB | H File | 9/17/01 11:31 AM |
| ReadAnsysDlg.cpp | 3KB | CPP File | 9/17/01 11:31 AM |
| ReadAnsysDlg.h | 2KB | H File | 9/17/01 11:31 AM |
| ReadAscharDlg.cpp | 4KB | CPP File | 9/17/01 11:31 AM |
| ReadAscharDlg.h | 3KB | H File | 9/17/01 11:31 AM |
| ReadCCMDlg.cpp | 4KB | CPP File | 9/17/01 11:31 AM |
| ReadCMMDlg.h | 3KB | H File | 9/17/01 11:31 AM |
| 320 object(s) | 3.31MB (Disk free space: 0 bytes) | My Computer | |

FIG. 41

| Exploring -D:\FEM Builder 1.2\Source\FemBuilder | | | |
|---|---|---|---|
| File Edit View Go Favorites Tools Help | | | |
| Name | Size | Type | Modified |
| ReadCDCADlg.cpp | 4KB | CPP File | 9/17/01 11:31 AM |
| ReadCDCADlg.h | 3KB | H File | 9/17/01 11:31 AM |
| ReadFluentDlg.cpp | 3KB | CPP File | 9/17/01 11:31 AM |
| ReadFluentDlg.h | 2KB | H File | 9/17/01 11:31 AM |
| ReadGridGenDlg.cpp | 3KB | CPP File | 9/17/01 11:31 AM |
| ReadGridGenDlg.h | 2KB | H File | 9/17/01 11:31 AM |
| ReadIdeasMsDlg.cpp | 3KB | CPP File | 9/17/01 11:31 AM |
| ReadIdeasMsDlg.h | 2KB | H File | 9/17/01 11:31 AM |
| ReadPatranDlg.cpp | 8KB | CPP File | 9/17/01 11:32 AM |
| ReadPatranDlg.h | 3KB | H File | 9/17/01 11:32 AM |
| ReadRecessDlg.cpp | 3KB | CPP File | 9/17/01 11:32 AM |
| ReadRecessDlg.h | 2KB | H File | 9/17/01 11:32 AM |
| ReadSharpDlg.cpp | 3KB | CPP File | 9/17/01 11:32 AM |
| ReadSharpDlg.h | 2KB | H File | 9/17/01 11:32 AM |
| ReadSindaDlg.cpp | 3KB | CPP File | 9/17/01 11:32 AM |
| ReadSindaDlg.h | 2KB | H File | 9/17/01 11:32 AM |
| ReadSinGenDlg.cpp | 3KB | CPP File | 9/17/01 11:32 AM |
| ReadSinGenDlg.h | 2KB | H File | 9/17/01 11:32 AM |
| ReadTexChemDlg.cpp | 3KB | CPP File | 9/17/01 11:32 AM |
| ReadTexChemDlg.h | 2KB | H File | 9/17/01 11:32 AM |
| RefineMeshAdaptiveDlg.cpp | 19KB | CPP File | 9/20/01 10:38 AM |
| RefineMeshAdaptiveDlg.h | 5KB | H File | 9/17/01 11:32 AM |
| RefineMeshSpecifiedDlg.cpp | 8KB | CPP File | 9/17/01 11:32 AM |
| 320 object(s) | 3.31MB (Disk free space: 0 bytes) | My Computer | |

FIG. 42

| Exploring -D:\FEM Builder 1.2\Source\FemBuilder | | | |
|---|---|---|---|
| File Edit View Go Favorites Tools Help | | | |
| Name | Size | Type | Modified |
| RefineMeshSpecifiedDlg.h | 3KB | H File | 9/17/01 11:32 AM |
| resource.fd | 56KB | FD File | 9/20/01 10:36 AM |
| resource.h | 39KB | H File | 9/20/01 10:36 AM |
| ResultInterpolationDlg.cpp | 13KB | CPP File | 9/17/01 11:32 AM |
| ResultInterpolationDlg.h | 5KB | H File | 9/17/01 11:32 AM |
| ResultSuperpositonDlg.cpp | 6KB | CPP File | 9/17/01 11:32 AM |
| ResultSuperpositonDlg.h | 3KB | H File | 9/17/01 11:32 AM |
| SaveViewOrientationDlg.cpp | 2KB | CPP File | 9/17/01 11:32 AM |
| SaveViewOrientationDlg.h | 2KB | H File | 9/17/01 11:32 AM |
| SelectBCDlg.cpp | 9KB | CPP File | 9/17/01 11:32 AM |
| SelectBCDlg.h | 3KB | H File | 9/17/01 11:32 AM |
| SelectBCSetsDlg.cpp | 3KB | CPP File | 9/17/01 11:32 AM |
| SelectBCSetsDlg.h | 2KB | H File | 9/17/01 11:32 AM |
| SelectCurveDlg.cpp | 9KB | CPP File | 9/17/01 11:32 AM |
| SelectCurveDlg.h | 3KB | H File | 9/17/01 11:32 AM |
| SelectDlg.cpp | 9KB | CPP File | 9/17/01 11:32 AM |
| SelectDlg.h | 5KB | H File | 9/17/01 11:32 AM |
| SelectElementDlg.cpp | 13KB | CPP File | 9/17/01 11:32 AM |
| SelectElementDlg.h | 3KB | H File | 9/17/01 11:32 AM |
| SelectFaceDlg.cpp | 8KB | CPP File | 9/17/01 11:32 AM |
| SelectFaceDlg.h | 2KB | H File | 9/17/01 11:32 AM |
| SelectGroupDlg.cpp | 8KB | CPP File | 9/17/01 11:32 AM |
| SelectGroupDlg.h | 3KB | H File | 9/17/01 11:32 AM |
| 320 object(s) | 3.31MB (Disk free space: 0 bytes) | My Computer | |

*FIG. 43*

| Exploring -D:\FEM Builder 1.2\Source\FemBuilder | | | |
|---|---|---|---|
| File Edit View Go Favorites Tools Help | | | |
| Name | Size | Type | Modified |
| SelectMaterialDlg.cpp | 8KB | CPP File | 9/17/01 11:32 AM |
| SelectMaterialDlg.h | 3KB | H File | 9/17/01 11:32 AM |
| SelectMaterialIDsDlg.cpp | 3KB | CPP File | 9/17/01 11:32 AM |
| SelectMaterialIDsDlg.h | 2KB | H File | 9/17/01 11:32 AM |
| SelectModelDlg.cpp | 3KB | CPP File | 9/17/01 11:32 AM |
| SelectModelDlg.h | 2KB | H File | 9/17/01 11:32 AM |
| SelectNodeDlg.cpp | 13KB | CPP File | 9/17/01 11:32 AM |
| SelectNodeDlg.h | 3KB | H File | 9/17/01 11:32 AM |
| SelectPointDlg.cpp | 9KB | CPP File | 9/17/01 11:32 AM |
| SelectPointDlg.h | 3KB | H File | 9/17/01 11:32 AM |
| SelectReactionsDlg.cpp | 4KB | CPP File | 9/17/01 11:32 AM |
| SelectReactionsDlg.h | 2KB | H File | 9/17/01 11:32 AM |
| SelectResultDlg.cpp | 16KB | CPP File | 9/17/01 11:32 AM |
| SelectResultDlg.h | 4KB | H File | 9/17/01 11:32 AM |
| SelectSpeciesDlg.cpp | 4KB | CPP File | 9/17/01 11:32 AM |
| SelectSpeciesDlg.h | 2KB | H File | 9/17/01 11:32 AM |
| SelectSurfaceByTypeDlg.cpp | 3KB | CPP File | 9/17/01 11:32 AM |
| SelectSurfaceByTypeDlg.h | 2KB | H File | 9/17/01 11:32 AM |
| SelectSurfaceDlg.cpp | 10KB | CPP File | 9/17/01 11:32 AM |
| SelectSurfaceDlg.h | 3KB | H File | 9/17/01 11:32 AM |
| SelectSystemDlg.cpp | 6KB | CPP File | 9/17/01 11:32 AM |
| SelectSystemDlg.h | 2KB | H File | 9/17/01 11:32 AM |
| SelectVolumeDlg.cpp | 9KB | CPP File | 9/17/01 11:32 AM |
| 320 object(s) | 3.31MB (Disk free space: 0 bytes) | My Computer | |

*FIG. 44*

| Exploring -D:\FEM Builder 1.2\Source\FemBuilder | | | |
|---|---|---|---|
| File Edit View Go Favorites Tools Help | | | |
| Name | Size | Type | Modified |
| SelectVolumeDlg.h | 3KB | H File | 9/17/01 11:32 AM |
| SmoothMeshDlg.cpp | 7KB | CPP File | 9/17/01 11:32 AM |
| SmoothMeshDlg.h | 3KB | H File | 9/17/01 11:32 AM |
| SplashWnd.cpp | 4KB | CPP File | 9/17/01 11:32 AM |
| SplashWnd.h | 2KB | H File | 9/17/01 11:32 AM |
| Splsh16.bmp | 81KB | Bitmap Image | 9/17/01 11:32 AM |
| StdAfx.cpp | 1KB | CPP File | 9/17/01 11:32 AM |
| StdAfx.h | 2KB | H File | 9/17/01 11:32 AM |
| SubModelDlg.cpp | 11KB | CPP File | 9/17/01 11:32 AM |
| SubModelDlg.h | 4KB | H File | 9/17/01 11:32 AM |
| SweepDlg.cpp | 8KB | CPP File | 9/17/01 11:32 AM |
| SweepDlg.h | 3KB | H File | 9/17/01 11:32 AM |
| ThermalAblationDlg.cpp | 12KB | CPP File | 9/17/01 11:32 AM |
| ThermalAblationDlg.h | 4KB | H File | 9/17/01 11:32 AM |
| TranslateDlg.cpp | 2KB | CPP File | 9/17/01 11:32 AM |
| TranslateDlg.h | 2KB | H File | 9/17/01 11:32 AM |
| UnitSystemPP.cpp | 6KB | CPP File | 9/17/01 11:32 AM |
| UnitSystemPP.h | 2KB | H File | 9/17/01 11:32 AM |
| WriteAbaqusDlg.cpp | 18KB | CPP File | 9/17/01 11:32 AM |
| WriteAbaqusDlg.h | 7KB | H File | 9/17/01 11:32 AM |
| WriteAnsysDlg.cpp | 2KB | CPP File | 9/17/01 11:32 AM |
| WriteAnsysDlg.h | 2KB | H File | 9/17/01 11:32 AM |
| WriteCCMDlg.cpp | 8KB | CPP File | 9/17/01 3:00 PM |
| 320 object(s) | 3.31MB (Disk free space: 0 bytes) | My Computer | |

FIG. 45

| Exploring -D:\FEM Builder 1.2\Source\FemBuilder | | | |
|---|---|---|---|
| File Edit View Go Favorites Tools Help | | | |
| Name | Size | Type | Modified |
| WriteAnsysDlg.cpp | 2KB | CPP File | 9/17/01 11:32 AM |
| WriteAnsysDlg.h | 2KB | H File | 9/17/01 11:32 AM |
| WriteCCMDlg.cpp | 8KB | CPP File | 9/17/01 3:00 PM |
| WriteCCMDlg.h | 3KB | H File | 9/17/01 11:32 AM |
| WriteCDCADlg.cpp | 8KB | CPP File | 9/17/01 3:00 PM |
| WriteCDCADlg.h | 3KB | H File | 9/17/01 11:32 AM |
| WriteFluentDlg.cpp | 22KB | CPP File | 9/17/01 11:32 AM |
| WriteFluentDlg.h | 9KB | H File | 9/17/01 11:32 AM |
| WriteIdeasMSDlg.cpp | 7KB | CPP File | 9/17/01 11:32 AM |
| WriteIdeasMSDlg.h | 3KB | H File | 9/17/01 11:32 AM |
| WritePatranDlg.cpp | 6KB | CPP File | 9/17/01 11:32 AM |
| WritePatranDlg.h | 3KB | H File | 9/17/01 11:32 AM |
| WriteRecessDlg.cpp | 26KB | CPP File | 9/17/01 11:32 AM |
| WriteRecessDlg.h | 7KB | H File | 9/17/01 11:32 AM |
| WriteSindaDlg.cpp | 14KB | CPP File | 9/17/01 11:32 AM |
| WriteSindaDlg.h | 6KB | H File | 9/17/01 11:32 AM |
| WriteTexChem.cpp | 7KB | CPP File | 9/17/01 11:32 AM |
| WriteTexChem.h | 4KB | H File | 9/17/01 11:32 AM |
| XYPlotParmDlg.cpp | 40KB | CPP File | 9/21/01 7:06 AM |
| XYPlotParmDlg.h | 9KB | H File | 9/17/01 11:32 AM |
| XYPlotView.cpp | 48KB | CPP File | 9/21/01 7:06 AM |
| XYPlotView.h | 8KB | H File | 9/17/01 11:32 AM |
| 320 object(s) | 3.31MB (Disk free space: 0 bytes) | My Computer | |

FIG. 46

| Exploring -D:\FEM Builder 1.2\Source\FemLib\FemDB | | | |
|---|---|---|---|
| File Edit View Go Favorites Tools Help | | | |
| Name | Size | Type | Modified |
| CFemDBBC.cpp | 28KB | CPP File | 9/17/01 11:37 AM |
| CFemDBBCDefaults.cpp | 3KB | CPP File | 9/17/01 11:37 AM |
| CFemDBConventions.cpp | 8KB | CPP File | 9/17/01 11:37 AM |
| CFemDBCResult.cpp | 3KB | CPP File | 9/17/01 11:37 AM |
| CFemDBCurve.cpp | 21KB | CPP File | 9/17/01 11:37 AM |
| CFemDBElement.cpp | 17KB | CPP File | 9/17/01 11:37 AM |
| CFemDBElementOrient.cpp | 9KB | CPP File | 9/17/01 11:37 AM |
| CFemDBEquation.cpp | 17KB | CPP File | 9/17/01 11:37 AM |
| CFemDBEResult.cpp | 3KB | CPP File | 9/17/01 11:37 AM |
| CFemDBGroup.cpp | 9KB | CPP File | 9/17/01 11:37 AM |
| CFemDBInitialConditions.cpp | 4KB | CPP File | 9/17/01 11:37 AM |
| CFemDBMaterial.cpp | 7KB | CPP File | 9/17/01 11:37 AM |
| CFemDBMatID.cpp | 11KB | CPP File | 9/17/01 11:37 AM |
| CFemDBMesh.cpp | 10KB | CPP File | 9/17/01 11:37 AM |
| CFemDBNode.cpp | 6KB | CPP File | 9/17/01 11:37 AM |
| CFemDBNResult.cpp | 3KB | CPP File | 9/17/01 11:37 AM |
| CFemDBPrp.cpp | 6KB | CPP File | 9/17/01 11:37 AM |
| CFemDBPt.cpp | 4KB | CPP File | 9/17/01 11:37 AM |
| CFemDBResult.cpp | 41KB | CPP File | 9/17/01 11:37 AM |
| CFemDBSelect.cpp | 62KB | CPP File | 9/17/01 11:37 AM |
| CFemDBSet.cpp | 9KB | CPP File | 9/17/01 11:37 AM |
| CFemDBSubset.cpp | 2KB | CPP File | 9/17/01 11:37 AM |
| CFemDBSurface.cpp | 26KB | CPP File | 9/17/01 11:37 AM |
| 103 object(s) | 1.44KB (Disk free space: 0 bytes) | My Computer | |

FIG. 49

| Exploring -D:\FEM Builder 1.2\Source\FemLib\FemDB | | | |
|---|---|---|---|
| File Edit View Go Favorites Tools Help | | | |
| Name | Size | Type | Modified |
| CFemDBSystem.cpp | 7KB | CPP File | 9/17/01 11:37 AM |
| CFemDBVolume.cpp | 14KB | CPP File | 9/17/01 11:37 AM |
| CFemDO.cpp | 6KB | CPP File | 9/17/01 11:37 AM |
| CFemGeometry.cpp | 2KB | CPP File | 9/17/01 11:37 AM |
| CFemOptions.cpp | 3KB | CPP File | 9/17/01 11:37 AM |
| CFlowModel.cpp | 9KB | CPP File | 9/17/01 11:37 AM |
| CFractureCCI.cpp | 6KB | CPP File | 9/17/01 11:37 AM |
| CFractureCOD.cpp | 7KB | CPP File | 9/17/01 11:37 AM |
| CFractureJIntegral.cpp | 21KB | CPP File | 9/17/01 11:37 AM |
| CFractureJIntegralDPEnergyE.cpp | 2KB | CPP File | 9/17/01 11:37 AM |
| CFractureJIntegralDPEnergyI.cpp | 4KB | CPP File | 9/17/01 11:37 AM |
| CFractureMechanics.cpp | 2KB | CPP File | 9/17/01 11:37 AM |
| CGPDistortionCheck.cpp | 2KB | CPP File | 9/17/01 11:37 AM |
| CGroup.cpp | 7KB | CPP File | 9/17/01 11:37 AM |
| CInsert2DFlaw.cpp | 41KB | CPP File | 9/17/01 11:37 AM |
| CIsentropicFlow.cpp | 4KB | CPP File | 9/17/01 11:37 AM |
| CMesh.cpp | 2KB | CPP File | 9/17/01 11:37 AM |
| CMesh2D.cpp | 24KB | CPP File | 9/17/01 11:37 AM |
| CMesh3D.cpp | 34KB | CPP File | 9/17/01 11:37 AM |
| CMeshAttribute.cpp | 3KB | CPP File | 9/17/01 11:37 AM |
| CMeshElement2D.cpp | 13KB | CPP File | 9/17/01 11:37 AM |
| CMeshMapped2D.cpp | 57KB | CPP File | 9/17/01 11:37 AM |
| CMeshMapped3D.cpp | 17KB | CPP File | 9/17/01 11:37 AM |
| 103 object(s) | 1.44MB (Disk free space: 0 bytes) | My Computer | |

FIG. 50

| Exploring -D:\FEM Builder 1.2\Source\FemLib\FemDB | | | |
|---|---|---|---|
| File  Edit  View  Go  Favorites  Tools  Help | | | |
| Name | Size | Type | Modified |
| CMeshSmooth.cpp | 8KB | CPP File | 9/17/01 11:37 AM |
| CMeshTrans3D.cpp | 17KB | CPP File | 9/17/01 11:37 AM |
| CMoveCopy.cpp | 55KB | CPP File | 9/17/01 11:37 AM |
| CNode.cpp | 4KB | CPP File | 9/17/01 11:37 AM |
| COrient.cpp | 2KB | CPP File | 9/17/01 11:37 AM |
| CPt.cpp | 2KB | CPP File | 9/17/01 11:37 AM |
| CQuadrant.cpp | 19KB | CPP File | 9/17/01 11:37 AM |
| CRefineMesh.cpp | 87KB | CPP File | 9/17/01 11:37 AM |
| CResult.cpp | 43KB | CPP File | 9/17/01 11:37 AM |
| CSindaAttrib.cpp | 6KB | CPP File | 9/17/01 11:37 AM |
| CSindaNetwork.cpp | 37KB | CPP File | 9/17/01 11:37 AM |
| CSubModel.cpp | 15KB | CPP File | 9/17/01 11:37 AM |
| CSweepModel.cpp | 27KB | CPP File | 9/17/01 11:37 AM |
| CThermalAblation.cpp | 32KB | CPP File | 9/17/01 11:37 AM |
| DrawFem.cpp | 25KB | CPP File | 9/17/01 11:37 AM |
| FemEntityType.cpp | 9KB | CPP File | 9/17/01 11:37 AM |
| GElementContour.cpp | 29KB | CPP File | 9/17/01 11:37 AM |
| GElementDistortion.cpp | 9KB | CPP File | 9/17/01 11:37 AM |
| GElementFun.cpp | 16KB | CPP File | 9/17/01 11:37 AM |
| GElementGInt.cpp | 17KB | CPP File | 9/17/01 11:37 AM |
| GElementInfo.cpp | 42KB | CPP File | 9/17/01 11:37 AM |
| GElementNCIP.cpp | 27KB | CPP File | 9/17/01 11:37 AM |
| GElementNCPP.cpp | 10KB | CPP File | 9/17/01 11:37 AM |
| 103 object(s) | 1.44KB (Disk free space: 0 bytes) | My Computer | |

FIG. 51

| Exploring -D:\FEM Builder 1.2\Source\FemLib\FemDB | | | |
|---|---|---|---|
| File  Edit  View  Go  Favorites  Tools  Help | | | |
| Name | Size | Type | Modified |
| CSweepModel.cpp | 27KB | CPP File | 9/17/01 11:37 AM |
| CThermalAblation.cpp | 32KB | CPP File | 9/17/01 11:37 AM |
| DrawFem.cpp | 25KB | CPP File | 9/17/01 11:37 AM |
| FemEntityType.cpp | 9KB | CPP File | 9/17/01 11:37 AM |
| GElementContour.cpp | 29KB | CPP File | 9/17/01 11:37 AM |
| GElementDistortion.cpp | 9KB | CPP File | 9/17/01 11:37 AM |
| GElementFun.cpp | 16KB | CPP File | 9/17/01 11:37 AM |
| GElementGInt.cpp | 17KB | CPP File | 9/17/01 11:37 AM |
| GElementInfo.cpp | 42KB | CPP File | 9/17/01 11:37 AM |
| GElementNCIP.cpp | 27KB | CPP File | 9/17/01 11:37 AM |
| GElementNCPP.cpp | 10KB | CPP File | 9/17/01 11:37 AM |
| GElementNCVI.cpp | 13KB | CPP File | 9/17/01 11:37 AM |
| GElementOrient.cpp | 3KB | CPP File | 9/17/01 11:37 AM |
| GElementSF.cpp | 17KB | CPP File | 9/17/01 11:37 AM |
| GElementSFD.cpp | 33KB | CPP File | 9/17/01 11:37 AM |
| GElementSFDD.cpp | 51KB | CPP File | 9/17/01 11:37 AM |
| GMeshFun.cpp | 8KB | CPP File | 9/17/01 11:37 AM |
| GPointFun.cpp | 2KB | CPP File | 9/17/01 11:37 AM |
| GRdAnsysRes.cpp | 13KB | CPP File | 9/17/01 11:37 AM |
| GSindaFun.cpp | 2KB | CPP File | 9/17/01 11:37 AM |
| ResultInterpolation.cpp | 23KB | CPP File | 9/17/01 11:37 AM |
| ResultSuperposition.cpp | 10KB | CPP File | 9/17/01 11:37 AM |
| 103 object(s) | 1.44MB (Disk free space: 0 bytes) | My Computer | |

FIG. 52

| Exploring -D:\FEM Builder 1.2\Source\FemLib\Include | | | |
|---|---|---|---|
| File Edit View Go Favorites Tools Help | | | |
| Name | Size | Type | Modified |
| CAblationSurface.h | 2KB | H File | 9/17/01 11:37 AM |
| CAdjacentElementList.h | 2KB | H File | 9/17/01 11:37 AM |
| CAmplitdue.h | 2KB | H File | 9/17/01 11:37 AM |
| CBC.h | 3KB | H File | 9/17/01 11:37 AM |
| CBCDefault.h | 9KB | H File | 9/17/01 11:37 AM |
| CBCR.h | 2KB | H File | 9/17/01 11:37 AM |
| CBCSet.h | 6KB | H File | 9/17/01 11:37 AM |
| CBCV.h | 1KB | H File | 9/17/01 11:37 AM |
| CBoundaryNodeList.h | 3KB | H File | 9/17/01 11:37 AM |
| CCAXAResult.h | 3KB | H File | 9/17/01 11:37 AM |
| CCoincidentNode.h | 3KB | H File | 9/17/01 11:37 AM |
| CContourPolygon.h | 2KB | H File | 9/17/01 11:37 AM |
| CCrack.h | 6KB | H File | 9/17/01 11:37 AM |
| CCrackList.h | 2KB | H File | 9/17/01 11:37 AM |
| CCurveSubdivision.h | 3KB | H File | 9/17/01 11:37 AM |
| CEAttrib.h | 2KB | H File | 9/17/01 11:37 AM |
| CEdgeSubdivision.h | 3KB | H File | 9/17/01 11:37 AM |
| CElement.h | 15KB | H File | 9/17/01 11:37 AM |
| CEquation.h | 3KB | H File | 9/17/01 11:37 AM |
| CFemCurve.h | 2KB | H File | 9/17/01 11:37 AM |
| CFemDB.h | 39KB | H File | 9/17/01 11:37 AM |
| CFemDBSet.h | 2KB | H File | 9/17/01 11:37 AM |
| CFemDO.h | 3KB | H File | 9/17/01 11:37 AM |
| 113 object(s) | 351 KB (Disk free space: 0 bytes) | My Computer | |

FIG. 53

| Exploring -D:\FEM Builder 1.2\Source\FemLib\Include | | | |
|---|---|---|---|
| File Edit View Go Favorites Tools Help | | | |
| Name | Size | Type | Modified |
| CFemGeometry.h | 3KB | H File | 9/17/01 11:37 AM |
| CFemOptions.h | 3KB | H File | 9/17/01 11:37 AM |
| CFlowModel.h | 4KB | H File | 9/17/01 11:37 AM |
| CFractureCCI.h | 2KB | H File | 9/17/01 11:37 AM |
| CFractureCOD.h | 2KB | H File | 9/17/01 11:37 AM |
| CFractureJIntegral.h | 4KB | H File | 9/17/01 11:37 AM |
| CFractureJIntegralDPEnergyE.h | 1KB | H File | 9/17/01 11:37 AM |
| CFractureJIntegralDPEnergy.h | 3KB | H File | 9/17/01 11:37 AM |
| CFractureMechanics.h | 1KB | H File | 9/17/01 11:37 AM |
| CGPDistortionCheck.h | 1KB | H File | 9/17/01 11:37 AM |
| CGroup.h | 4KB | H File | 9/17/01 11:37 AM |
| CInsert2DFlaw.h | 5KB | H File | 9/17/01 11:37 AM |
| CIsentropicFlow.h | 2KB | H File | 9/17/01 11:37 AM |
| CMesh.h | 3KB | H File | 9/17/01 11:37 AM |
| CMesh2D.h | 4KB | H File | 9/17/01 11:37 AM |
| CMesh3D.h | 5KB | H File | 9/17/01 11:37 AM |
| CMeshAttribute.h | 3KB | H File | 9/17/01 11:37 AM |
| CMeshElement2D.h | 4KB | H File | 9/17/01 11:37 AM |
| CMeshMapped2D.h | 7KB | H File | 9/17/01 11:37 AM |
| CMeshMapped3D.h | 4KB | H File | 9/17/01 11:37 AM |
| CMeshSmooth.h | 3KB | H File | 9/17/01 11:37 AM |
| CMeshSubdivision.h | 4KB | H File | 9/17/01 11:37 AM |
| CMeshTrans3D.h | 5KB | H File | 9/17/01 11:37 AM |
| 113 object(s) | 351 KB (Disk free space: 0 bytes) | My Computer | |

FIG. 54

| Exploring -D:\FEM Builder 1.2\Source\FemLib\Include | | | |
|---|---|---|---|
| File Edit View Go Favorites Tools Help | | | |
| Name | Size | Type | Modified |
| CMoveCopy.h | 5KB | H File | 9/17/01 11:37 AM |
| CNode.h | 2KB | H File | 9/17/01 11:37 AM |
| COrient.h | 2KB | H File | 9/17/01 11:37 AM |
| CQuadrant.h | 5KB | H File | 9/17/01 11:37 AM |
| CRdCrackCombustionData.h | 2KB | H File | 9/17/01 11:37 AM |
| CRefineMesh.h | 7KB | H File | 9/17/01 11:37 AM |
| CResult.h | 11KB | H File | 9/17/01 11:37 AM |
| CSindaAttrib.h | 2KB | H File | 9/17/01 11:37 AM |
| CSindaNetwork.h | 7KB | H File | 9/17/01 11:37 AM |
| CSubModel.h | 2KB | H File | 9/17/01 11:37 AM |
| CSweepModel.h | 3KB | H File | 9/17/01 11:37 AM |
| CThermalAblation.h | 3KB | H File | 9/17/01 11:37 AM |
| CWrCrackCombustionData.h | 2KB | H File | 9/17/01 11:37 AM |
| CWrSindaData.h | 3KB | H File | 9/17/01 11:37 AM |
| FemEntityType.h | 6KB | H File | 9/17/01 11:37 AM |
| FemStddfn.h | 2KB | H File | 9/17/01 11:37 AM |
| GElementContour.h | 3KB | H File | 9/17/01 11:37 AM |
| GElementDistortion.h | 2KB | H File | 9/17/01 11:37 AM |
| GElementFun.h | 3KB | H File | 9/17/01 11:37 AM |
| GElementGInt.h | 4KB | H File | 9/17/01 11:37 AM |
| GElementInfo.h | 3KB | H File | 9/17/01 11:37 AM |
| GElementNCIP.h | 3KB | H File | 9/17/01 11:37 AM |
| GElementNCPP.h | 2KB | H File | 9/17/01 11:38 AM |
| 113 object(s) | 351 KB (Disk free space: 0 bytes) | My Computer | |

FIG. 55

| Exploring -D:\FEM Builder 1.2\Source\FemLib\Include | | | |
|---|---|---|---|
| File Edit View Go Favorites Tools Help | | | |
| Name | Size | Type | Modified |
| CElementNCVI.h | 2KB | H File | 9/17/01 11:38 AM |
| GElementOrient.h | 1KB | H File | 9/17/01 11:38 AM |
| GElementSF.h | 2KB | H File | 9/17/01 11:38 AM |
| GElementSFD.h | 3KB | H File | 9/17/01 11:38 AM |
| GElementSFDD.h | 4KB | H File | 9/17/01 11:38 AM |
| GMeshFun.h | 1KB | H File | 9/17/01 11:38 AM |
| GPointFun.h | 1KB | H File | 9/17/01 11:38 AM |
| GRdAnsysRes.h | 3KB | H File | 9/17/01 11:38 AM |
| GSindaFun.h | 1KB | H File | 9/17/01 11:38 AM |
| RdAbaqus.h | 6KB | H File | 9/17/01 11:38 AM |
| RdAbaqusFIF.h | 1KB | H File | 9/17/01 11:38 AM |
| RdAbaqusFOF.h | 2KB | H File | 9/17/01 11:38 AM |
| RdAbaqusInput.h | 3KB | H File | 9/17/01 11:38 AM |
| RdAnsysCDB.h | 6KB | H File | 9/17/01 11:38 AM |
| RdAnsysRes.h | 4KB | H File | 9/17/01 11:38 AM |
| RdAschar.h | 5KB | H File | 9/17/01 11:38 AM |
| RdCCM.h | 2KB | H File | 9/17/01 11:38 AM |
| RdCDCA.h | 2KB | H File | 9/17/01 11:38 AM |
| RdFemDB.h | 2KB | H File | 9/17/01 11:38 AM |
| RdFluent.h | 5KB | H File | 9/17/01 11:38 AM |
| RdFluentJ10.h | 3KB | H File | 9/17/01 11:38 AM |
| RdGridGen.h | 2KB | H File | 9/17/01 11:38 AM |
| 113 object(s) | 351 KB (Disk free space: 0 bytes) | My Computer | |

FIG. 56

| Exploring -D:\FEM Builder 1.2\Source\FemLib\Include | | | |
|---|---|---|---|
| File Edit View Go Favorites Tools Help | | | |
| Name | Size | Type | Modified |
| RdIdeasMS.h | 4KB | H File | 9/17/01 11:38 AM |
| RdPatran.h | 3KB | H File | 9/17/01 11:38 AM |
| RdRecess.h | 3KB | H File | 9/17/01 11:38 AM |
| RdSharp.h | 3KB | H File | 9/17/01 11:38 AM |
| RdSinda.h | 1KB | H File | 9/17/01 11:38 AM |
| RdSinGen.h | 1KB | H File | 9/17/01 11:38 AM |
| RdTexChem.h | 2KB | H File | 9/17/01 11:38 AM |
| RWAbaqus.h | 1KB | H File | 9/17/01 11:38 AM |
| RWAnsys.h | 2KB | H File | 9/17/01 11:38 AM |
| RWIdeasMS.h | 2KB | H File | 9/17/01 11:38 AM |
| WrAbaqus.h | 6KB | H File | 9/17/01 11:38 AM |
| WrAnsysCDB.h | 3KB | H File | 9/17/01 11:38 AM |
| WrCCM.h | 2KB | H File | 9/17/01 11:38 AM |
| WrCDCA.h | 3KB | H File | 9/17/01 11:38 AM |
| WrFemDB.h | 2KB | H File | 9/17/01 11:38 AM |
| WrFluent.h | 8KB | H File | 9/17/01 11:38 AM |
| WrIdeasMS.h | 4KB | H File | 9/17/01 11:38 AM |
| WrPatran.h | 3KB | H File | 9/17/01 11:38 AM |
| WrPatranRes.h | 2KB | H File | 9/17/01 11:38 AM |
| WrRecess.h | 5KB | H File | 9/17/01 11:38 AM |
| WrSinda.h | 2KB | H File | 9/17/01 11:38 AM |
| WrTexChem.h | 3KB | H File | 9/17/01 11:38 AM |
| 113 object(s) | 351 KB (Disk free space: 0 bytes) | My Computer | |

FIG. 57

| Exploring -D:\FEM Builder 1.2\Source\FemLib\Interfaces | | | |
|---|---|---|---|
| File Edit View Go Favorites Tools Help | | | |
| Name | Size | Type | Modified |
| CRdCrackCombustionData.cpp | 4KB | CPP File | 9/17/01 11:38 AM |
| CWrCrackCombustionData.cpp | 2KB | CPP File | 9/17/01 11:38 AM |
| RdAbaqus.cpp | 38KB | CPP File | 9/17/01 11:38 AM |
| RdAbaqusFIF.cpp | 2KB | CPP File | 9/17/01 11:38 AM |
| GElementSFOF.h | 6KB | CPP File | 9/17/01 11:38 AM |
| RdAbaqusInput.cpp | 45KB | CPP File | 9/17/01 11:38 AM |
| RdAnsysCDB.cpp | 64KB | CPP File | 9/17/01 11:38 AM |
| RdAnsysRes.cpp | 35KB | CPP File | 9/17/01 11:38 AM |
| RdAschar.cpp | 21KB | CPP File | 9/17/01 11:38 AM |
| RdCCM.cpp | 4KB | CPP File | 9/17/01 11:38 AM |
| RdDCDCA.cpp | 4KB | CPP File | 9/17/01 11:38 AM |
| RdFemDB.cpp | 43KB | CPP File | 9/17/01 11:38 AM |
| RdFluent.cpp | 46KB | CPP File | 9/17/01 11:38 AM |
| RdFluentJ10.cpp | 23KB | CPP File | 9/17/01 11:38 AM |
| RdGridGen.cpp | 6KB | CPP File | 9/17/01 11:38 AM |
| RdIdeasMS.cpp | 49KB | CPP File | 9/17/01 11:38 AM |
| RdideasMSMaterial.cpp | 27KB | CPP File | 9/17/01 11:38 AM |
| RdPatran.cpp | 29KB | CPP File | 9/17/01 11:38 AM |
| RdRecess.cpp | 37KB | CPP File | 9/17/01 11:38 AM |
| RdSharp.h | 27KB | CPP File | 9/17/01 11:38 AM |
| RdSinda.cpp | 5KB | CPP File | 9/17/01 11:38 AM |
| RdSinGen.cpp | 4KB | CPP File | 9/17/01 11:38 AM |
| RdTexChem.cpp | 15KB | CPP File | 9/17/01 11:38 AM |
| 38 object(s) | 936 KB (Disk free space: 0 bytes) | My Computer | |

FIG. 58

| Exploring -D:\FEM Builder 1.2\Source\FemLib\Interfaces | | | |
|---|---|---|---|
| File Edit View Go Favorites Tools Help | | | |
| Name | Size | Type | Modified |
| RdIdeasMSMaterial.cpp | 27KB | CPP File | 9/17/01 11:38 AM |
| RdPatran.h | 29KB | CPP File | 9/17/01 11:38 AM |
| RdRecess.cpp | 37KB | CPP File | 9/17/01 11:38 AM |
| RdSharp.cpp | 27KB | CPP File | 9/17/01 11:38 AM |
| RdSinda.cpp | 5KB | CPP File | 9/17/01 11:38 AM |
| RdSinGen.cpp | 4KB | CPP File | 9/17/01 11:38 AM |
| RdTexChem.cpp | 15KB | CPP File | 9/17/01 11:38 AM |
| RWAbaqus.cpp | 10KB | CPP File | 9/17/01 11:38 AM |
| RWAnsys.cpp | 20KB | CPP File | 9/17/01 11:38 AM |
| RWIdeasMS.cpp | 19KB | CPP File | 9/17/01 11:38 AM |
| WrAbaqus.cpp | 36KB | CPP File | 9/17/01 11:38 AM |
| WrAnsysCDB.h | 34KB | CPP File | 9/17/01 11:38 AM |
| WrCCM.cpp | 6KB | CPP File | 9/17/01 11:38 AM |
| WrCDCA.cpp | 12KB | CPP File | 9/17/01 11:38 AM |
| WrFemDB.cpp | 37KB | CPP File | 9/17/01 11:38 AM |
| WrFluent.cpp | 65KB | CPP File | 9/17/01 11:38 AM |
| WrIdeasMS.cp | 44KB | CPP File | 9/17/01 11:38 AM |
| WrIdeasMSMaterial.cpp | 27KB | CPP File | 9/17/01 11:38 AM |
| WrPatran.cpp | 33KB | CPP File | 9/17/01 11:38 AM |
| WrRecess.cpp | 35KB | CPP File | 9/17/01 11:38 AM |
| WrSinda.cpp | 19KB | CPP File | 9/17/01 11:38 AM |
| WrTexChem.cpp | 22KB | CPP File | 9/17/01 11:38 AM |
| 38 object(s) | 936 KB (Disk free space: 0 bytes) | My Computer | |

FIG. 59

| Exploring -D:\FEM Builder 1.2\Source\Fem\FemPython | | | |
|---|---|---|---|
| File Edit View Go Favorites Tools Help | | | |
| Name | Size | Type | Modified |
| FEDoc.cpp | 1KB | CPP File | 9/17/01 11:38 AM |
| FEDoc.h | 1KB | H File | 9/17/01 11:38 AM |
| FEM.cpp | 6KB | CPP File | 9/17/01 11:38 AM |
| FEM_ExtractFileNames.hpp | 4KB | CPP File | 9/17/01 11:38 AM |
| FEM_FEDoc.hpp | 6KB | HPP File | 9/17/01 11:38 AM |
| FEM_FEModel.hpp | 31KB | HPP File | 9/17/01 11:38 AM |
| FEM_FEModelBC.hpp | 32KB | HPP File | 9/17/01 11:38 AM |
| FEM_FEModelColor.hpp | 2KB | HPP File | 9/17/01 11:38 AM |
| FEM_FEModelCurve.hpp | 17KB | HPP File | 9/17/01 11:38 AM |
| FEM_FEModelDelete.hpp | 3KB | HPP File | 9/17/01 11:38 AM |
| FEM_FEModelElement.hpp | 13KB | HPP File | 9/17/01 11:38 AM |
| FEM_FEModelEquation.hpp | 6KB | HPP File | 9/17/01 11:38 AM |
| FEM_FEModelGroup.hpp | 3KB | HPP File | 9/17/01 11:38 AM |
| FEM_FEModelInterface.hpp | 32KB | HPP File | 9/17/01 11:38 AM |
| FEM_FEModelList.hpp | 5KB | HPP File | 9/17/01 11:38 AM |
| FEM_FEModelMaterial.hpp | 3KB | HPP File | 9/17/01 11:38 AM |
| FEM_FEModelMesh.hpp | 15KB | HPP File | 9/17/01 11:38 AM |
| FEM_FEModelMoveCopy.hpp | 11KB | HPP File | 9/17/01 11:38 AM |
| FEM_FEModelNode.hpp | 7KB | HPP File | 9/17/01 11:38 AM |
| FEM_FEModelPoint.hpp | 5KB | HPP File | 9/17/01 11:38 AM |
| FEM_FEModelPostprocessing.hpp | 15KB | HPP File | 9/17/01 11:38 AM |
| FEM_FEModelRegion.hpp | 2KB | HPP File | 9/17/01 11:38 AM |
| FEM_FEModelResult.hpp | 11KB | HPP File | 9/17/01 11:38 AM |
| 65 object(s) | 556 KB (Disk free space: 0 bytes) | My Computer | |

FIG. 60

| Name | Size | Type | Modified |
|---|---|---|---|
| FEM_FEModelSubModel.hpp | 3KB | HPP File | 9/17/01 11:38 AM |
| FEM_FEModelSurface.hpp | 11KB | HPP File | 9/17/01 11:38 AM |
| FEM_FEModelSweep.hpp | 2KB | HPP File | 9/17/01 11:38 AM |
| FEM_FEModelSystem.hpp | 3KB | HPP File | 9/17/01 11:38 AM |
| FEM_FEModelTools.hpp | 3KB | HPP File | 9/17/01 11:38 AM |
| FEM_FEModelVolume.hpp | 9KB | HPP File | 9/17/01 11:38 AM |
| FEM_FEProperty.hpp | 9KB | HPP File | 9/17/01 11:38 AM |
| FEM_FEPropertyGroup.hpp | 7KB | HPP File | 9/17/01 11:38 AM |
| FEM_FEResult.hpp | 15KB | HPP File | 9/17/01 11:38 AM |
| FEModel.cpp | 5KB | CPP File | 9/17/01 11:38 AM |
| FEModel.h | 19KB | H File | 9/17/01 11:38 AM |
| FEModelBC.cpp | 39KB | CPP File | 9/17/01 11:38 AM |
| FEModelColor.cpp | 2KB | CPP File | 9/17/01 11:38 AM |
| FEModelCurve.cpp | 14KB | CPP File | 9/17/01 11:38 AM |
| FEModelDelete.cpp | 3KB | CPP File | 9/17/01 11:38 AM |
| FEModelElement.cpp | 14KB | CPP File | 9/17/01 11:38 AM |
| FEModelEquation.cpp | 3KB | CPP File | 9/17/01 11:38 AM |
| FEModelGroup.cpp | 5KB | CPP File | 9/17/01 11:38 AM |
| FEModelInterface.cpp | 49KB | CPP File | 9/17/01 11:38 AM |
| FEModelList.cpp | 5KB | CPP File | 9/17/01 11:38 AM |
| FEModelMaterial.cpp | 1KB | CPP File | 9/17/01 11:38 AM |
| FEModelMesh.cpp | 22KB | CPP File | 9/17/01 11:38 AM |
| FEModelMoveCopy.cpp | 13KB | CPP File | 9/17/01 11:38 AM |

FIG. 61

| Name | Size | Type | Modified |
|---|---|---|---|
| FEModelMaterial.cpp | 1KB | CPP File | 9/17/01 11:38 AM |
| FEModelMesh.cpp | 22KB | CPP File | 9/17/01 11:38 AM |
| FEModelMoveCopy.cpp | 13KB | CPP File | 9/17/01 11:38 AM |
| FEModelNode.cpp | 7KB | CPP File | 9/17/01 11:38 AM |
| FEModelPoint.cpp | 5KB | CPP File | 9/17/01 11:38 AM |
| FEModelPostprocessing.cpp | 14KB | CPP File | 9/17/01 11:38 AM |
| FEModelRegion.cpp | 2KB | CPP File | 9/17/01 11:38 AM |
| FEModelResult.cpp | 9KB | CPP File | 9/17/01 11:38 AM |
| FEModelSubModel.cpp | 3KB | CPP File | 9/17/01 11:38 AM |
| FEModelSurface.cpp | 11KB | CPP File | 9/17/01 11:38 AM |
| FEModelSweep.cpp | 2KB | CPP File | 9/17/01 11:38 AM |
| FEModelSystem.cpp | 4KB | CPP File | 9/17/01 11:38 AM |
| FEModelVolume.cpp | 8KB | CPP File | 9/17/01 11:38 AM |
| FemPython.dsp | 10KB | DSP File | 9/17/01 11:38 AM |
| FemPython.dsw | 3KB | DSW File | 9/17/01 11:38 AM |
| FEProperty.cpp | 4KB | CPP File | 9/17/01 11:38 AM |
| FEProperty.h | 2KB | H File | 9/17/01 11:38 AM |
| FEPropertyGroup.cpp | 3KB | CPP File | 9/17/01 11:38 AM |
| FEPropertyGroup.h | 1KB | H File | 9/17/01 11:38 AM |
| FEResult.cpp | 10KB | CPP File | 9/17/01 11:38 AM |
| FEResult.h | 2KB | H File | 9/17/01 11:38 AM |
| FEStddfn.h | 1KB | H File | 9/17/01 11:38 AM |

FIG. 62

| Exploring -D:\FEM Builder 1.2\Source\SciEngLib\Graphics | | | |
|---|---|---|---|
| File Edit View Go Favorites Tools Help | | | |
| Name | Size | Type | Modified |
| CColorButton.cpp | 6KB | CPP File | 9/17/01 11:41 AM |
| CDeviceDC.cpp | 9KB | CPP File | 9/17/01 11:41 AM |
| CDisplayList.cpp | 20KB | CPP File | 9/17/01 11:41 AM |
| CDisplayListHL.cpp | 12KB | CPP File | 9/17/01 11:41 AM |
| CMSWinDC.cpp | 9KB | CPP File | 9/17/01 11:41 AM |
| COpenGLDC.cpp | 22KB | CPP File | 9/21/01 7:04 AM |
| CRubberBand.cpp | 6KB | CPP File | 9/17/01 11:41 AM |
| CViewDC.cpp | 45KB | CPP File | 9/21/01 7:04 AM |
| CXYPlotAxis.cpp | 8KB | CPP File | 9/17/01 11:41 AM |
| CXYPlotCurve.cpp | 19KB | CPP File | 9/17/01 11:41 AM |
| CXYPlotAData.cpp | 10KB | CPP File | 9/17/01 11:41 AM |
| DrawSymbol.cpp | 12KB | CPP File | 9/17/01 11:41 AM |
| SciEngColor.cpp | 7KB | CPP File | 9/17/01 11:41 AM |
| SciEngDraw.cpp | 2KB | CPP File | 9/17/01 11:41 AM |

14 object(s)   181KB (Disk free space: 0 bytes)   My Computer

FIG. 69

| Exploring -D:\FEM Builder 1.2\Source\SciEngLib\Include | | | |
|---|---|---|---|
| File Edit View Go Favorites Tools Help | | | |
| Name | Size | Type | Modified |
| CAArray.h | 3KB | H File | 9/17/01 11:41 AM |
| CAArray.hpp | 4KB | HPP File | 9/17/01 11:41 AM |
| CAList.h | 2KB | H File | 9/17/01 11:41 AM |
| CAList.hpp | 4KB | HPP File | 9/17/01 11:41 AM |
| CCFormat.h | 2KB | H File | 9/17/01 11:41 AM |
| CChemicalReaction.h | 3KB | H File | 9/17/01 11:41 AM |
| CChemicalSpecie.h | 2KB | H File | 9/17/01 11:41 AM |
| CColorButton.h | 3KB | H File | 9/17/01 11:41 AM |
| CCompositeProperty.h | 3KB | H File | 9/17/01 11:41 AM |
| CCurve.h | 4KB | H File | 9/17/01 11:41 AM |
| CCurveFit.h | 2KB | H File | 9/17/01 11:41 AM |
| CCurveSegment.h | 3KB | H File | 9/17/01 11:41 AM |
| CDateD.h | 2KB | H File | 9/17/01 11:41 AM |
| CDeviceDC.h | 5KB | H File | 9/17/01 11:41 AM |
| CDisplayList.h | 14KB | H File | 9/17/01 11:41 AM |
| CDisplayListHL.h | 3KB | H File | 9/17/01 11:41 AM |
| CDoubleList.h | 2KB | H File | 9/17/01 11:41 AM |
| CEdge.h | 2KB | H File | 9/17/01 11:41 AM |
| CEList.h | 3KB | H File | 9/17/01 11:41 AM |
| CEList.hpp | 8KB | HPP File | 9/17/01 11:41 AM |
| CEllipticIntegral.h | 2KB | H File | 9/17/01 11:41 AM |
| CEntity.h | 4KB | H File | 9/17/01 11:41 AM |
| CFileIO.h | 4KB | H File | 9/17/01 11:41 AM |

117 object(s)   288KB (Disk free space: 0 bytes)   My Computer

FIG. 70

| Exploring -D:\FEM Builder 1.2\Source\SciEngLib\Include | | | |
|---|---|---|---|
| File  Edit  View  Go  Favorites  Tools  Help | | | |
| Name | Size | Type | Modified |
| CFindRoot.h | 2KB | H File | 9/17/01 11:41 AM |
| CHash.h | 3KB | H File | 9/17/01 11:41 AM |
| CIntergrate.h | 3KB | H File | 9/17/01 11:41 AM |
| CIntegrateODE.h | 5KB | H File | 9/17/01 11:41 AM |
| CInterface.h | 2KB | H File | 9/17/01 11:41 AM |
| CIntersectCurves.h | 2KB | H File | 9/17/01 11:41 AM |
| CIntList.h | 2KB | H File | 9/17/01 11:41 AM |
| CLeastSquareFit.h | 1KB | H File | 9/17/01 11:41 AM |
| CLEList.h | 2KB | H File | 9/17/01 11:41 AM |
| CLEList.hpp | 6KB | HPP File | 9/17/01 11:41 AM |
| CLinkedList.h | 2KB | H File | 9/17/01 11:41 AM |
| CLinkedList.hpp | 6KB | HPP File | 9/17/01 11:41 AM |
| CListFile.h | 2KB | H File | 9/17/01 11:41 AM |
| CMaterialDB.h | 2KB | H File | 9/17/01 11:41 AM |
| CMatID.h | 3KB | H File | 9/17/01 11:41 AM |
| CMSWinDC.h | 3KB | H File | 9/17/01 11:41 AM |
| CNamed.h | 2KB | H File | 9/17/01 11:41 AM |
| CNEList.h | 2KB | H File | 9/17/01 11:41 AM |
| CNEList.hpp | 4KB | HPP File | 9/17/01 11:41 AM |
| CNewtonRaphson.h | 2KB | H File | 9/17/01 11:41 AM |
| CNTable.hpp | 3KB | HPP File | 9/17/01 11:41 AM |
| COpenGLDC.h | 5KB | H File | 9/21/01 7:04 AM |
| COptimize1D.h | 3KB | H File | 9/17/01 11:41 AM |
| 117 object(s) | 288KB (Disk free space: 0 bytes) | | My Computer |

FIG. 71

| Exploring -D:\FEM Builder 1.2\Source\SciEngLib\Include | | | |
|---|---|---|---|
| File  Edit  View  Go  Favorites  Tools  Help | | | |
| Name | Size | Type | Modified |
| COptimizeND.h | 3KB | H File | 9/17/01 11:41 AM |
| CPrpAnnotation.h | 2KB | H File | 9/17/01 11:41 AM |
| CPrpAttr.h | 2KB | H File | 9/17/01 11:41 AM |
| CPrpDB.h | 3KB | H File | 9/17/01 11:41 AM |
| CPrpGroup.h | 2KB | H File | 9/17/01 11:41 AM |
| CPrpNote.h | 1KB | H File | 9/17/01 11:41 AM |
| CPrpTable.h | 2KB | H File | 9/17/01 11:41 AM |
| CPt.h | 2KB | H File | 9/17/01 11:41 AM |
| CRelate.h | 2KB | H File | 9/17/01 11:41 AM |
| CRelate.hpp | 1KB | HPP File | 9/17/01 11:41 AM |
| CRubberBand.h | 2KB | H File | 9/17/01 11:41 AM |
| CSet.h | 2KB | H File | 9/17/01 11:41 AM |
| CSet.hpp | 6KB | HPP File | 9/17/01 11:41 AM |
| CSetArray.h | 6KB | H File | 9/17/01 11:41 AM |
| CSpline.h | 2KB | H File | 9/17/01 11:41 AM |
| CSurface.hpp | 11KB | HPP File | 9/17/01 11:41 AM |
| CSurfaceEdge.h | 2KB | H File | 9/17/01 11:41 AM |
| CSurfaceFit.h | 3KB | H File | 9/17/01 11:41 AM |
| CSurfacePatch.h | 3KB | H File | 9/17/01 11:41 AM |
| CSystem.h | 3KB | H File | 9/17/01 11:41 AM |
| CTable.h | 4KB | H File | 9/17/01 11:41 AM |
| CTableCell.h | 3KB | H File | 9/17/01 11:41 AM |
| CText.h | 3KB | H File | 9/17/01 11:41 AM |
| 117 object(s) | 288KB (Disk free space: 0 bytes) | | My Computer |

FIG. 72

| Name | Size | Type | Modified |
|---|---|---|---|
| CTextFont.h | 2KB | H File | 9/17/01 11:41 AM |
| CTextFontDialog.h | 1KB | H File | 9/17/01 11:41 AM |
| CTimeDate.h | 2KB | H File | 9/17/01 11:41 AM |
| CTimeMS.h | 2KB | H File | 9/17/01 11:41 AM |
| CUnitSystem.h | 4KB | H File | 9/17/01 11:41 AM |
| CViewDC.h | 10KB | H File | 9/21/01 7:04 AM |
| CViewDCDef.h | 2KB | H File | 9/17/01 11:41 AM |
| CVolume.h | 4KB | H File | 9/17/01 11:41 AM |
| CWorkPlane.h | 4KB | H File | 9/17/01 11:41 AM |
| CXYPlotAxis.h | 3KB | H File | 9/17/01 11:41 AM |
| CXYPlotCurve.h | 5KB | H File | 9/17/01 11:41 AM |
| CXYPlotData.h | 3KB | H File | 9/21/01 7:04 AM |
| DrawSymbol.h | 2KB | H File | 9/17/01 11:41 AM |
| MatProperty.h | 2KB | H File | 9/17/01 11:41 AM |
| MatPropertyInfo.h | 2KB | H File | 9/17/01 11:41 AM |
| RdFortranBinary.h | 3KB | H File | 9/17/01 11:41 AM |
| RdMaterialDB.h | 2KB | H File | 9/17/01 11:41 AM |
| RdPrpDB.h | 2KB | H File | 9/17/01 11:41 AM |
| RdTableFile.h | 2KB | H File | 9/17/01 11:41 AM |
| SciEngBit.h | 1KB | H File | 9/17/01 11:41 AM |
| SciEngBit.hpp | 1KB | HPP File | 9/17/01 11:41 AM |
| SciEngColor.h | 3KB | H File | 9/17/01 11:41 AM |
| SciEngCSystem.h | 2KB | H File | 9/17/01 11:41 AM |

117 object(s) | 288KB (Disk free space: 0 bytes) | My Computer

FIG. 73

| Name | Size | Type | Modified |
|---|---|---|---|
| SciEngCurve.h | 3KB | H File | 9/17/01 11:41 AM |
| SciEngCurveFit.h | 7KB | H File | 9/17/01 11:41 AM |
| SciEngDraw.h | 1KB | H File | 9/17/01 11:41 AM |
| SciEngError.h | 1KB | H File | 9/17/01 11:41 AM |
| SciEngFile.h | 2KB | H File | 9/17/01 11:41 AM |
| SciEngLib.h | 3KB | H File | 9/17/01 11:41 AM |
| SciEngMath.h | 4KB | H File | 9/17/01 11:41 AM |
| SciEngMath.hpp | 4KB | HPP File | 9/17/01 11:41 AM |
| SciEngMatrix.h | 3KB | H File | 9/17/01 11:41 AM |
| SciEngMove.h | 1KB | H File | 9/17/01 11:41 AM |
| SciEngMove.hpp | 1KB | HPP File | 9/17/01 11:41 AM |
| SciEngPoint.h | 4KB | H File | 9/17/01 11:41 AM |
| SciEngPolygon.h | 1KB | H File | 9/17/01 11:41 AM |
| SciEngResult.h | 2KB | H File | 9/17/01 11:41 AM |
| SciEngSort.h | 1KB | H File | 9/17/01 11:41 AM |
| SciEngSort.hpp | 5KB | HPP File | 9/17/01 11:41 AM |
| SciEngStddfn.h | 3KB | H File | 9/17/01 11:41 AM |
| SciEngStr.h | 3KB | H File | 9/17/01 11:41 AM |
| SciEngSurface.h | 1KB | H File | 9/17/01 11:41 AM |
| SciEngVector.h | 2KB | H File | 9/17/01 11:41 AM |
| SciEngVector.hpp | 1KB | HPP File | 9/17/01 11:41 AM |
| StdAfx.h | 1KB | H File | 9/17/01 11:41 AM |
| WrMaterialDB.h | 1KB | H File | 9/17/01 11:41 AM |

117 object(s) | 288KB (Disk free space: 0 bytes) | My Computer

FIG. 74

| Exploring -D:\FEM Builder 1.2\Source\SciEngLib\Include | | | |
|---|---|---|---|
| File Edit View Go Favorites Tools Help | | | |
| Name | Size | Type | Modified |
| SciEngError.h | 1KB | H File | 9/17/01 11:41 AM |
| SciEngFile.h | 2KB | H File | 9/17/01 11:41 AM |
| SciEngLib.h | 3KB | H File | 9/17/01 11:41 AM |
| SciEngMath.h | 4KB | H File | 9/17/01 11:41 AM |
| SciEngMath.hpp | 4KB | HPP File | 9/17/01 11:41 AM |
| SciEngMatrix.h | 3KB | H File | 9/17/01 11:41 AM |
| SciEngMove.h | 1KB | H File | 9/17/01 11:41 AM |
| SciEngMove.hpp | 1KB | HPP File | 9/17/01 11:41 AM |
| SciEngPoint.h | 4KB | H File | 9/17/01 11:41 AM |
| SciEngPolygon.h | 1KB | H File | 9/17/01 11:41 AM |
| SciEngResult.h | 2KB | H File | 9/17/01 11:41 AM |
| SciEngSort.h | 1KB | H File | 9/17/01 11:41 AM |
| SciEngSort.hpp | 5KB | HPP File | 9/17/01 11:41 AM |
| SciEngStddfn.h | 3KB | H File | 9/17/01 11:41 AM |
| SciEngStr.h | 3KB | H File | 9/17/01 11:41 AM |
| SciEngSurface.h | 1KB | H File | 9/17/01 11:41 AM |
| SciEngVector.h | 2KB | H File | 9/17/01 11:41 AM |
| SciEngVector.hpp | 1KB | HPP File | 9/17/01 11:41 AM |
| StdAfx.h | 1KB | H File | 9/17/01 11:41 AM |
| WrMaterialDB.h | 1KB | H File | 9/17/01 11:41 AM |
| WrPrpDB.h | 2KB | H File | 9/17/01 11:41 AM |
| WrTableFile.h | 1KB | H File | 9/17/01 11:41 AM |
| 117 object(s) | 288KB (Disk free space: 0 bytes) | My Computer | |

FIG. 75

| Exploring -D:\FEM Builder 1.2\Source\SciEngLib\List | | | |
|---|---|---|---|
| File Edit View Go Favorites Tools Help | | | |
| Name | Size | Type | Modified |
| CDoubleList.cpp | 3KB | CPP File | 9/17/01 11:41 AM |
| CHash.cpp | 17KB | CPP File | 9/17/01 11:41 AM |
| CIntList.cpp | 4KB | CPP File | 9/17/01 11:41 AM |
| 3 object(s) | 21.4KB (Disk free space: 0 bytes) | My Computer | |

FIG. 76

| Exploring -D:\FEM Builder 1.2\Source\SciEngLib\Material | | | |
|---|---|---|---|
| File  Edit  View  Go  Favorites  Tools  Help | | | |
| Name | Size | Type | Modified |
| CChemicalReaction.cpp | 5KB | CPP File | 9/17/01 11:41 AM |
| CCompositeProperty.cpp | 8KB | CPP File | 9/17/01 11:41 AM |
| CMaterialDB.cpp | 6KB | CPP File | 9/17/01 11:41 AM |
| CMatID.cpp | 5KB | CPP File | 9/17/01 11:41 AM |
| CNTable.cpp | 7KB | CPP File | 9/17/01 11:41 AM |
| CPrpAnnotation.cpp | 3KB | CPP File | 9/17/01 11:41 AM |
| CPrpAttr.cpp | 4KB | CPP File | 9/17/01 11:41 AM |
| CPrpDB.cpp | 4KB | CPP File | 9/17/01 11:41 AM |
| CPrpGroup.cpp | 5KB | CPP File | 9/17/01 11:41 AM |
| CPrpTable.cpp | 2KB | CPP File | 9/17/01 11:41 AM |
| CTable.cpp | 12KB | CPP File | 9/17/01 11:41 AM |
| CTableCell.cpp | 4KB | CPP File | 9/17/01 11:41 AM |
| MatPropertyInfo.cpp | 23KB | CPP File | 9/17/01 11:41 AM |
| RdMaterialDB.cpp | 7KB | CPP File | 9/17/01 11:41 AM |
| RdPrpDB.cpp | 7KB | CPP File | 9/17/01 11:41 AM |
| WrMaterialDB.cpp | 3KB | CPP File | 9/17/01 11:41 AM |
| WrPrpDB.cpp | 6KB | CPP File | 9/17/01 11:41 AM |
| 17 object(s) | 103KB (Disk free space: 0 bytes) | My Computer | |

FIG. 77

| Exploring -D:\FEM Builder 1.2\Source\SciEngLib\Math | | | |
|---|---|---|---|
| File  Edit  View  Go  Favorites  Tools  Help | | | |
| Name | Size | Type | Modified |
| CCurveFit.cpp | 3KB | CPP File | 9/17/01 11:41 AM |
| CEllipticIntegral.cpp | 6KB | CPP File | 9/17/01 11:41 AM |
| CFindRoot.cpp | 8KB | CPP File | 9/17/01 11:41 AM |
| CIntegrate.cpp | 20KB | CPP File | 9/17/01 11:41 AM |
| CIntegrateODE.cpp | 11KB | CPP File | 9/17/01 11:41 AM |
| CLeastSquareFit.cpp | 3KB | CPP File | 9/17/01 11:41 AM |
| CNewtonRaphson.cpp | 7KB | CPP File | 9/17/01 11:41 AM |
| COptimize1D.cpp | 9KB | CPP File | 9/17/01 11:41 AM |
| COptimizeND.cpp | 8KB | CPP File | 9/17/01 11:41 AM |
| CSpline.cpp | 6KB | CPP File | 9/17/01 11:41 AM |
| CSurfaceFit.cpp | 10KB | CPP File | 9/17/01 11:41 AM |
| SciEngCSystem.cpp | 4KB | CPP File | 9/17/01 11:41 AM |
| SciEngCurve.cpp | 19KB | CPP File | 9/17/01 11:41 AM |
| SciEngCurveFit.cpp | 34KB | CPP File | 9/17/01 11:41 AM |
| SciEngMath.cpp | 16KB | CPP File | 9/17/01 11:41 AM |
| SciEngMatrix.cpp | 33KB | CPP File | 9/17/01 11:41 AM |
| SciEngMove.cpp | 1KB | CPP File | 9/17/01 11:41 AM |
| SciEngPoint.cpp | 30KB | CPP File | 9/17/01 11:41 AM |
| SciEngPolygon.cpp | 5KB | CPP File | 9/17/01 11:41 AM |
| SciEngResult.cpp | 18KB | CPP File | 9/17/01 11:41 AM |
| SciEngSort.cpp | 1KB | CPP File | 9/17/01 11:41 AM |
| SciEngSurface.cpp | 11KB | CPP File | 9/17/01 11:41 AM |
| SciEngVector.cpp | 6KB | CPP File | 9/17/01 11:41 AM |
| 23 object(s) | 258KB (Disk free space: 0 bytes) | My Computer | |

FIG. 78

| Exploring -D:\FEM Builder 1.2\Source\SciEngLib\Math | | | | |
|---|---|---|---|---|
| File  Edit  View  Go  Favorites  Tools  Help | | | | |
| Name | Size | Type | Modified | |
| CELipticIntegral.cpp | 6KB | CPP File | 9/17/01 11:41 AM | |
| CFindRoot.cpp | 8KB | CPP File | 9/17/01 11:41 AM | |
| CIntegrate.cpp | 20KB | CPP File | 9/17/01 11:41 AM | |
| CIntegrateODE.cpp | 11KB | CPP File | 9/17/01 11:41 AM | |
| CLeastSquareFit.cpp | 3KB | CPP File | 9/17/01 11:41 AM | |
| CNewtonRaphson.cpp | 7KB | CPP File | 9/17/01 11:41 AM | |
| COptimize1D.cpp | 9KB | CPP File | 9/17/01 11:41 AM | |
| COptimizeND.cpp | 8KB | CPP File | 9/17/01 11:41 AM | |
| CSpline.cpp | 6KB | CPP File | 9/17/01 11:41 AM | |
| CSurfaceFit.cpp | 10KB | CPP File | 9/17/01 11:41 AM | |
| SciEngCSystem.cpp | 4KB | CPP File | 9/17/01 11:41 AM | |
| SciEngCurve.cpp | 19KB | CPP File | 9/17/01 11:41 AM | |
| SciEngCurveFit.cpp | 34KB | CPP File | 9/17/01 11:41 AM | |
| SciEngMath.cpp | 16KB | CPP File | 9/17/01 11:41 AM | |
| SciEngMatrix.cpp | 33KB | CPP File | 9/17/01 11:41 AM | |
| SciEngMove.cpp | 1KB | CPP File | 9/17/01 11:41 AM | |
| SciEngPoint.cpp | 30KB | CPP File | 9/17/01 11:41 AM | |
| SciEngPolygon.cpp | 5KB | CPP File | 9/17/01 11:41 AM | |
| SciEngResult.cpp | 18KB | CPP File | 9/17/01 11:41 AM | |
| SciEngSort.cpp | 1KB | CPP File | 9/17/01 11:41 AM | |
| SciEngSurface.cpp | 11KB | CPP File | 9/17/01 11:41 AM | |
| SciEngVector.cpp | 6KB | CPP File | 9/17/01 11:41 AM | |
| 23 object(s) | 258KB (Disk free space: 0 bytes) | My Computer | | |

FIG. 79

| Exploring -D:\FEM Builder 1.2\Source\SciEngLib\String | | | | |
|---|---|---|---|---|
| File  Edit  View  Go  Favorites  Tools  Help | | | | |
| Name | Size | Type | Modified | |
| CText.cpp | 5KB | CPP File | 9/17/01 11:41 AM | |
| CTextFont.cpp | 2KB | CPP File | 9/17/01 11:41 AM | |
| CTextFontDialog.cpp | 2KB | CPP File | 9/17/01 11:41 AM | |
| SciEngStr.cpp | 16KB | CPP File | 9/17/01 11:41 AM | |
| 4 object(s) | 23.9KB (Disk free space: 0 bytes) | My Computer | | |

| Name | Size | Type | Modified |
|---|---|---|---|
| InterfaceFemDB_1.fdb | 13KB | FDB File | 9/17/01 11:35 AM |
| InterfaceFemDB_2.fdb | 15KB | FDB File | 9/17/01 11:35 AM |
| InterfaceIdeas_1.unv | 31KB | UNV File | 9/17/01 11:35 AM |
| LessFluid.fdb | 1,507KB | FDB File | 9/17/01 11:35 AM |
| LessFluid-CustomSolve.jou | 1KB | JOU File | 9/17/01 11:35 AM |
| LessSolid.fdb | 620KB | FDB File | 9/17/01 11:35 AM |
| LineElement.fdb | 2KB | FDB File | 9/17/01 11:35 AM |
| MatProp1.pdb | 2KB | PDB File | 9/17/01 11:35 AM |
| MatProp2.pdb | 1KB | PDB File | 9/17/01 11:35 AM |
| MeshSurface.fdb | 20KB | FDB File | 9/17/01 11:35 AM |
| MeshVolume.fdb | 24KB | FDB File | 9/17/01 11:35 AM |
| MixingElbow.cas | 129KB | CAS File | 9/17/01 11:35 AM |
| MixingElbow.dat | 212KB | Movie Clip | 9/17/01 11:35 AM |
| MixingElbow.fdb | 657KB | FDB File | 9/17/01 11:35 AM |
| Nozzle1.jou | 1KB | JOU File | 9/17/01 11:35 AM |
| Nozzle1_ascii.cas | 263KB | CAS File | 9/17/01 11:35 AM |
| Nozzle1_ascii.dat | 980KB | Movie Clip | 9/17/01 11:35 AM |
| NozzleModel.cas | 172KB | CAS File | 9/17/01 11:35 AM |
| NozzleModel.dat | 365KB | Movie Clip | 9/17/01 11:35 AM |
| P&NRegions.fdb | 4KB | FDB File | 9/17/01 11:35 AM |
| PipeFlow.cas | 28KB | CAS File | 9/17/01 11:35 AM |
| PipeFlow.dat | 11KB | Movie Clip | 9/17/01 11:35 AM |
| PipeFlow.fdb | 7KB | FDB File | 9/17/01 11:35 AM |

187 object(s) — 49.2MB (Disk free space: 0 bytes) — My Computer

FIG. 88

| Name | Size | Type | Modified |
|---|---|---|---|
| PlaneE1.fdb | 8KB | FDB File | 9/17/01 11:35 AM |
| PlaneE1.fil | 30KB | FIL File | 9/17/01 11:35 AM |
| PlaneE1.inp | 3KB | INP File | 9/17/01 11:35 AM |
| PlaneE1.unv | 12KB | UNV File | 9/17/01 11:35 AM |
| PlaneE1G.fdb | 9KB | FDB File | 9/17/01 11:35 AM |
| PlaneE2.fdb | 43KB | FDB File | 9/17/01 11:35 AM |
| PlaneE2.fil | 223KB | FIL File | 9/17/01 11:35 AM |
| PlaneE2.resinp | 16KB | RESINP File | 9/17/01 11:35 AM |
| PlaneE2F.fdb | 152KB | FDB File | 9/17/01 11:35 AM |
| PlaneE2F.unv | 159KB | UNV File | 9/17/01 11:35 AM |
| PlaneS1.fdb | 10KB | FDB File | 9/17/01 11:35 AM |
| PlaneS2.fdb | 65KB | FDB File | 9/17/01 11:35 AM |
| PlaneS2.fil | 386KB | FIL File | 9/17/01 11:35 AM |
| RdAschar.plt | 79KB | PLT File | 9/17/01 11:35 AM |
| RdCCM_1.ccmout | 2KB | CCMOUT File | 9/17/01 11:35 AM |
| RdCDCA_1.cdcout | 67KB | CDCOUT File | 9/17/01 11:35 AM |
| RWAnsys1.cdb | 20KB | CDB File | 9/17/01 11:35 AM |
| RWAnsys2.cdb | 7KB | CDB File | 9/17/01 11:35 AM |
| RWIdeas1.unv | 185KB | UNV File | 9/17/01 11:35 AM |
| SBRAMSubScale.fdb | 242KB | FDB File | 9/17/01 11:35 AM |
| SelectByRegion.fdb | 4KB | FDB File | 9/17/01 11:35 AM |
| SelectCurve.fdb | 14KB | FDB File | 9/17/01 11:35 AM |
| SelectGroup.fdb | 15KB | FDB File | 9/17/01 11:35 AM |

187 object(s) — 49.2MB (Disk free space: 0 bytes) — My Computer

| Exploring -D:\FEM Builder 1.2\Test | | | |
|---|---|---|---|
| File Edit View Go Favorites Tools Help | | | |
| Name | Size | Type | Modified |
| Example4.fil | 246KB | FIL File | 9/17/01 11:35 AM |
| Example4.inp | 16KB | INP File | 9/17/01 11:35 AM |
| Example4F.fdb | 33KB | FDB File | 9/17/01 11:35 AM |
| ExpCurve.dat | 2KB | Movie Clip | 9/17/01 11:35 AM |
| fdv.nam | 1KB | NAM File | 9/17/01 11:35 AM |
| fdv.xyz | 5KB | XYZ File | 9/17/01 11:35 AM |
| fdv0001.dat | 14KB | Movie Clip | 9/17/01 11:35 AM |
| fdv3d.nam | 1KB | NAM File | 9/17/01 11:35 AM |
| fdv3d.xyz | 28KB | XYZ File | 9/17/01 11:35 AM |
| fdv3d0001.dat | 91KB | Movie Clip | 9/17/01 11:35 AM |
| FluidCFD1.fdb | 8KB | FDB File | 9/17/01 11:35 AM |
| FluidCFD1.inp | 3KB | INP File | 9/17/01 11:35 AM |
| Geometry.fdb | 22KB | FDB File | 9/17/01 11:35 AM |
| GeometryEdit_1.fdb | 3KB | FDB File | 9/17/01 11:35 AM |
| GridGen.grd | 6KB | GRD File | 9/17/01 11:35 AM |
| GridGen.p3d | 23KB | P3D File | 9/17/01 11:35 AM |
| Heat0.fdb | 8KB | FDB File | 9/17/01 11:35 AM |
| Heat0.sot | 11KB | SOT File | 9/17/01 11:35 AM |
| Heat1.fdb | 9KB | FDB File | 9/17/01 11:35 AM |
| Heat1.sot | 4KB | SOT File | 9/17/01 11:35 AM |
| HTAxisym1.fdb | 8KB | FDB File | 9/17/01 11:35 AM |
| InsertFlawLinear.fdb | 35KB | FDB File | 9/17/01 11:35 AM |
| InsertFlawQuadratic.fdb | 69KB | FDB File | 9/17/01 11:35 AM |
| 187 object(s) | 49.2MB (Disk free space: 0 bytes) | My Computer | |

FIG. 89

| Exploring -D:\FEM Builder 1.2\Test | | | |
|---|---|---|---|
| File Edit View Go Favorites Tools Help | | | |
| Name | Size | Type | Modified |
| sharp.plt | 6KB | PLT File | 9/17/01 11:35 AM |
| SinGen.gin | 27KB | GIN File | 9/17/01 11:35 AM |
| SinGen.out | 1,009KB | OUT File | 9/17/01 11:35 AM |
| Smooth2d_1.fdb | 17KB | FDB File | 9/17/01 11:35 AM |
| Smooth2d_2.fdb | 16KB | FDB File | 9/17/01 11:35 AM |
| Smooth2d_3.fdb | 54KB | FDB File | 9/17/01 11:35 AM |
| Solid1L.fdb | 9KB | FDB File | 9/17/01 11:35 AM |
| Solid1L.fil | 53KB | FIL File | 9/17/01 11:35 AM |
| Solid1L.resinp | 4KB | RESINP File | 9/17/01 11:35 AM |
| Solid1L.unv | 13KB | UNV File | 9/17/01 11:35 AM |
| Solid1Q.fdb | 20KB | FDB File | 9/17/01 11:35 AM |
| Solid1Q.fil | 133KB | FIL File | 9/17/01 11:35 AM |
| Solid1Q.resinp | 10KB | RESINP File | 9/17/01 11:35 AM |
| Solid1Q.unv | 1KB | UNV File | 9/17/01 11:35 AM |
| SolidCFD1.fdb | 9KB | FDB File | 9/17/01 11:35 AM |
| SolidCFD1.inp | 3KB | INP File | 9/17/01 11:35 AM |
| StructuralGrid.fdb | 35KB | FDB File | 9/17/01 11:35 AM |
| TexChem_1.fdb | 9KB | FDB File | 9/17/01 11:35 AM |
| TexChem_1.spatial | 13KB | SPATIAL File | 9/17/01 11:35 AM |
| ThermalGrid.unv | 8KB | UNV File | 9/17/01 11:35 AM |
| UnitCube.fdb | 7KB | FDB File | 9/17/01 11:35 AM |
| UnitSquare.fdb | 3KB | FDB File | 9/17/01 11:35 AM |
| 187 object(s) | 49.2MB (Disk free space: 0 bytes) | My Computer | |

FIG. 90

SYSTEM FOR PERFORMING COUPLED FINITE ANALYSIS

CROSS-REFERENCE TO RELATED APPLICATION

This application claims priority to U.S. Provisional Patent Application Ser. No. 60/246,399, filed Nov. 7, 2000, now abandoned.

BACKGROUND OF THE INVENTION

1. Field of the Invention

The invention pertains to the field of software, computer systems and related methods including models that operate through the use of finite analysis, finite volume, and/or finite difference techniques.

2. Description of the Related Art

Finite element, finite volume, and finite difference modeling techniques can generally be described as mathematical approximations of often-complex problems that represent physical behavior. The mathematical models are useful in designing physical apparatus or systems and in predicting the behavior of existing apparatus or systems. These models use a mesh or grid that is superimposed over the system being studied to provide a plurality of cells or elements. These elements may be modeled in multiple dimensions, for example, one, two, or three dimensions. Mathematical equations that represent or approximate physical or quantitative behavior are applied to each cell with the resultant formation of a system of equations that are expressed as matrices, and that are solved using generally known techniques of linear algebra. Such mathematical techniques commonly involve iterating through a set of equations until a threshold convergence is achieved, i.e., until the difference between successive iterations through a system of mathematical approximations becomes so small that it is suitably negligible with respect to the exact or rigorous solution of the system of equations being modeled. The term "finite analysis" is hereby defined to include finite element, finite volume and finite difference models.

A variety of patents have issued on various finite element and finite difference techniques. For example, U.S. Pat. Nos. 5,956,500 and 5,901,072 pertain to a method for incorporating boundary conditions into a finite analysis model. These patents disclose generating a finite analysis model having a finite element shim interposed between a test bar and a ground, where the characteristics of the shim are selected based upon measured natural frequencies of the test bar. U.S. Pat. No. 5,768,156 addresses a method of automatic mesh generation for finite analysis. The meshes are generated using whisker chords to form all-hexahedral elements. Similarly, U.S. Pat. No. 5,731,817 pertains to a system that generates a hexahedron mesh and then performs finite analysis on the mesh. U.S. Pat. No. 5,581,489 discloses a model generator including data input for an object to be modeled, a material information generator providing material properties for the object being modeled, a mesh processor for generating a mesh, and an output generator coupled with a finite analysis processor. U.S. Pat. Nos. 5,553,206 and 5,315,537 pertain to automatic mesh generation systems.

Finite analysis programs that provide solutions to specific problems are commercially available. For example, ABAQUS® is available from Hibbitt, Karlsson and Sorenson, Inc., of Pawtucket, R.I. to model structural mechanics and nonlinear heat transfer. ANSYS® is available from Ansys, Inc., of Canonsburg, Pa. to model structural mechanics and heat transfer. ASTMA is public domain software available from the National Aeronautics and Space Administration (NASA) that models heat transfer and ablation. I-DEAS is available from Structural Dynamics Research Corporation of Milford, Ohio to provide pre and post-processing images of the model. SINDA from Network Analysis, Inc., of Chandler, Arizona models heat transfer. TEX CHEM models chemical reactions and chemical equilibrium. RECESS is a program developed by Thiokol Propulsion of Brigham City, Utah to model internal ballistics. CDCA is a computational fluid dynamics program developed by Pennsylvania State University to model crack combustion where a fracture in a propellant affects burn condition. CCM is a similar computational fluid dynamics program available in the public domain, and is available from the Air Force Research Laboratory (AFRL).

Many specific examples of the need for finite analysis programs exist, for example, in the field of rocketry and missile maintenance. In fact, the commercial finite analysis programs that are mentioned above have many specific applications in this field. For example, the public domain ASTMA program and derivatives thereof can be used to model the burning away of material from a rocket engine nozzle.

A problem exists in the field of finite analysis modeling because engineering specialties do not encompass a wide array of specialized problems that are presented by complex physical situations. For example, the burning of a solid fuel rocket motor presents a multifaceted problem including structural mechanics, material properties, internal ballistics, chemical reactions, heat transfer, crack combustion, and fracture mechanics. An engineer who is modeling only one of these problems using a commercially available or proprietary finite analysis program for this purpose may require a full year just to become proficient at using the package. Typically, such an engineer is not trained in more than one or two of the specialty problem areas and is often incapable of running models in areas outside his or her area of expertise. Very few, if any, engineers succeed in acquiring the training that is required to model all aspects of this problem, and a team of modelers often is required to produce modeling results through a laborious process involving the transfer of model results between different engineers and/or finite analysis codes.

It is typical in the finite analysis art that there exist separate programs to model computational fluid dynamics, structural mechanics, heat transfer, internal ballistics, etc. This segregation of problems exists, in part, due to the lack of overlap in specialty areas as described above, but it also exists because the situations encountered for actual modeling purposes are very diverse and require flexibility if the model is to have optimum results. A great deal of effort may be expended to develop a comprehensive model where the usefulness of the model diminishes with its complexity.

The foregoing problem is normally addressed by a sharing of data between engineers or engineering groups that encompass multiple specialties. This sharing of data leads to additional problems. An engineer receiving model results from another engineer for further processing does not necessarily understand the model results that he or she has received, and this circumstance can lead to computational error. For example, the preceding engineer may provide results from a less thorough model than is required for optimum results in subsequent calculations, or problems may arise through the nodes of meshes being at different locations when data is passed from a first model to a second model.

Special problems also arise when an engineer receives prior calculation results and uses them as input in a subsequent model addressing a different problem because subsequent calculation results may affect input for the prior model. For example, an internal ballistics program may be used to calculate internal pressures in a solid fuel rocket motor. These pressures are subsequently used in structural mechanics calculations where the rocket fuel deforms in a visco-elastic manner. The volume changes from the structural mechanics solution have significant effects upon the internal ballistics results which, in turn, affect the structural mechanics model. Thus, a repetitive sharing and transfer of computational results is required from successive iterations until the effects of the separate programs upon one another between different runs become negligible. Furthermore, the respective modelers may even be unaware that their individual model or an aspect of their model results can affect other models that provide results including input data for subsequent models.

BRIEF SUMMARY OF THE INVENTION

Accordingly, an object of the present invention is to provide a finite analysis modeling system that permits the user to identify a joint problem for a coupled solution through the use of a graphical user interface or a scripting language.

Another object of the invention is to provide a single interface that ties or couples together a plurality of finite analysis programs for purposes of solving complex problems while maintaining flexibility.

Another object of the invention is to provide data linkages for coupling programs in a predetermined manner to facilitate coupling for the user.

Yet another object of the invention is to facilitate user-specified complex solutions without requiring the user to understand all aspects of each discipline.

These objects and advantages, as well as other objects and advantages will be apparent to those skilled in the art upon reading the attached drawings together with the accompanying specification.

A computer system, as well as associated software and methodology are provided for obtaining a joint solution through the use of multiple finite analysis programs. The system, software and methodology tie or couple together a plurality of finite analysis programs for purposes of solving complex problems while maintaining flexibility through the use of a graphical user interface.

Preferred embodiments operate in an environment of use where there is memory storage for first and second finite analysis programs. The first finite analysis program acts upon first program input values to provide first program output values based upon the first program input values. The second finite analysis program acts upon second program input values including a first joint data set having at least a subset of the first program output values. The second program output values include a second joint data set of values that can be used as first program input values. One of the first and second finite analysis programs is a computational fluid dynamics program.

As mentioned above, the software and the method, as well as the computer system in an electronically programmed state, all utilize a graphical user interface that is operable to identify a joint problem that both the first and second finite analysis programs can jointly and in combination solve, and to specify at least one criterion for a joint solution. Data processing linkages between the first and second programs, and the user, provide the first program input values to the first program. Embedded commands in the graphical user interface or related programs execute the first finite analysis program to obtain the first program output values including the first joint data set. Data processing linkages between the first and second programs then provide the second finite analysis program with second program input values including the first joint data set. Embedded commands in the graphical user interface, related programs, or a scripting language execute the second finite analysis program to provide second program output values including the second joint data set. Data processing linkages between the first and second programs then provide the first finite analysis program with first program input values including the second joint data set.

An aspect of the software, system, and method is that the criterion for the joint solution specified through the graphical user interface preferably includes an iterative convergence criterion for threshold convergence of the joint solution. The program instructions, as well as the methodology of operation, then include repeating the steps of providing data and executing the first and second programs until the specified threshold convergence criteria is achieved. This iteration, which is performed outside the boundaries of the first and second finite analytical programs, is performed automatically and without user intervention after the initial data input and execution of the first and second programs.

Another aspect of the software, system and method is that the graphical user interface is optionally used to identify the joint problem by selecting the joint problem, in combination with the computational fluid dynamics problem, to preferably include an additional finite analysis problem selected from the group consisting of structural analysis problems, heat transfer problems, chemical reaction problems, chemical equilibrium problems, internal ballistics problems, and fracture mechanics problems.

Third, fourth, fifth or additional programs may be selected in like manner and placed in the coupled or joint program execution for convergence among all of the programs. For example, where a third program is selected for use in the coupled solution, the third program acts upon third program input values selected from the group consisting of first program output values, second program output values, and combinations thereof, to provide third program output values. The third program output values include a third joint data set comprising input values selected from the group consisting of first program input values, second program input values and combinations thereof. The method of operation then includes executing the third program to produce the third program output values including the thirdjoint data set. The third joint data set is provided, as needed, providing the third joint data set to the first and second finite analysis programs with corresponding input values selected from the group consisting of first program input values, second program input values and combinations thereof. Iterative threshold convergence can then be achieved according to convergence criteria specified through the graphical user interface.

The software, system and method can be applied to a number of problems, for example, in the field of missile design and maintenance. For example, where a solid fuel rocket has maintenance operations performed on it, and these operations provide computed tomography results showing a crack in the propellant, the effect of this crack may be modeled to determine whether the crack will prevent the missile from completing its intended purpose if the missile is launched. In this case, the computational fluid dynamics program may be a crack combustion program, the system provides means for modeling crack combustion in a missile based upon computed tomography taken from a missile, and the other of the first and second programs is, by way of example, a structural analysis program.

The finite analysis may be supplemented through use of a programming language, especially an extensible object oriented scripting language that is capable of issuing calls to a variety of other programming languages. In this manner, a software screen or shell may be built to provide, for example, a function library that duplicates the GUI functionality using direct commands in the guise of scripted functions which operate across the boundaries of multiple operating systems, multiple programming languages, and/or data translations, as required to couple a plurality of programs. The scripting language preferably has looping and decisional logic capabilities giving the user infinite control over the operation of a variety of coupled finite analysis programs. The scripting language and its associated function library may optionally be accessible from the GUI.

BRIEF DESCRIPTION OF THE DRAWINGS

FIGS. 6–11 are part of the interactive online user's manual of Appendix 1; and

FIGS. 12–92 comprise the computer program listing of Appendix III.

DETAILED DESCRIPTION OF THE PREFERRED EMBODIMENTS AND METHODS

According to one of the various embodiments of the invention, there is now shown a schematic computer system that is programmed to an electronically configured state through the use of software for the performance of a method, as described above. The system, software and methodology tie or couple together a plurality of finite analysis programs for purposes of solving complex problems while maintaining flexibility through the use of a graphical user interface. By "coupling" it is meant that the results from one finite analytical model are provided to another model as input. For example, the results from a first model may be provided as input to a second model, and the results from the second model may optionally be provided as input to the first model. This process may be repeated until a user-specified convergence is achieved.

Figure 1:
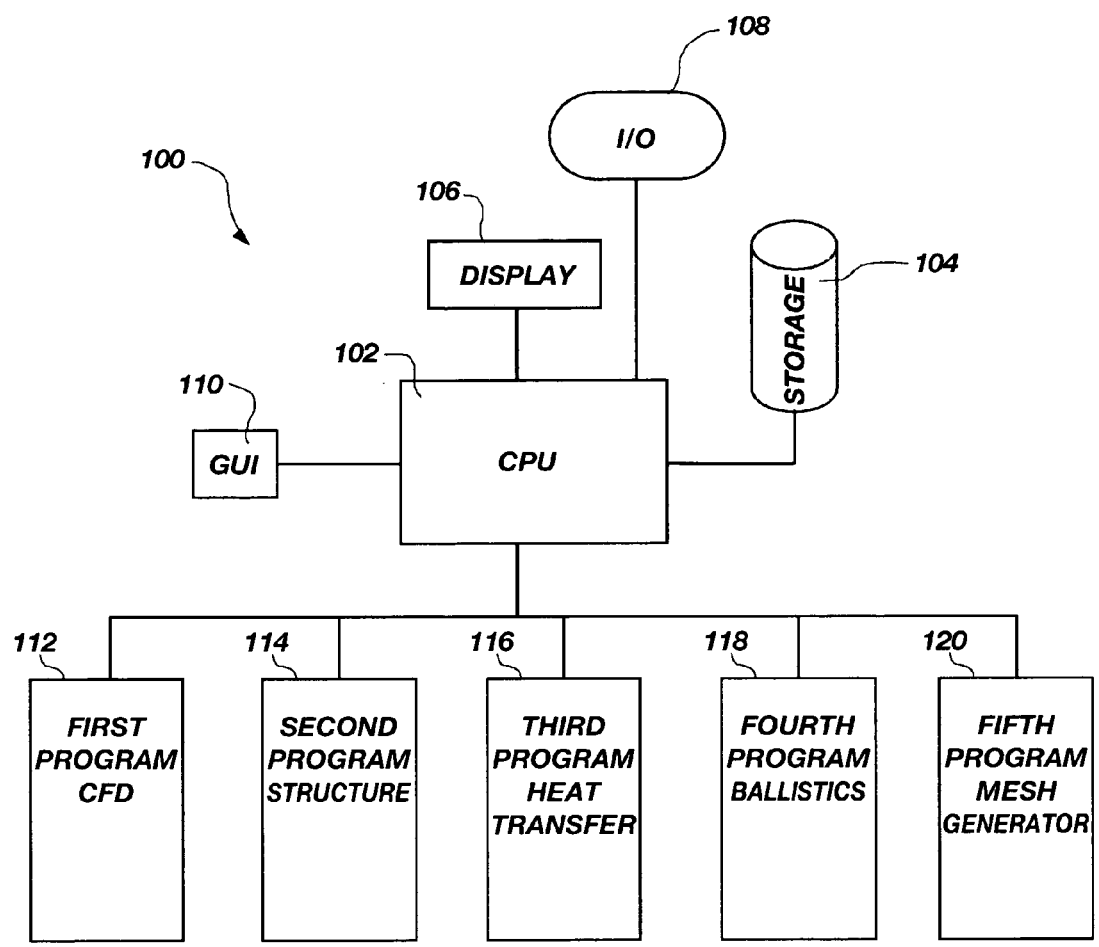
FIG. 1 is a schematic diagram of a preferred system embodiment according to one aspect of the invention.

FIG. 1 depicts a schematic diagram of a computer system 100 including a central processing unit (CPU) 102 that is linked to a magnetic or optical storage medium 104, a display 106, such as a flat panel plasma display or cathode ray tube, and input/output devices 108, such as a computer keyboard, a pointing device such as a trackball or mouse, other computers, and additional magnetic or optical storage media. The hardware components 102 through 108 of system 100 may comprise those that are found in most personal computers and engineering workstations.

As shown in FIG. 1, software from storage media 104 or I/O devices 108 has been used to program a graphical user interface (GUI), which is represented by a GUI RAM block 110. The GUI 110 is used to interface with a user through I/O devices 108 to identify a plurality of programs for coupled execution. These programs are represented by RAM blocks 112–120. Block 112 includes a first finite analysis program that provides a computational fluid dynamics solution. Block 114 includes a second finite analysis program that provides a structural solution. Block 116 includes a third finite analysis program that provides a heat transfer solution. Block 118 includes a fourth finite analysis program that provides a ballistics solution. Block 120 includes a fifth finite analysis program that provides a mesh generator program. The mesh generator program is not used in iterative convergence, but it is used to generate individual meshes for use in each of the first, second, third, fourth and fifth finite analytical programs.

The system, software and method preferably operate in an environment of use where there is memory storage for the first and second finite analysis programs corresponding to blocks 112 and 114, for example. The first finite analysis program acts upon first program input values to provide first program output values based upon the first program input values. The second finite analysis program acts upon second program input values including a first joint data set having at least a subset of the first program output values. The second program output values include a second joint data set of values that can be used as first program input values. One of the first and second finite analysis programs is a computational fluid dynamics program.

An aspect of the software, system, and method is that the criterion for the joint solution specified through the graphical user interface preferably includes an iterative convergence criterion for threshold convergence of the joint solution. The program instructions, as well as the methodology of operation, can then include repeating the steps of providing data and executing the first and second programs until the specified threshold convergence criteria is achieved. This iteration, which is performed outside the boundaries of the first and second finite analytical programs, is performed automatically and without user intervention after the initial data input and execution of the first and second programs.

Figure 2:
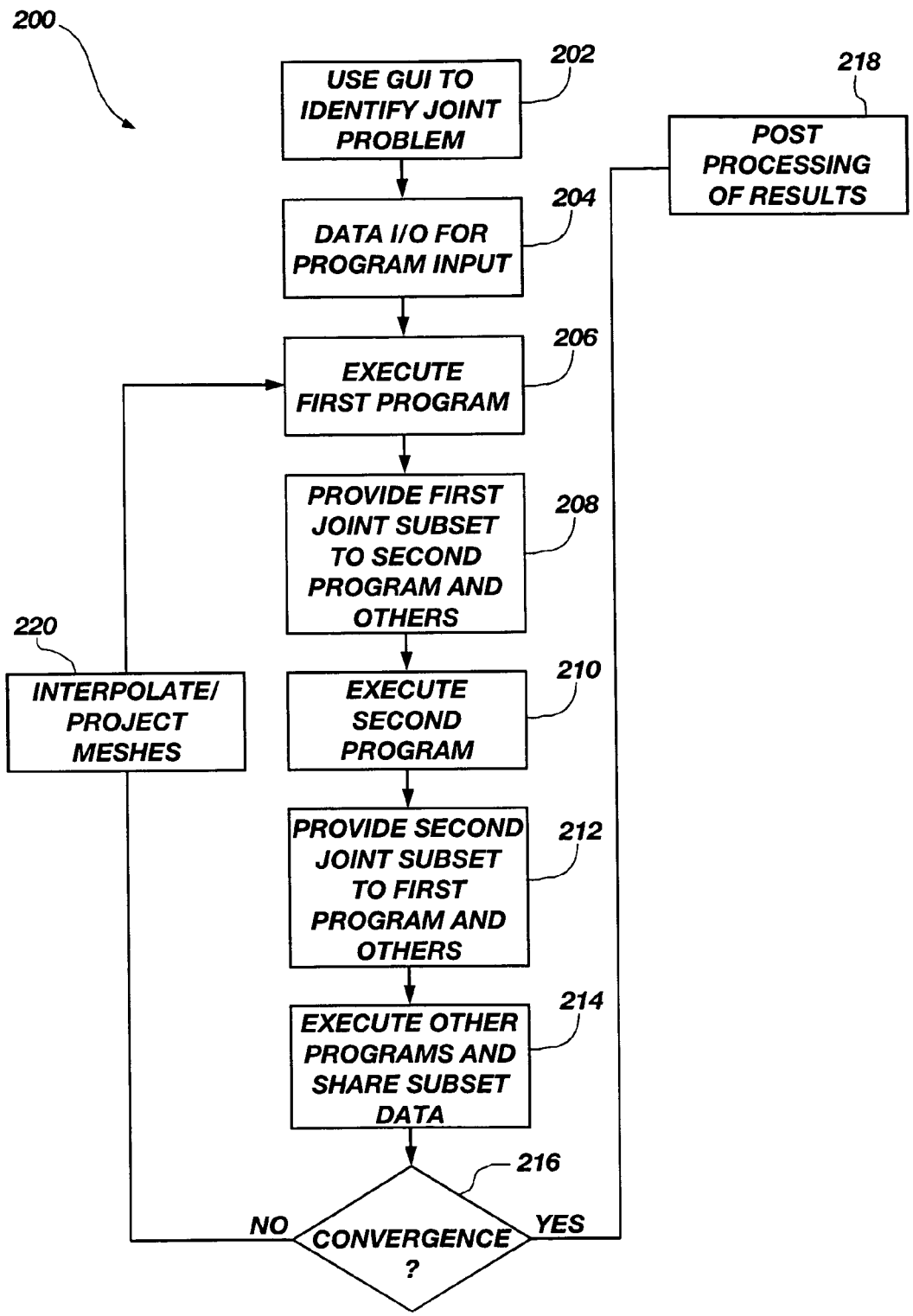
FIG. 2 is a process schematic operational diagram for the system of FIG. 1.

FIG. 2 is a block diagram of a process 200 representing the operation of system 100. Step 202 entails using the GUI 110 to identify a problem for a coupled solution between two or more of the programs shown in RAM blocks 112–118. Data linkages, as well as a sequence of operation for the respective programs to solve a coupled solution, have been previously entered by an expert or team of experts in coupling the finite analytical programs.

Data for these solutions is provided to the system 100 in step 204 where, for example, computed tomography data from missile maintenance operations may be provided as input for a structural model. Additional data including such data as materials properties; the specification of materials; boundary conditions of temperature, pressure, force, and any other useful data, is provided as needed by the specific analytical programs. A mesh generator program, such as the fifth finite analysis program 120 or a plurality of such programs designed for specific applications, is also used to provide data input in the form of mesh generation.

Step 206 preferably begins once the data input of step 204 is concluded, as shown in FIG. 2, but the process 200 may also interrupt itself to ask the user for input at any time. The first finite analysis program is executed in a sequence of execution designed by the expert or team of experts. The execution of the first program in step 206 provides first program output including a joint data set that may be shared, in step 208, as input data with the second finite analysis program shown in block 114. Additional data subsets may be generated and shared with any other of the finite analysis programs in blocks 116 and 118, for example. The second finite analysis program is executed in step 210 with a similar sharing of data in step 212. In step 212, however, the second program output may provide a second joint subset of data that can be used as input data for the first program once step 206 is executed again. The remaining finite analysis programs are executed in a similar manner with appropriate data linkages being provided in cooperation with an executable code associated with the GUI 110 so that the user does not need to specify data linkages to obtain a coupled solution.

In preferred embodiments, a portion of the data input in step 204 includes a criterion or criteria for iterative threshold convergence. For example, where the ballistics block 118 produces pressure data that modifies the program input for the structural block 114 due to the elastic deformation of rocket propellant, the initial boundary condition of pressure in the structural block 114 may be modified with time, as may the pressure conditions of the computational fluid dynamics model 112. The change in pressure from the ballistics model causes the structural volume results to change, as computed by the structural block 114. In turn, the computational results from the structural block 114, including an altered volume, may be supplied as input to the computational fluid dynamics block 112 to obtain still different pressures. Both the volume results from structural block 114 and the pressure results from the computational fluid dynamics block 112 may, in turn, be supplied as input to the ballistics block 118.

In step 216, this iterative procedure continues with repetitive iterations through steps 206, 208, 210, 212, and 214 until the specified convergence criteria or a maximum number of iterations representing a probable divergent solution is achieved. For example, the user-specified convergence criteria may indicate convergence when the total pressure change for computations in the ballistics block 118 is less than a fixed value, e.g., one-half psi between successive iterations; when the volume change in successive iterations through the structural block 114 is less than a predetermined delimiting percentage of the total volume; when calculations for the same value obtained as output from different programs match within a delimiting percentage; combinations of these examples; and any other useful convergence criteria.

Where convergence is determined to have been met in step 216, a post-processing step 218 stores the results, provides a visual display of the results on the display 106, and prints the results as needed. Step 218 also entails any other desired post-processing step.

Figure 3:
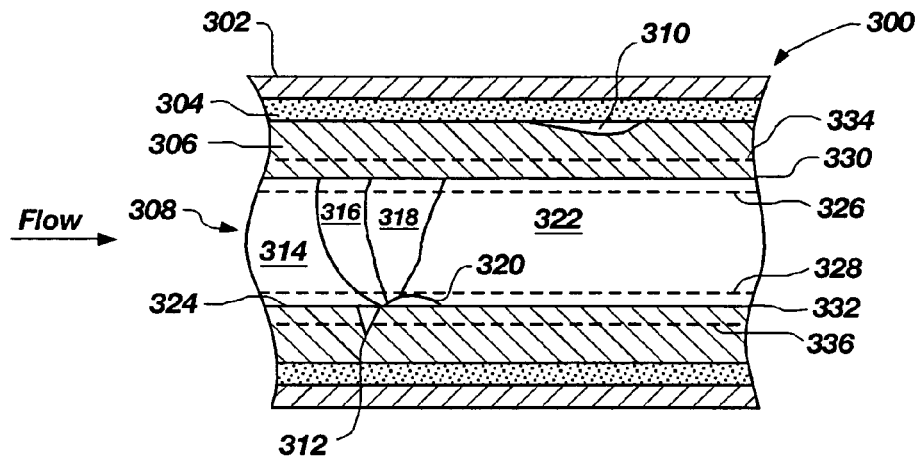
FIG. 3 depicts a mid-sectional view of a rocket motor having various defects that are modeled by finite analysis causing mesh boundaries to change, in order to provide additional detail with respect to aspects of the preferred method illustrated with respect to FIG. 2.

Step 220 entails the interpolation or projection of meshes for reasons that are illustrated, by way of example, in FIG. 3. In summary, mesh boundaries frequently move as a result of physical responses to system stimuli, e.g., heat, pressure, strain, and ablation, so that the model boundaries must be adjusted due to these movements. FIG. 3 depicts a section 300 of an aging cylindrical solid fuel rocket motor. The motor includes a composite outer shell 302, a liner 304 that is used to protect the outer shell from burn-through during launch, an inner core 306 of visco-elastic rocket propellant, and an interior core 308 comprising a burn chamber. Conventional maintenance operations including computed tomography have diagnosed a debond area 310 between the inner core 306 and the liner 304. Computed tomography has also diagnosed a crack 312 that is growing in the aging rocket propellant. Finite modeling has provided a coupled solution involving internal ballistics, structural, and computational fluid dynamics to demonstrate various flow regimes including regimes 314, 316, 318, 320, and 322. A few rocket motors have been known to explode due to cracking of the propellant as shown in crack 312.

The propellant region 324 tends to deform more readily due to higher velocity downstream of crack 312, which results in a higher upstream pressure. Flow conditions around the crack 312 have a Bernoulli effect that results in decreased pressure in flow regime 320 downstream of the crack 312. The regime 320 narrows the flow through regimes 316 and 318, and imparts increased velocity. Flow regime 322 is a relatively low pressure flow regime. Another potential problem is that the inner core 306 may strip away from the debond area 310 with disastrous results.

The computational fluid dynamics model begins calculation using a cylindrical mesh (not shown in FIG. 3) having an outer radius equal to the inside diameter of the inner core 306. This cutter radius is shown as lines 334 and 336 in FIG. 3. As shown in FIG. 3, the computational results from a first pass iteration of the coupled programs, which moved the inner diameter of the inner core 306 out to lines 326 and 328, primarily due to deformation of the inner core 306. Convergence has not yet been achieved, so it becomes necessary to adjust the associated meshes and relevant boundary conditions to account for the deformation of inner core 306. Boundary condition projection is performed by projecting the results from the fluid mesh at lines 326 and 328 to new boundaries at lines 330 and 332. Pressure results for computational fluid dynamics (CFD), for example, may be projected to new boundaries of the structural mesh at lines 330 and 332.

Projecting of boundary conditions is done by locating associated positions on the complementary mesh and extracting the necessary data to create comparable boundary conditions on the current mesh, i.e., the mesh that is receiving the boundary conditions. Usually, the associated position is perpendicular to the surface of the receiving mesh, but may be the closest point if the perpendicular is not usable. The boundary conditions are then created on the current mesh from data on the complimentary mesh.

Alternatively, where the initial pressure assumption is too high, the initial mesh for the computational fluid dynamics model may be found having a radius at lines 330 and 332. In this case, the computational results show the propellant having moved radially inboard to lines 326 and 328. In this alternative case, an identical method of projecting boundary conditions can be used.

Differences between iterative steps may require the boundary of the mesh to be modified. Large differences may require the finite element mesh to be remeshed for use in subsequent calculations. Results and boundary conditions must now be transferred to the modified mesh by interpolation for the analysis to continue. If mesh interpolation is not desired, or if the fracture geometry prevents interpolation, the user may be prompted to assist in the generation of a new mesh over the region of concern, or an entirely new mesh may be generated over the new boundary by a mesh generation package. Techniques for automated mesh generation to discretize a model of a body are generally known. Examples of such techniques are included in the foregoing discussion of related art, e.g., U.S. Pat. No. 5,729,670, which is incorporated by reference to the same extent as though fully disclosed herein.

As mentioned above, the software and the method, as well as the computer system in an electronically programmed state, all utilize a graphical user interface that is operable to identify a joint problem that both the first and second finite analysis programs can jointly and in combination solve, and to specify at least one criterion for a joint solution. Data processing linkages between the first and second finite analysis programs, and the user, can provide the first program input values to the first program. Embedded commands in the graphical user interface or related programs execute the first finite analysis program to obtain the first program output values, including the first joint data set. Data processing linkages between the first and second finite analysis programs then can provide the second finite analysis program with second program input values including the first joint data set. Embedded commands in the graphical user interface, related programs, or a scripting language can be used to execute the second finite analysis program to provide second program output values including the second joint data set. Data processing linkages between the first and second finite analysis programs then provide the first finite analysis program with first program input values, including the second joint data set.

Figure 4:
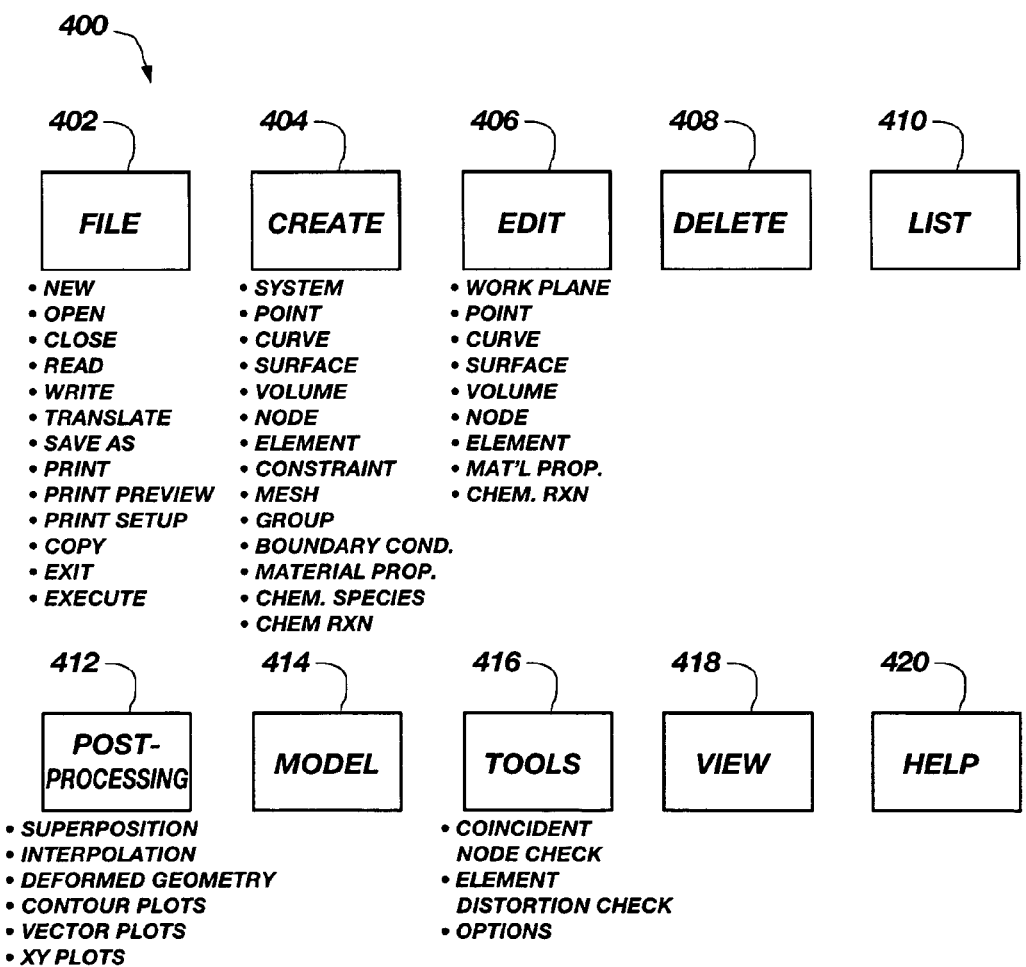
FIG. 4 is a schematic representation of menu options for a preferred graphical user interface that operates according to another aspect of the invention.

FIG. 4 depicts a plurality of graphical fields such as may appear, for example, on the cathode ray tube (CRT) display panel of a user who is interacting with the graphical user interface of the preferred embodiment. The graphical elements are also known as fields, and may be accessed, for example, by clicking the button of a mouse to reveal additional menu options or icons that are associated with each field.

A GUI 400 includes a file field 402, which includes submenu options (in bold font) including functionality to open a new file; open an existing file; close an active file; read data for input to a list-selected finite analysis program and configure that program for options and units; write data for input to a list-selected finite analysis program and configure that data for options and units; translate data from one finite analysis program to another between a list of readfrom programs and a list of write to programs; save the current file and save as a new filename; print the data representation on the screen, print preview, print setup, copy the data representation on the screen, and exit the program. In summary, these submenu options permit the user to manage and access the program data files.

A create field 404 permits the user to interact with a mesh editor to identify the location and type of mesh. The mesh is drawn interactively based upon user-specified parameters up to and including automatic mesh generation. The create field 404 includes submenu options including whether the mesh system is based upon rectangular, cylindrical or spherical coordinates, the reference plane that is viewed on the screen, and the starting coordinates of the mesh. A point option permits the user to enter points based upon numerical coordinates or to enter points by using the mouse to select points. A curve may be drawn as a line, arc, circle or spline. A surface option permits the user to create surfaces from a list of predetermined boundary curves, e.g., spheres, cylinders, and planes, or by extruding or rotating curves. A volume option permits the user to create volumes from a list of predetermined boundary surfaces, e.g., spheres, cylinders, and planes, or by extruding or rotating a surface. A node may be created by entering the location of the desired node. The nodes may be connected by specifying elements that connect the nodes, as well as element geometrical behavior and material type. Nodes may be assigned positional constraints that may also be related to adjacent nodes and free faces. The nodes also have labels and are assigned special graphical representation, e.g., colors. Once a surface or volume has been generated, a mesh option permits the automatic generation of a mesh over the surface of the body or a mesh representing the volume of a body, together with entry of material properties for the mesh or elements of the mesh. Nodes, faces, elements, points, curves, surfaces, and volumes may be treated as a group that shares special properties. Boundary conditions may be defined including pressure, restraint, force, moment, temperature, convection, radiation, heat flux, point source, volume source, specie concentration, specie convection, and specie flux. New materials may be added and material properties may be entered to a database that tracks material properties. Similarly, chemical species may be added and chemical reactions may be entered into an interpretive equation editor. Additional tools for displaying the meshes include a plurality of CAD related menu options, e.g., to view a mesh or access geometry creation functions. In summary, the create field provides an interactive mechanism for creating meshes, creating boundary conditions, and assigning chemical and material properties to components of the meshes.

An edit field 406 permits the user to modify the work plane that is represented on the CRT for viewing. The orientation of the work plane may be designated by coordinate entry, and the character of the work plane can be designated as rectangular or cylindrical. The color and appearance of mesh or body components may be changed, e.g., as by changing the color of points, curves, surfaces, volumes, nodes, and elements. Chemical reaction data may be edited. In summary, the edit field permits the user to change the appearance of an existing mesh without deleting elements of the mesh or body.

A delete field 408 has the same list of submenu options as does the create field, except the submenu options are used to delete elements, as opposed to creating them. Additionally, boundary conditions may be deleted in sets of related boundary conditions. A list field 410 is used to provide a list of items encompassing the same menu options that exist for the delete field.

A post-processing field 412 contains submenu options including superposition of calculation results on the mesh; interpolation of results from one mesh to another as specified by model names for the meshes; interpolation to nodes, or centroids, and to average results; deformed geometry may be shown to compare the degree of deformation in a system component as brought about by the predictive model results; contour plot, vector plots, and X-Y plots of predetermined data may also be obtained.

A model field 414 permits the user to identify a selected model for the coupled solution of a joint problem. A tools field 416 includes a coincident node check that identified nodes having locations within a predetermined or user-specified tolerance of one another. An element distortion check option permits the user to specify which control measures for distortion the system will consider and to input the desired control values including control measures for Gauss point distortion, aspect ratio, area ratio, quad angle (90°+/−), triangle angle (45°+/−), and element warping.

A view field 418 has submenu options including selected adjustments to display settings including color representation of diagram components on the display; blanking and unblanking of points, curves, surfaces, nodes, volumes and elements on the display; dynamic view including pan, magnify, rotate, 3D rotate, and zoom options; reset of the dynamic model changes including a return to the originally depicted conditions; autoscale in which the scale of the model representation on the display is adjusted to reveal the entire model in optimum context; view orientation in which the display on the screen is changed to represent an eye orientation from a user-entered set of coordinates, rotation of the screen perspective a specified distance about a user-selected coordinate, and continuing rotation of the model representation about a user-selected axis.

The help field 420 provides hyperlink access to user information, such as the information that is shown in the attached appendix.

Figure 5:
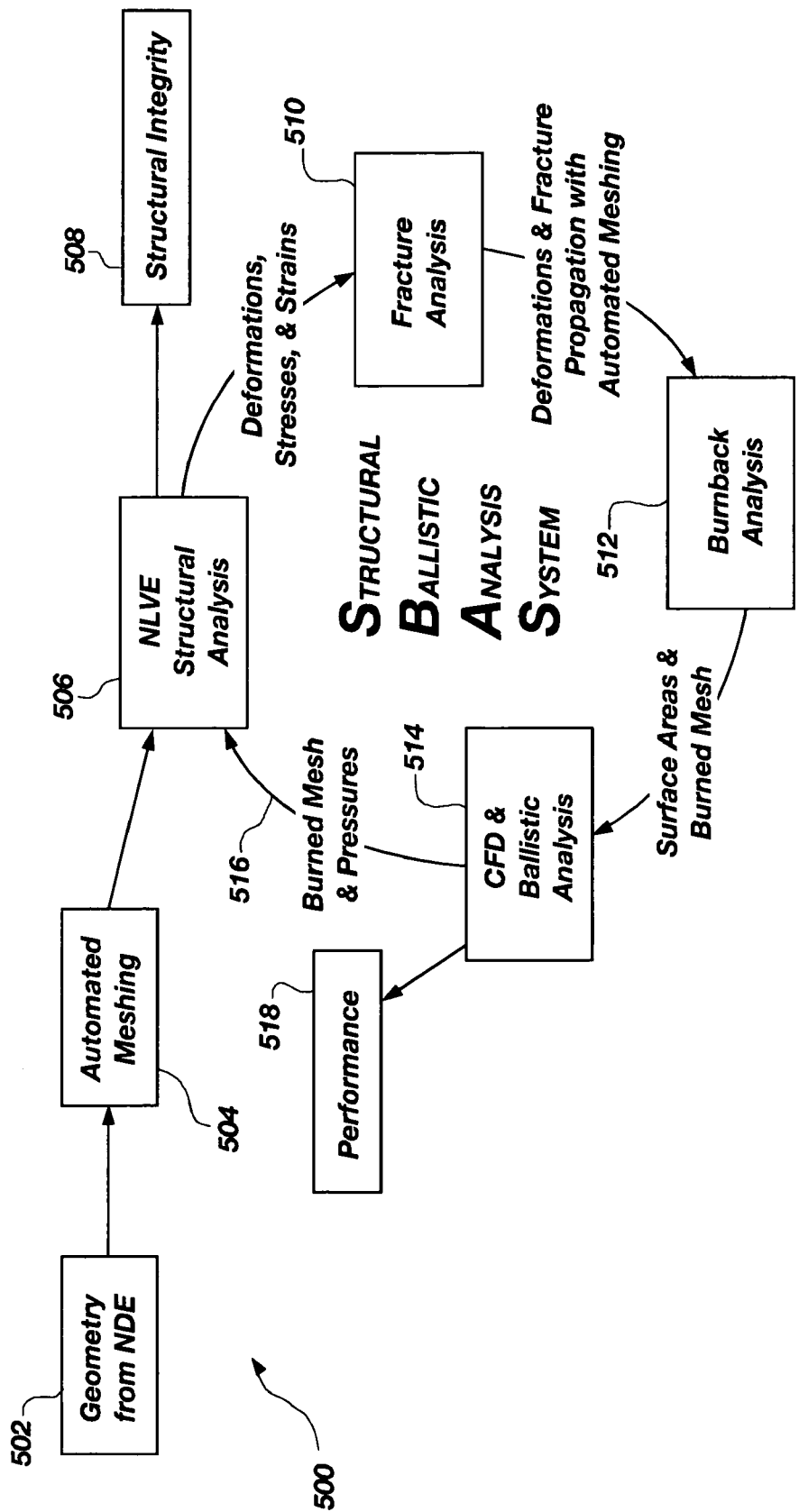
FIG. 5 depicts a selected model that can be created using a scripting language to couple a plurality of finite analysis programs.
Figure 7:
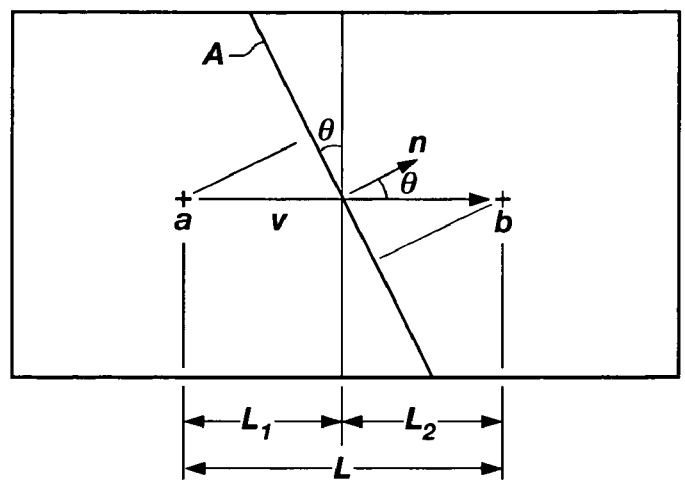
Figure 8:
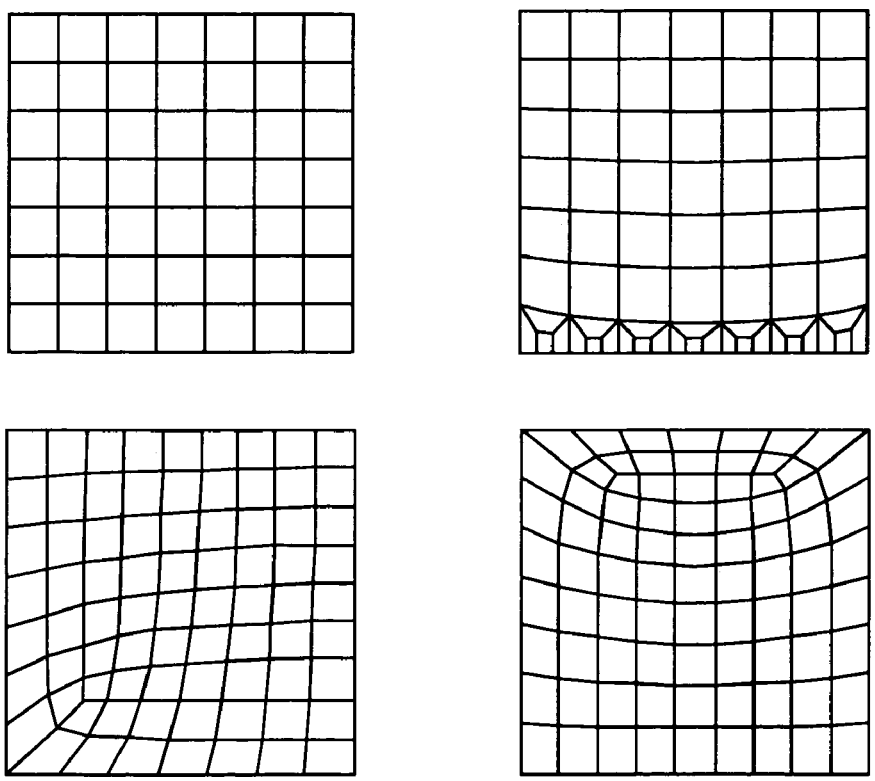
Figure 13:
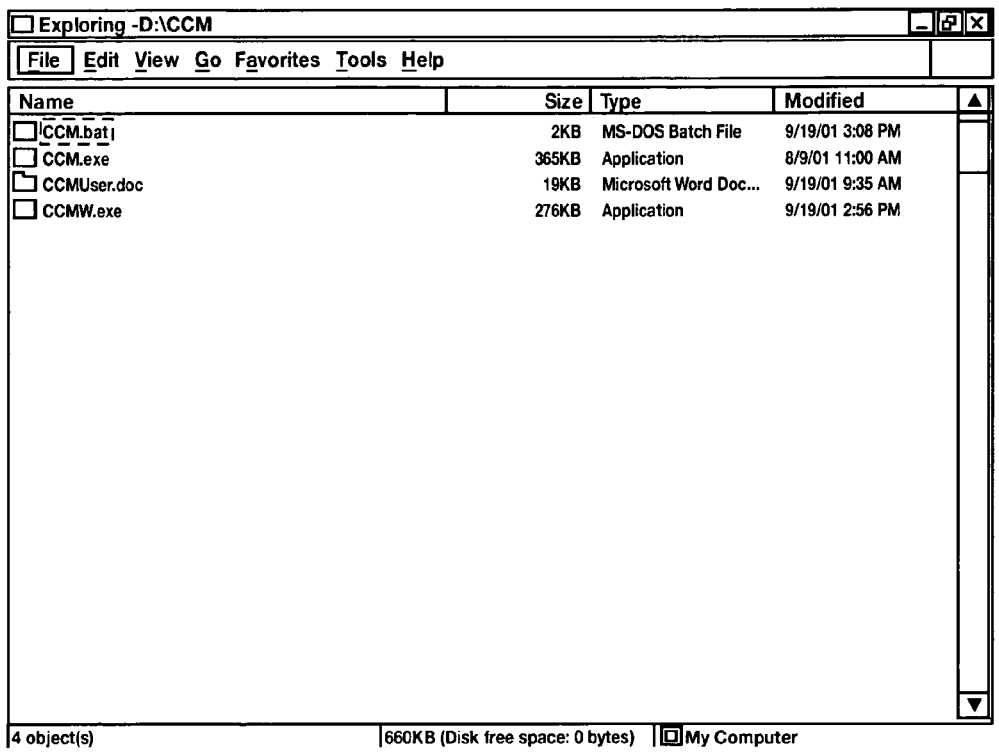
Figure 14:
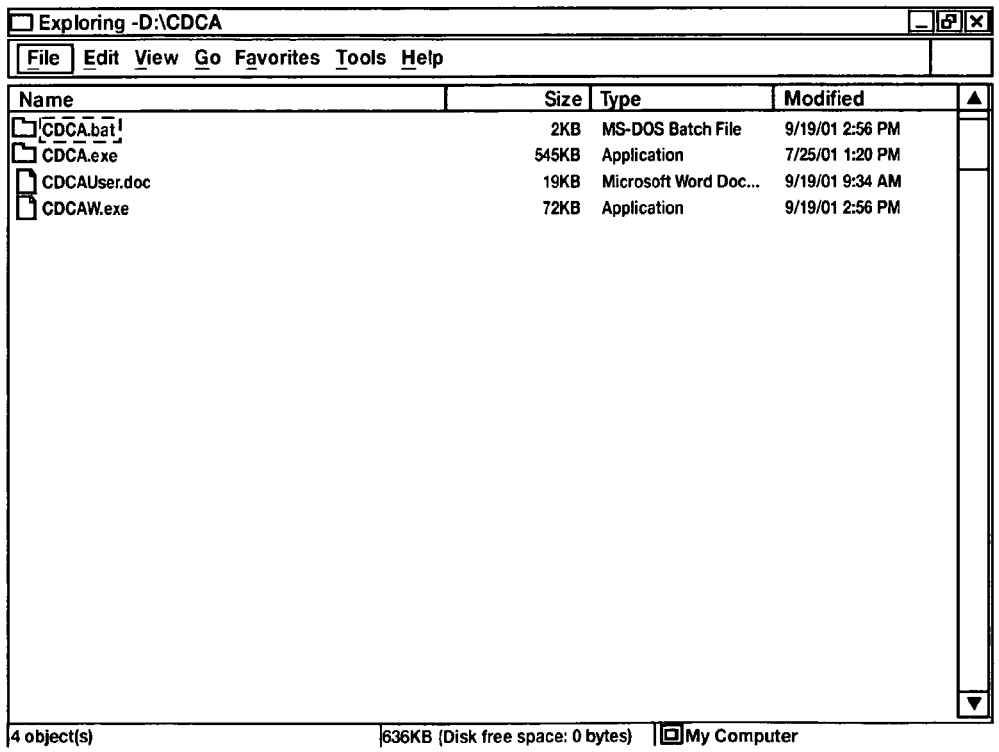
Figure 15:
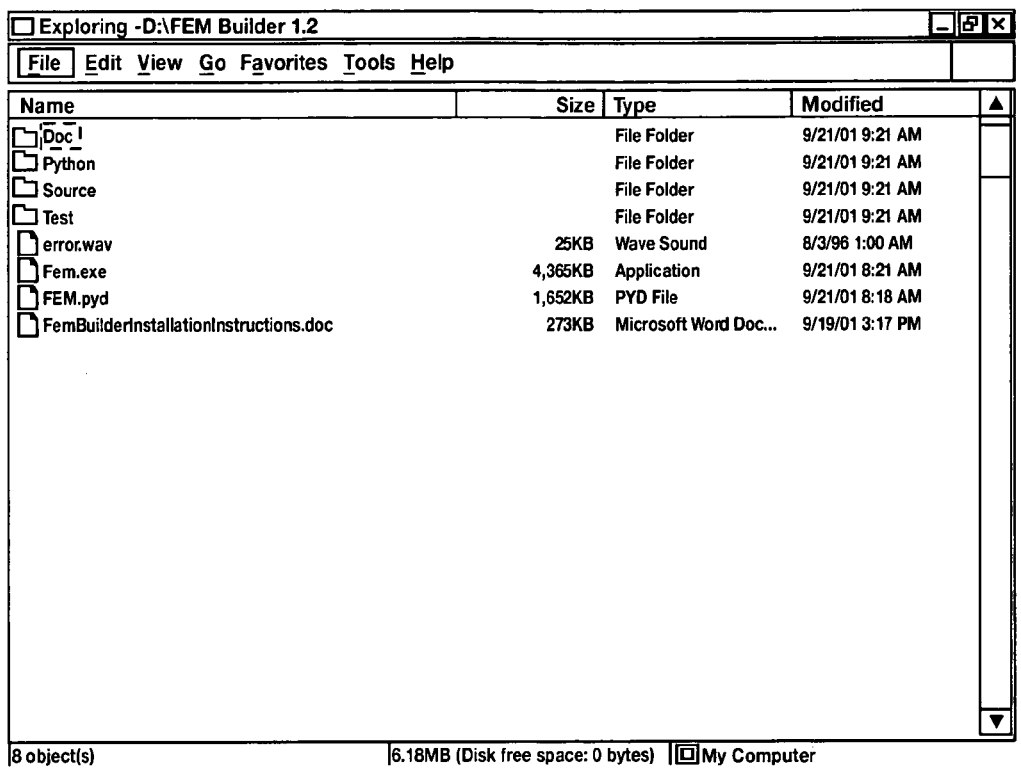
Figure 16:
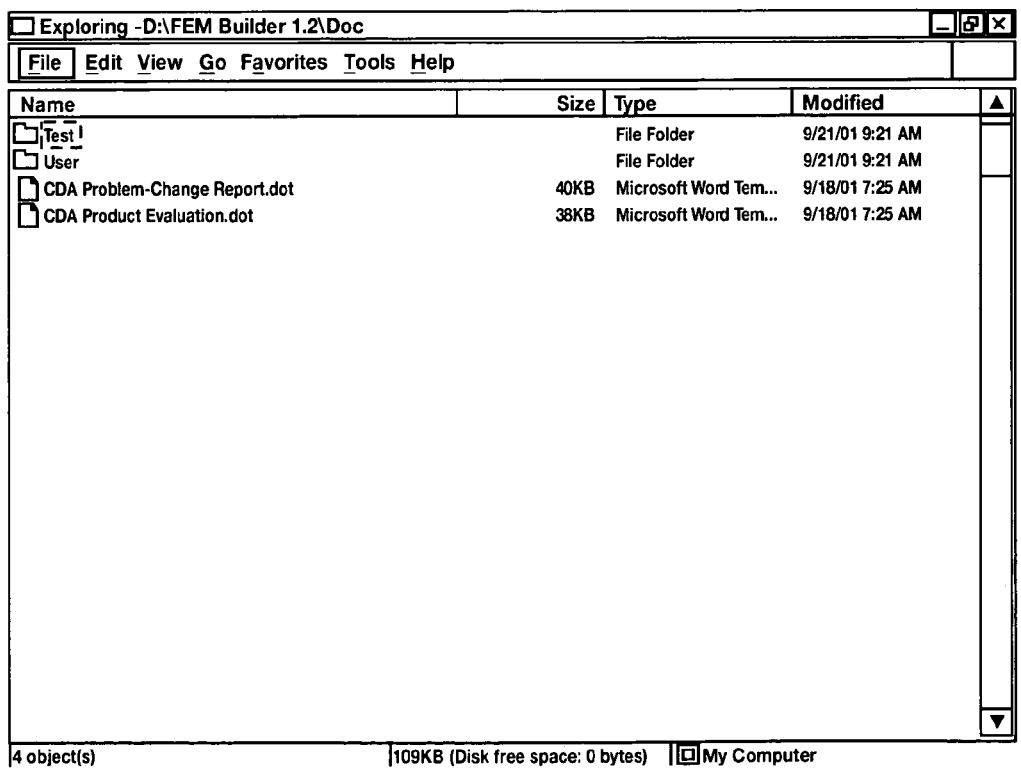
Figure 23:
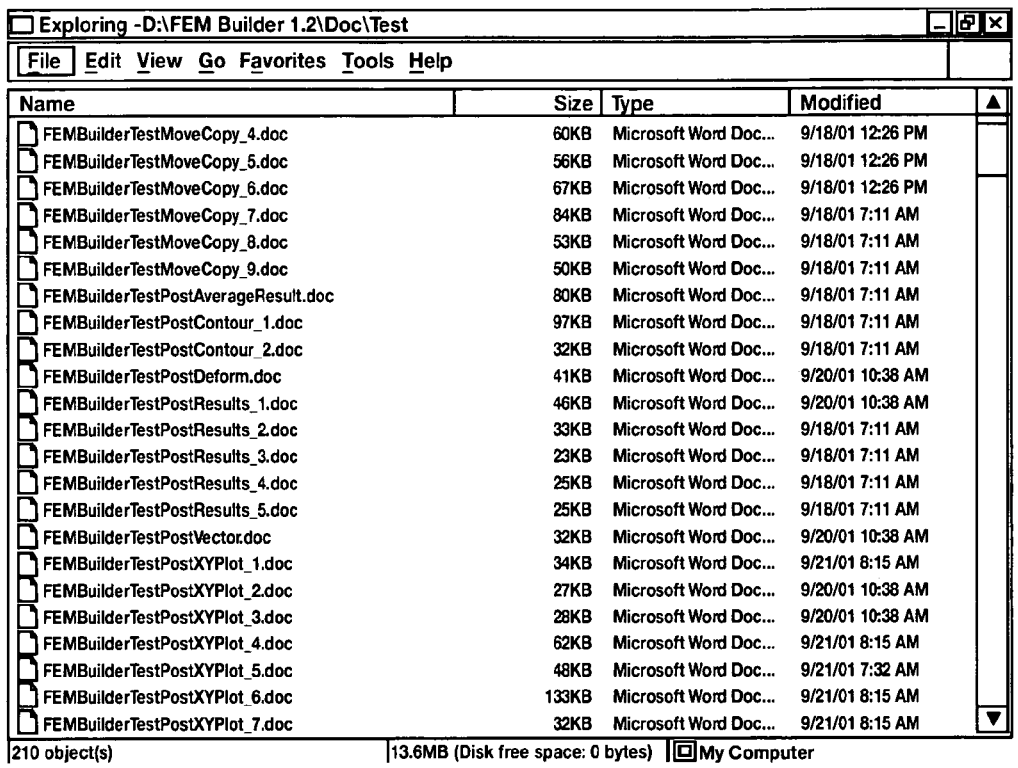
Figure 24:
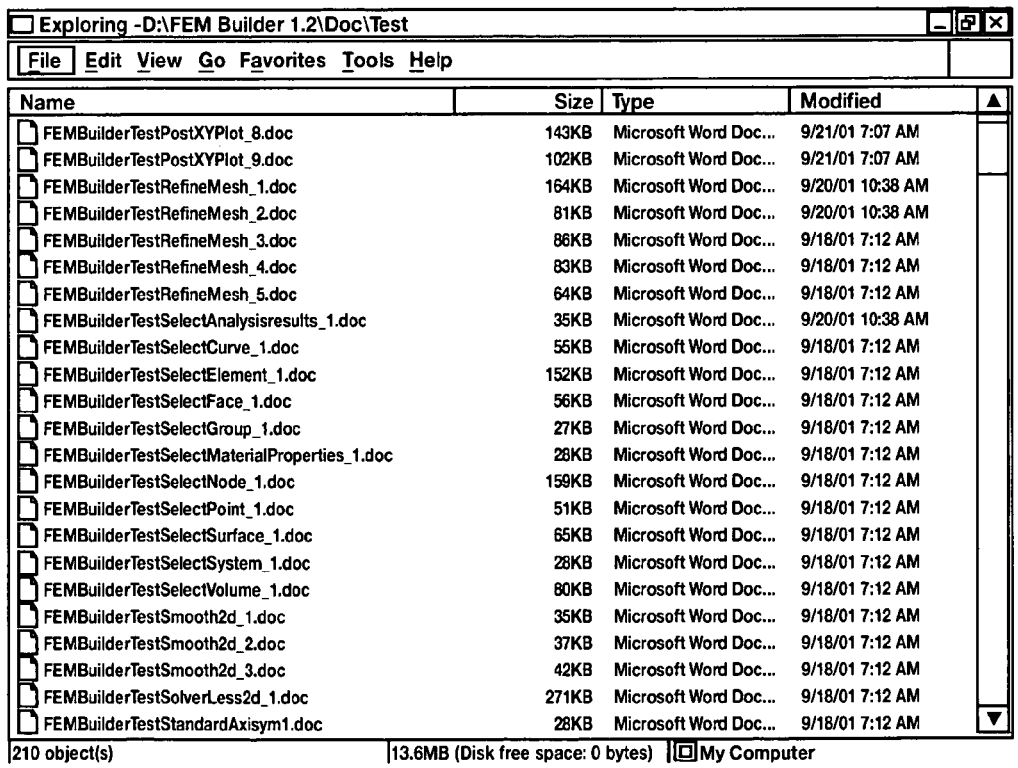
Figure 27:
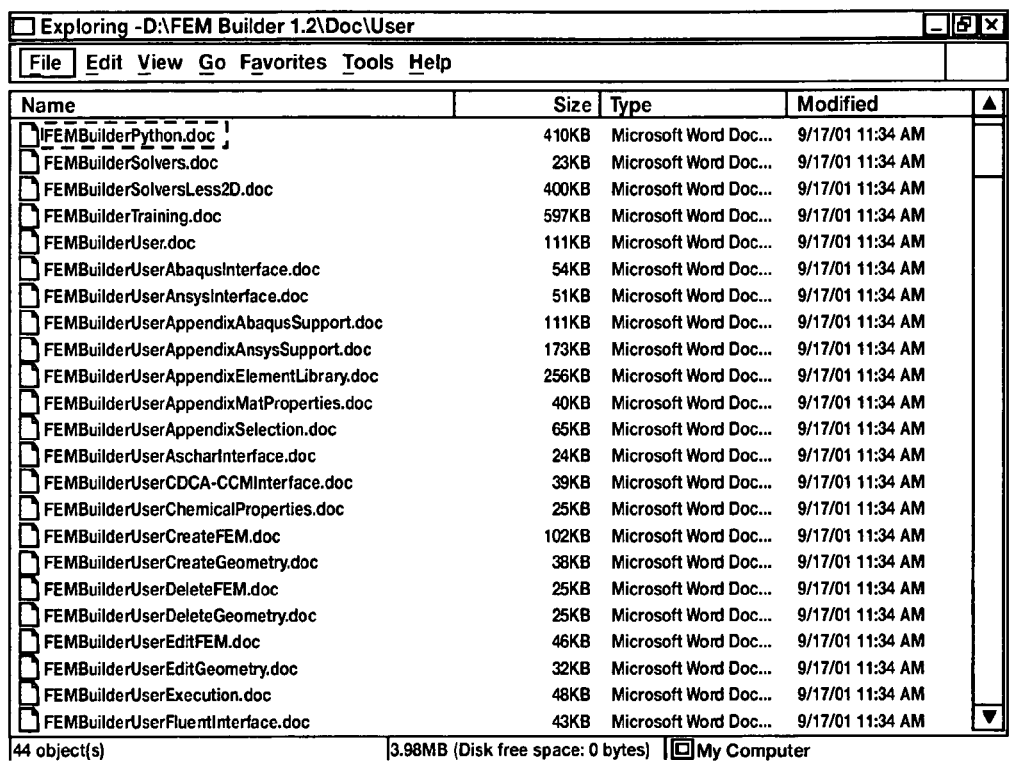
Figure 28:
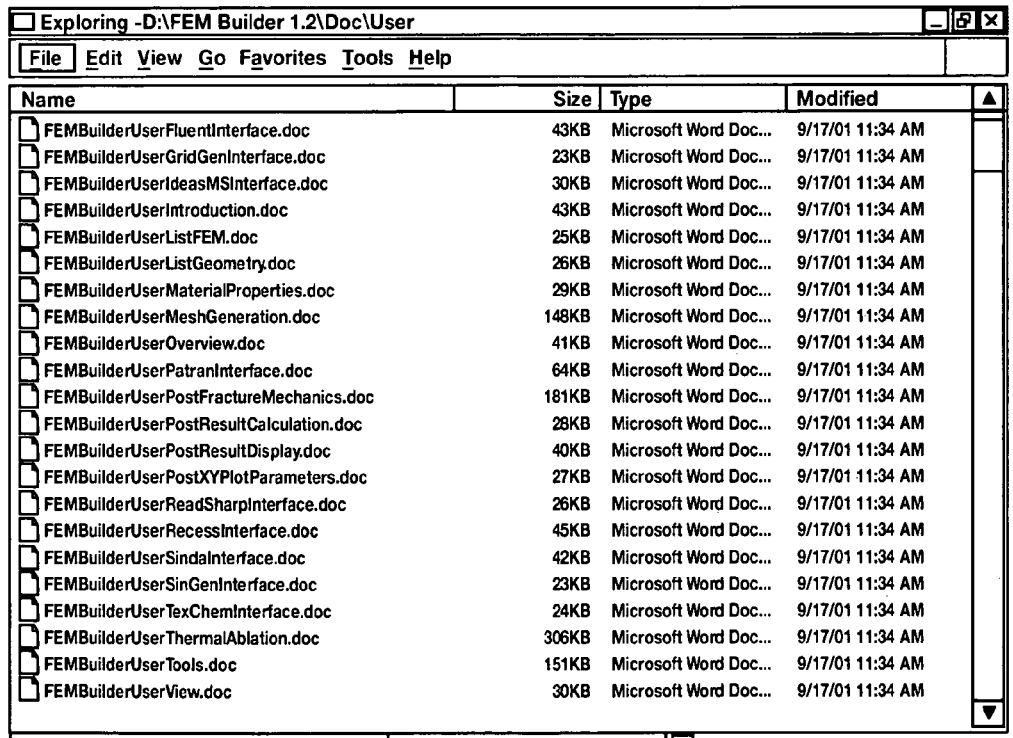
Figure 29:
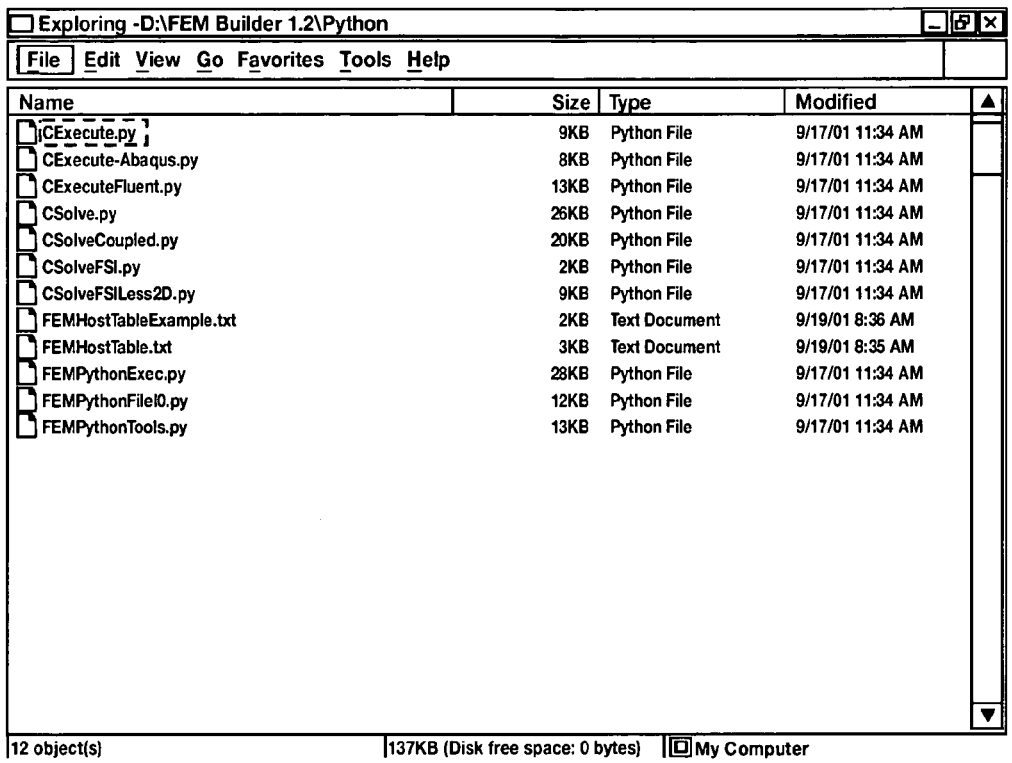
Figure 30:
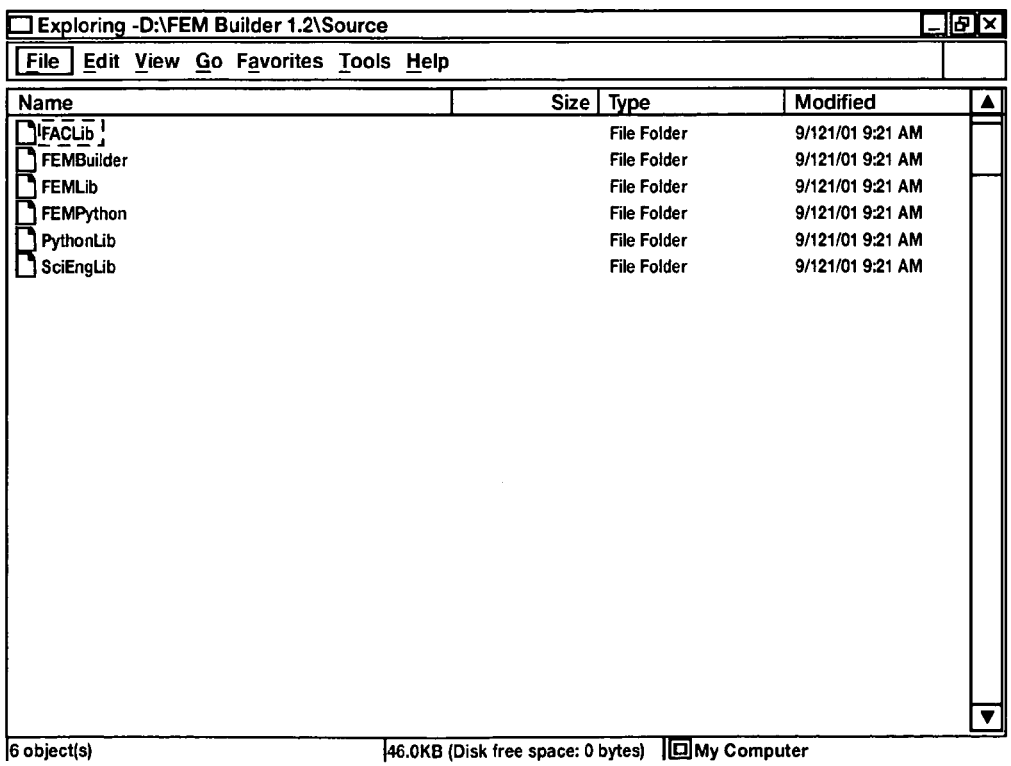
Figure 47:
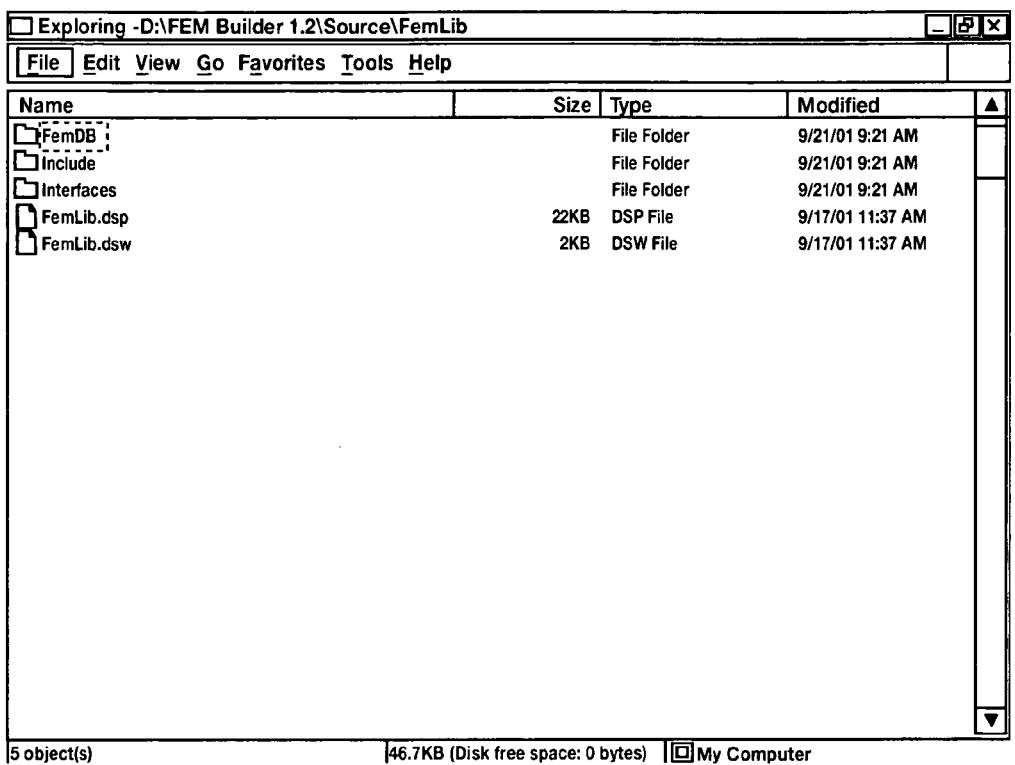
Figure 48:
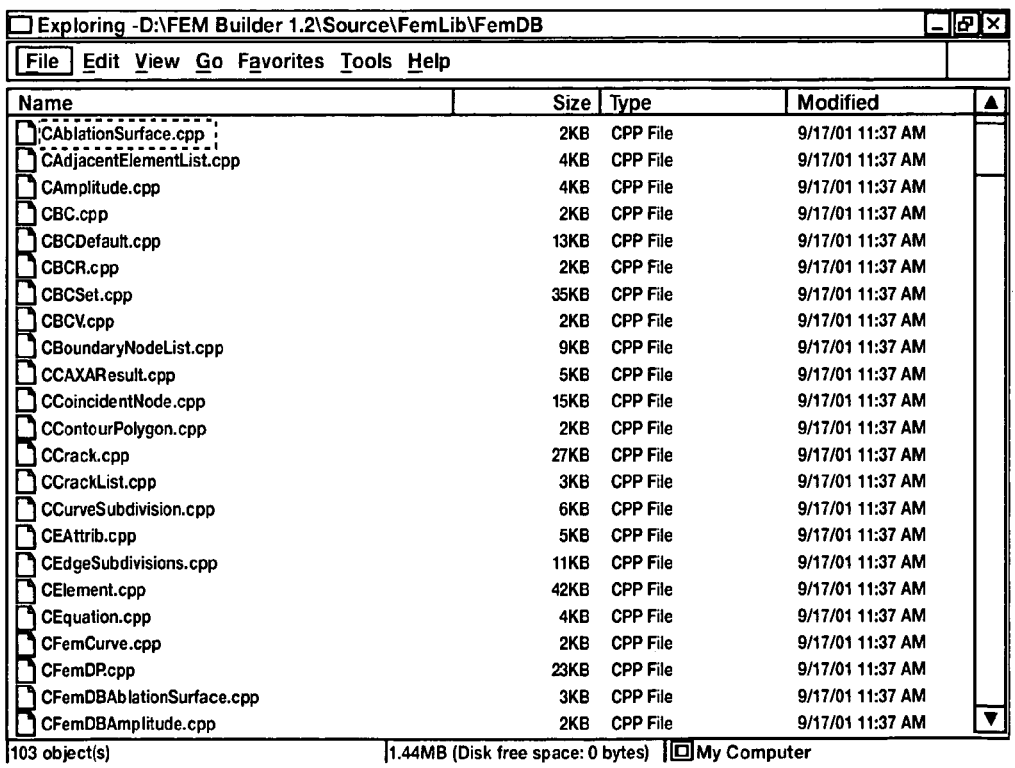
Figure 63:
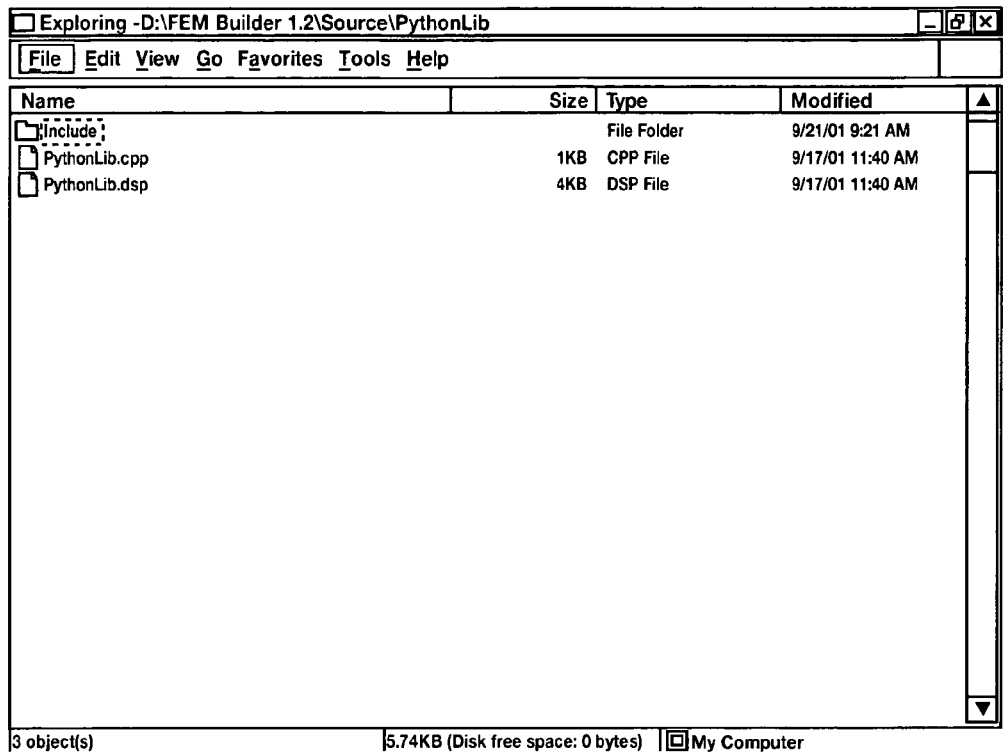
Figure 64:
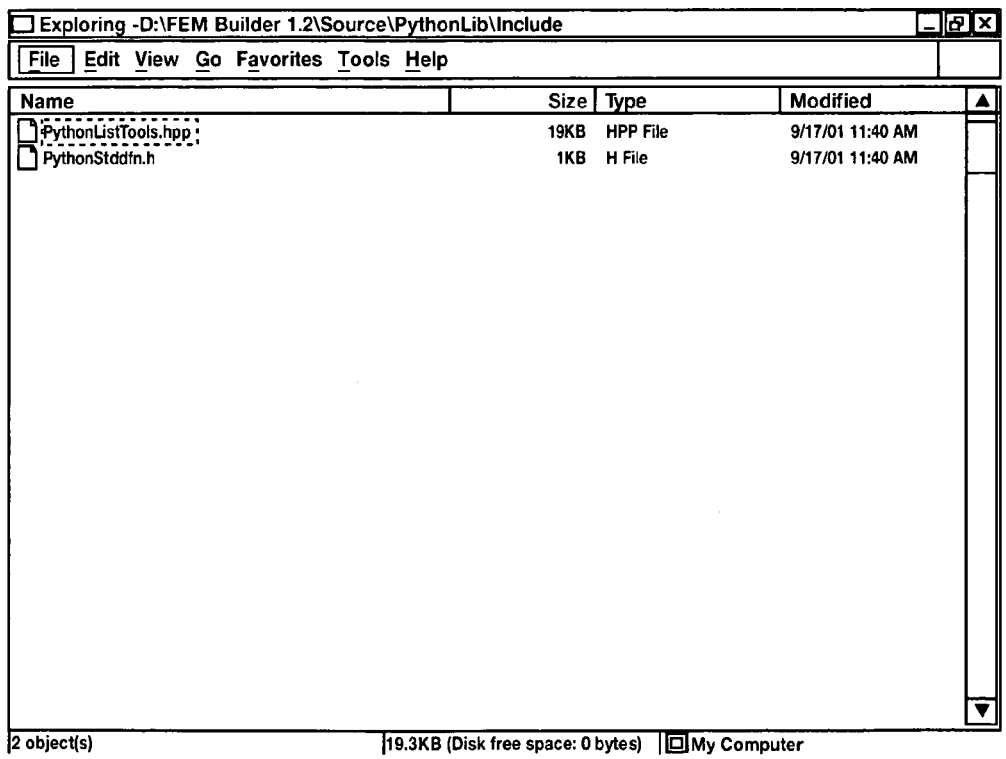
Figure 65:
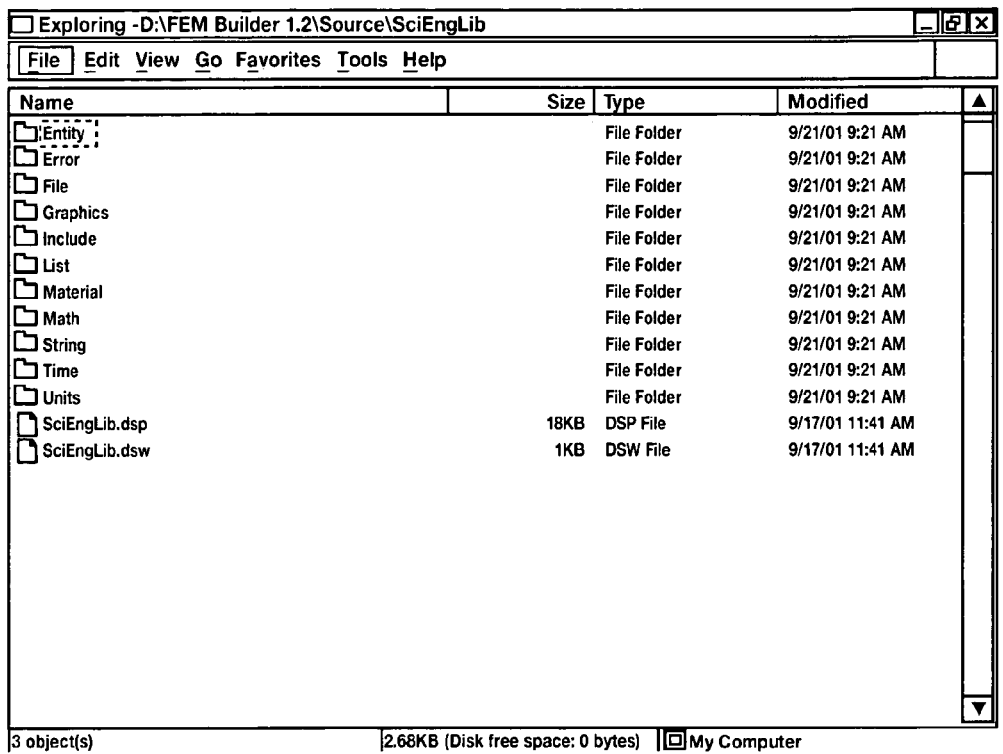
Figure 66:
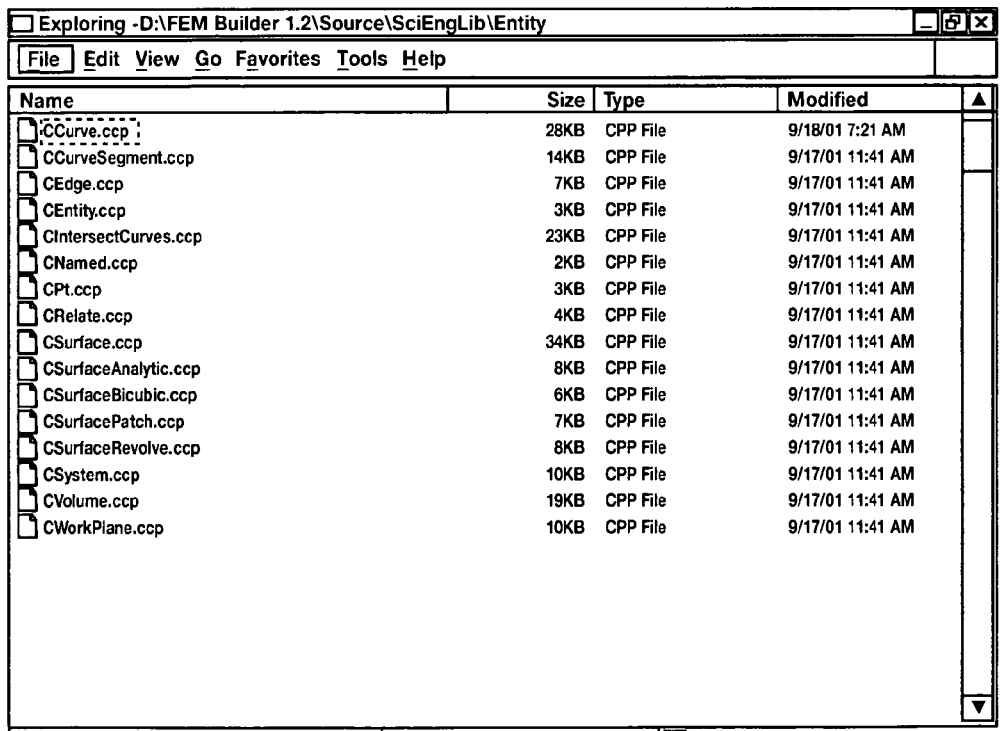
Figure 67:
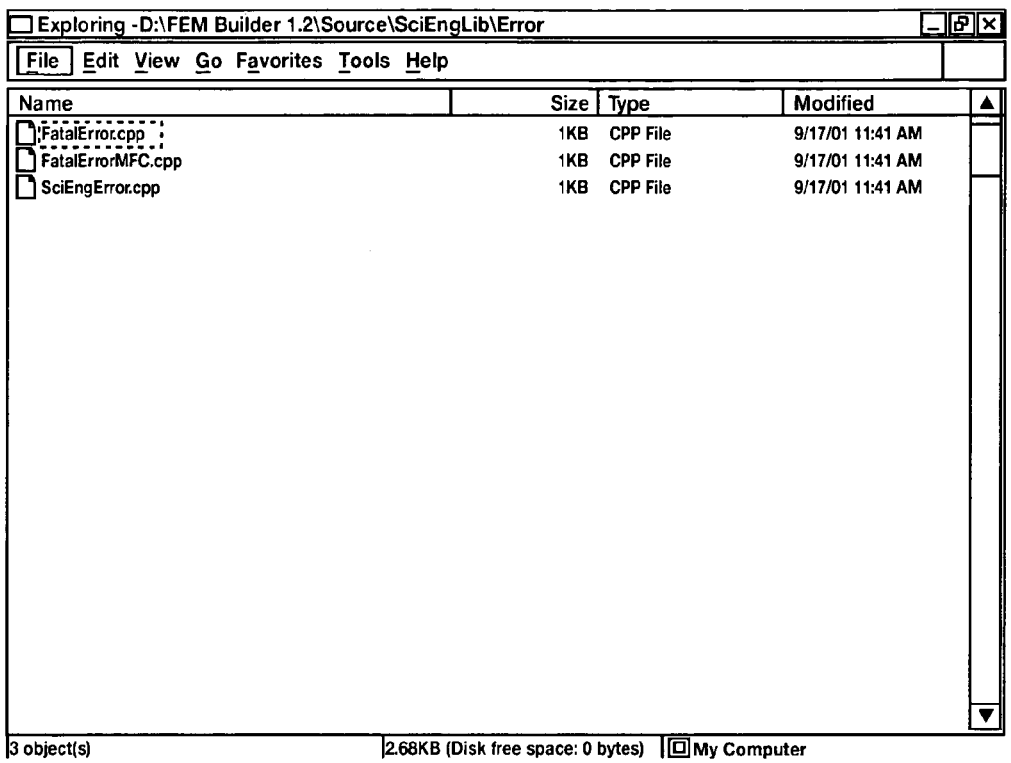
Figure 68:
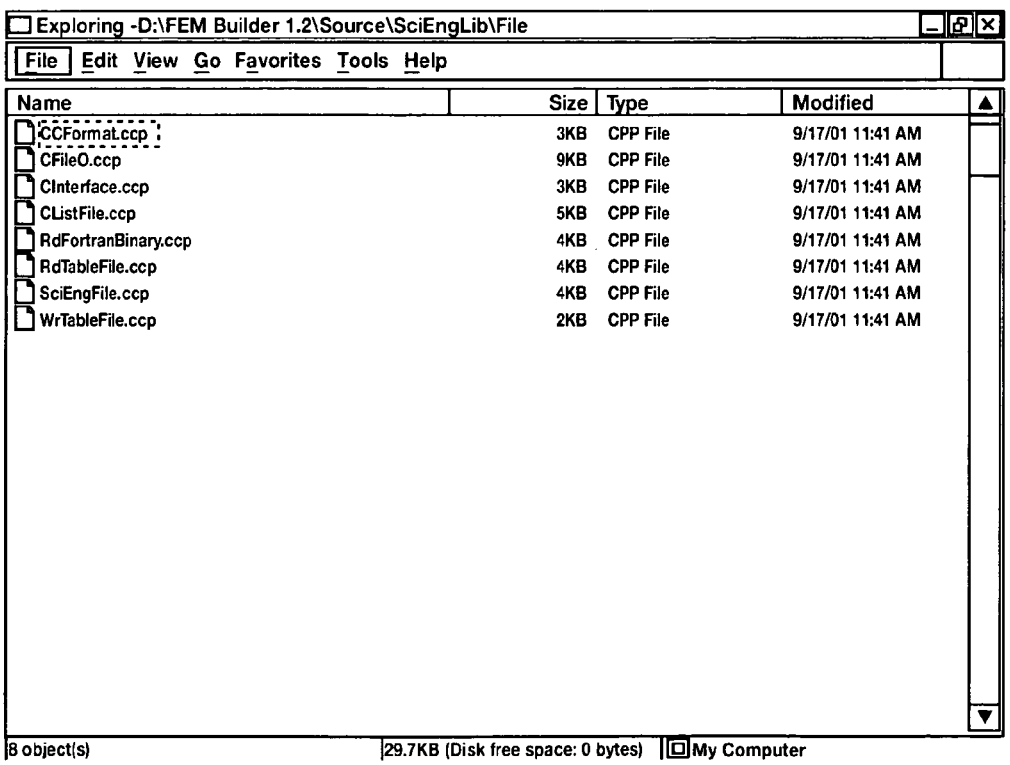
Figure 81:
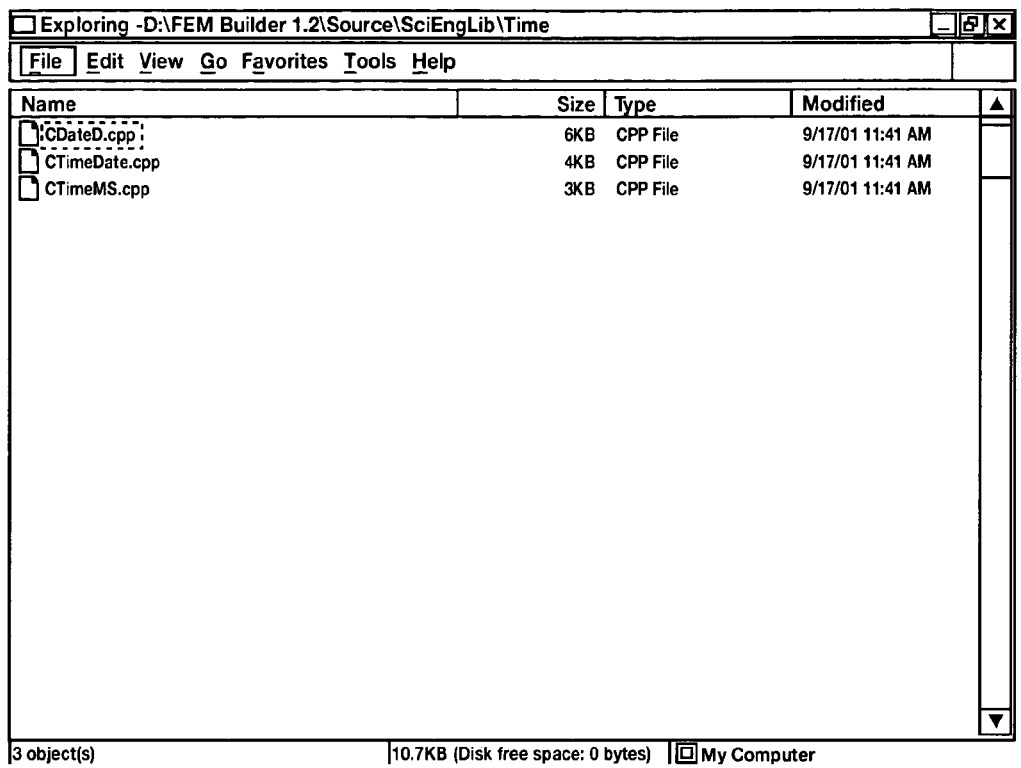
Figure 82:
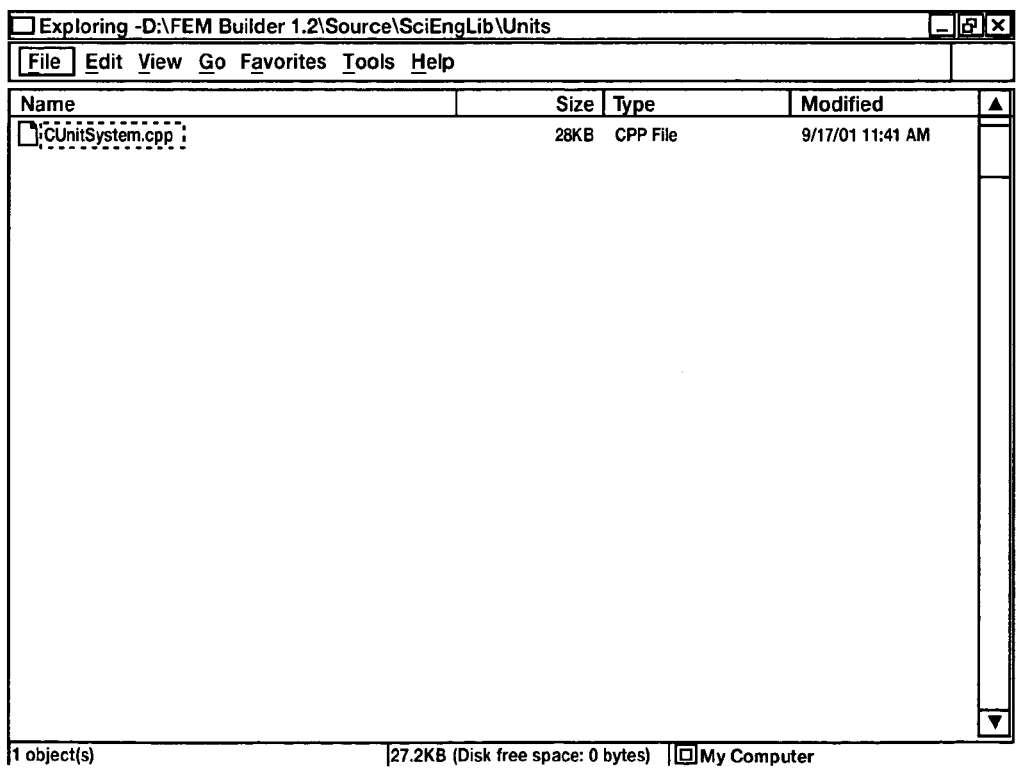
Figure 83:
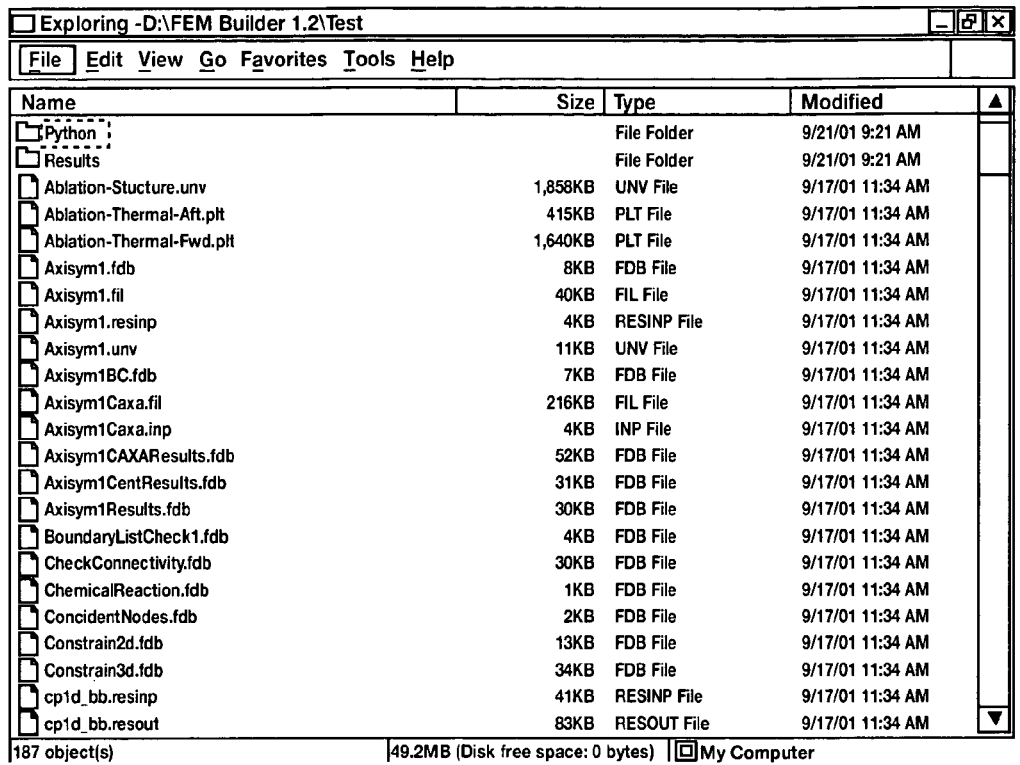
Figure 84:
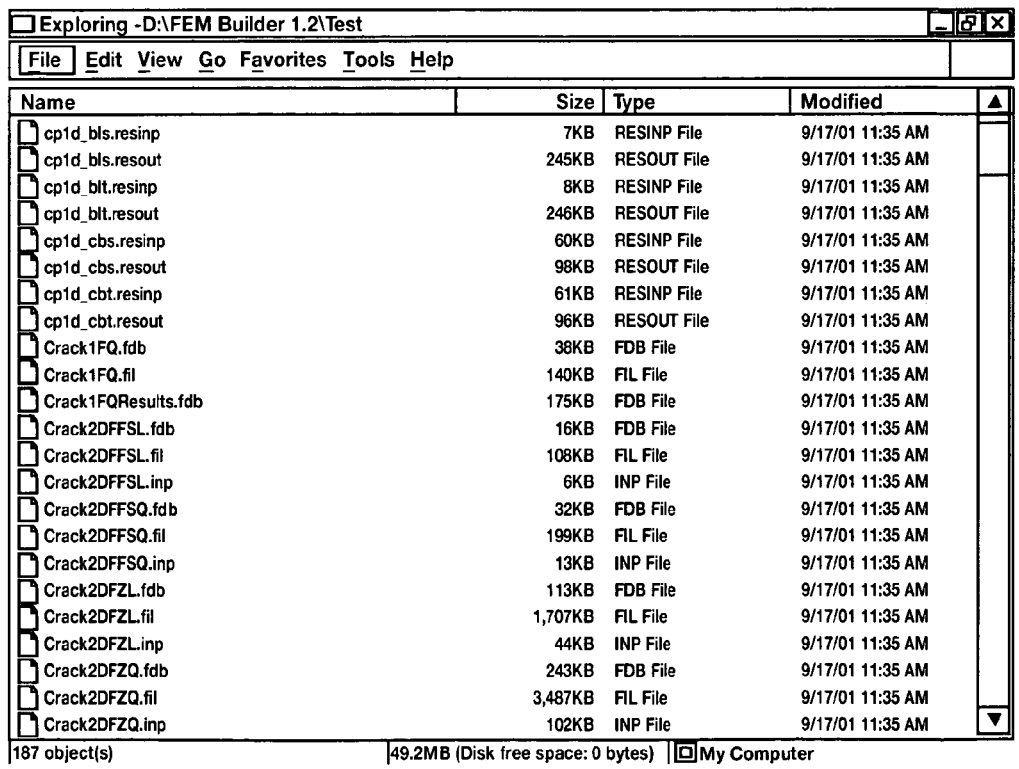
Figure 85:
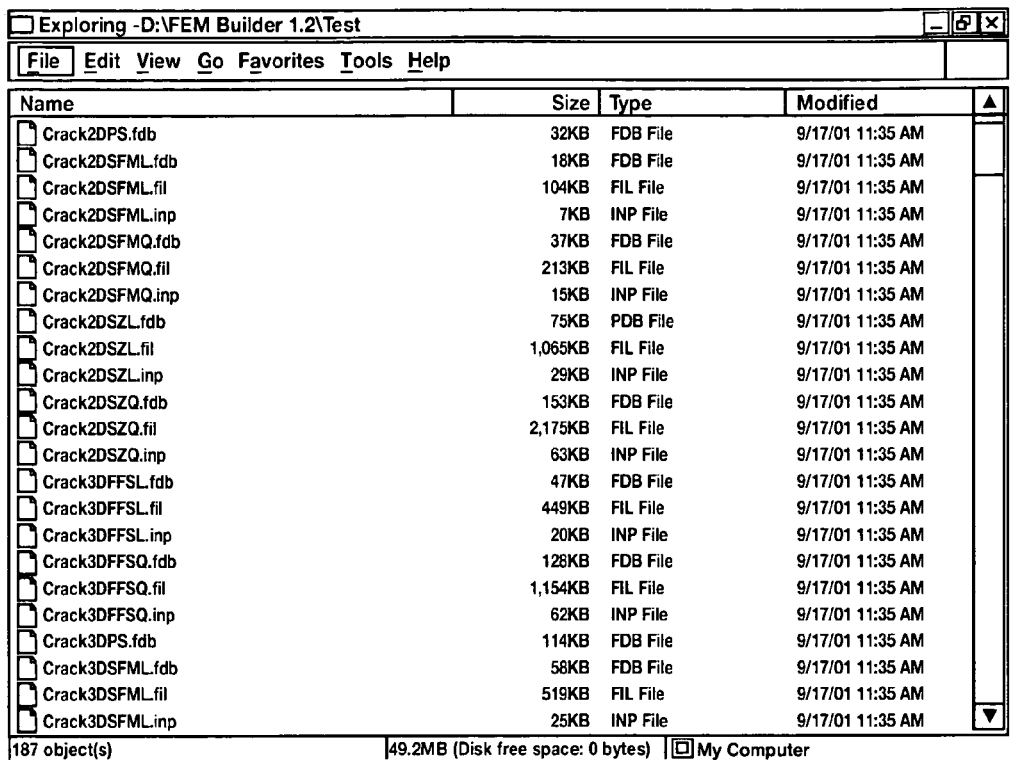
Figure 86:
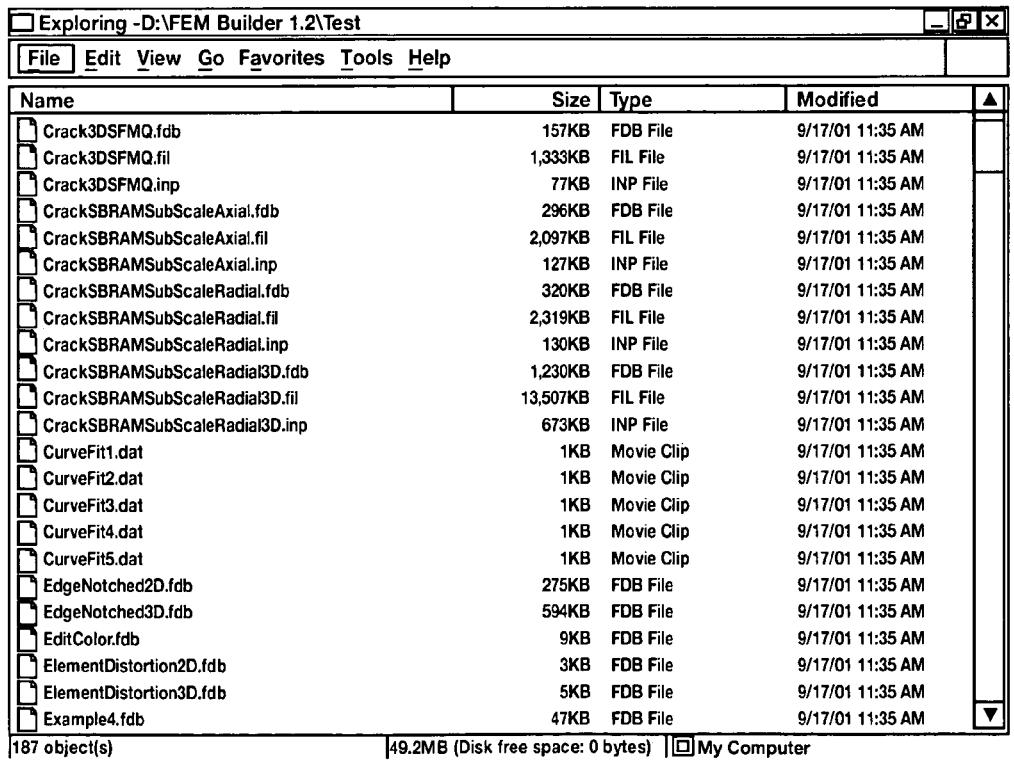
Figure 91:
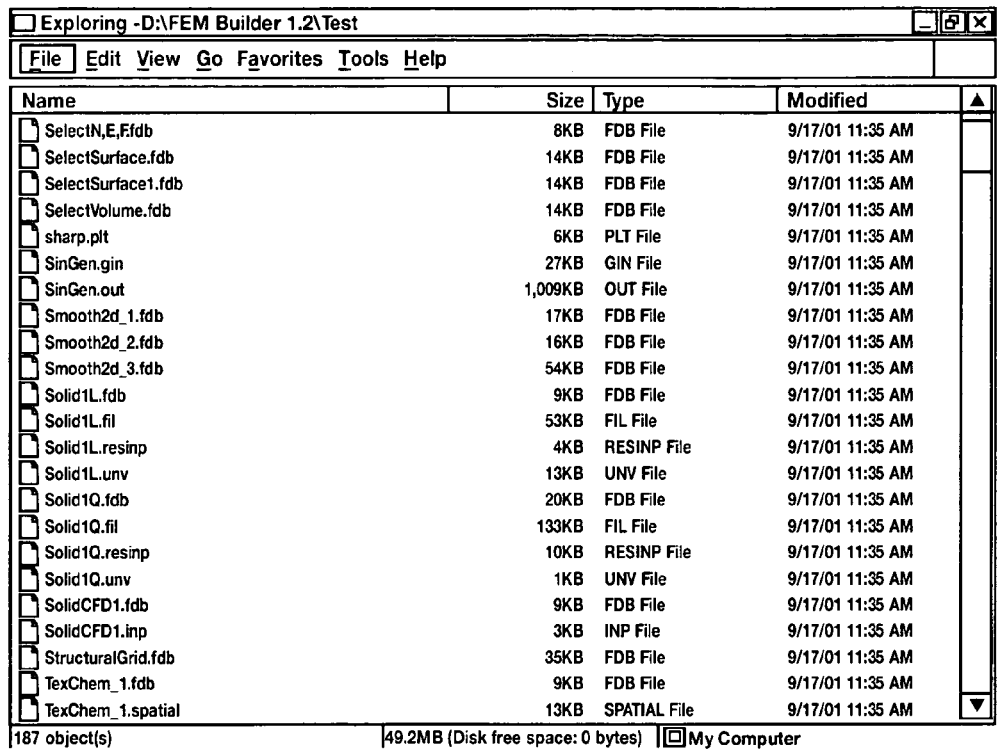
Figure 92:
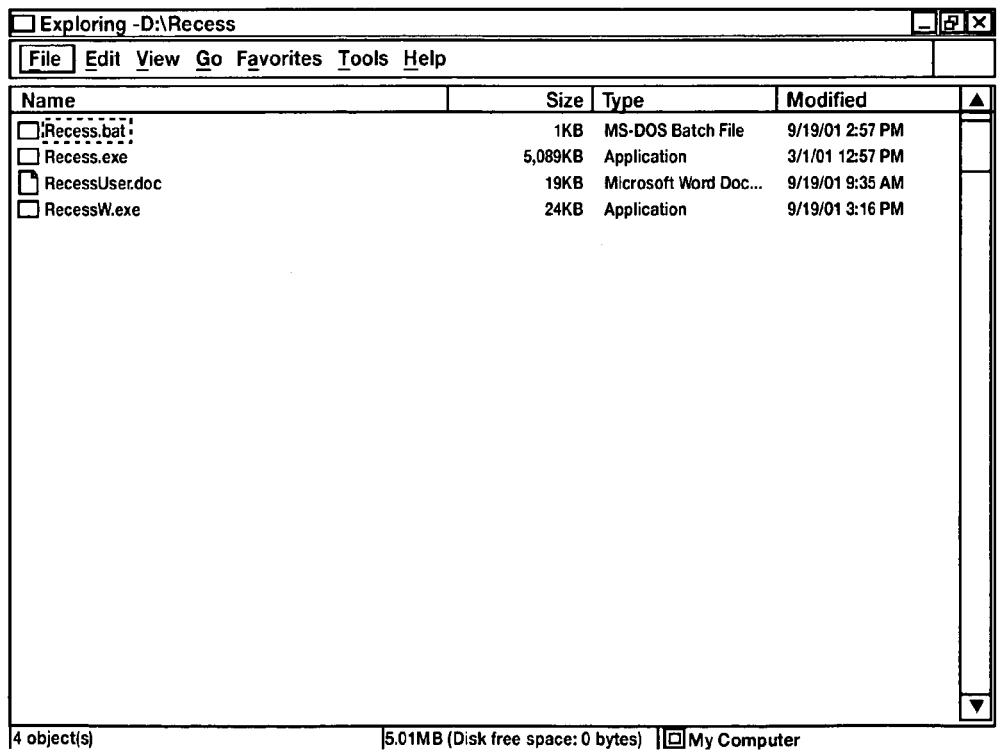

FIG. 5 depicts a preferred process 500 for solving a joint problem of a type that may be selected from a menu option using the GUI 400, namely, a structural analysis ballistics problem. Geometry data involving the interior of a missile is obtained using conventional computed tomography techniques for nondestructive evaluation (NDE) of the motor core. This data is provided in step 502 as a body for modeling situations of the type shown in FIG. 3, for example. Step 504 entails automated meshing and may be performed using any number of conventional automatic meshing programs. In step 506, a processor receives user-selected input data and executes program instructions for the first analysis program, which in this case happens to be a structural analysis program modeling time dependent nonlinear visco-elastic (NLVE) deformation of the rocket motor as the interior propellant burns. Structural integrity is checked in step 508 to assure that the motor has not exceeded design specifications or a failure point.

The NLVE output includes deformations, stresses and strains, which are provided as second program input values to a second program, which comprises a fracture analysis or fracture propagation program that is used in step 510. The output from the fracture analysis program includes deformation and fracture propagation with automated meshing of the propagation-deformed system. A bumback analysis is executed in step 512 including an approximation of the burning surface area that is modified or deformed through burning in the rocket motor core. The bumback analysis output includes a time-dependent surface area, and a new mesh may be generated over this area.

The new surface area and mesh is supplied to a computational fluid dynamics and/or ballistics program as program input data in step 514. Iteration continues along loop 516 until convergence is achieved and performance data is supplied in step 518. The computational fluid dynamics program that is used in step 514 may be configured to provide three-dimensional transient solution that has not been previously done in the art. For example, a special scripting language may be used to provide threshold convergence of the solution at small time steps with sequential performance data being provided in step 516 for each time step. Computations of this type may require several CPU weeks to complete, even where the processor is operating in the gigahertz range of clock speeds, and the manual intervention that would have been required to couple the programs for this type of solution was simply impossible using prior methods.

Other coupled CFD solutions include steady state flow for 1D, 2D and 3D systems in combination with elastic structural deformation or nonlinear visco-elastic structural deformation; quasi-steady state flow in combination with crack propagation; transient 1D, 2D and 3D flow in combination with elastic structural deformation or nonlinear visco-elastic structural deformation; and transient flow with crack propagation.

It should be noted that any one of the programs which is executed in loop 516 can be a first or second program of the type described herein. The order of execution of the first and second program can be any order because the first and second designation serves merely to distinguish one program from another and does not relate to any specific order of program execution unless otherwise specified. Thus, the computational fluid dynamics program may be executed fourth in order, and this order of execution is still consistent with describing the program as a first or second program. Additionally, even though the respective programs of steps 506–514 are different programs and are not simultaneously executed by a processor, although they may be simultaneously executed in a distributed processing or multitasking environment, these programs are said to jointly and in combination provide a solution to the joint problem of structural ballistics analysis because they cooperate in an iterative scheme for a joint solution and/or the programs share data with one another even if no repeat iteration is required.

Prior mention has been made of a scripting language. The scripting language permits advanced users or system experts to issue program commands that are comparable in analogy to function calls from an object-oriented programming language. A particularly preferred scripting language is Python, a copyrighted, but freely usable and distributable product, even available for commercial use from the Python Software Foundation at www.python.org.

The Python scripting language is often compared to other object-oriented programming languages including Tcl, Perl, Scheme or Java, which may provide object oriented substitutes for Python. According to a presently contemplated but merely illustrative embodiment of the invention, the executable code supporting the GUI 400 is written in Python scripting language by an expert in one or more of the finite element analytical programs. An "expert" is hereby defined as a person who has at least five hundred hours of training and program use in a particular finite analysis program, and this time of use is preferably more than one thousand hours.

An additional GUI element preferably makes available the scripting language to ordinary users who may alter copies of expert-preprogrammed code or write their own code. On networked systems, these user-defined scripting packages may be shared among all users, subject to an expert review and approval process. A Python module was created as an alternative scripted interface comparable to GUI 400, to support geometry creation, finite element models for solving joint problems, data file interfaces and data linkages between different finite analytical programs, and post processing activities. An example of Python code for a data file translation script between two finite analysis programs is:

import FEM model=doc.NewModel('PlaneE1')

model.RdIdeasMS('RWIdeas1.unv')

model.WrAbaqus('../Work/PlaneE1 inp')

A preprogrammed library of basic functions that duplicate the GUI functionality is provided for user-specified execution in the Python scripting language, which may issue calls to C++ language functions and other languages. The function library may be accessed directly to provide the user with the ability to perform automated calculations without having to interact with the GUI, however, the library is preferably accessed through use of a submenuing or execute option permitting a user to access and/or reprogram the library functions. Classes of functions include functions that create new documents, open existing documents, save documents, create curves, surfaces, volumes, create boundary conditions, interpolate, read and write files, translate data between applications, as well as any other activity that has been previously described as being practicable through the use of GUI 400. In part because the Python code is extensible to other languages, Python provides tremendous power and versatility including looping and decisional logic capabilities.

Applicant hereby incorporates-by-reference Appendix I (printouts from an interactive online user's manual for the FEM Builder), Appendix II (a compact disk in duplicate comprising a computer program listing appendix containing computer software according to a presently preferred system and method according to the invention), and Appendix III (a computer program listing appendix containing the file and directory names for the files and directories on the compact disk comprising Appendix II).

The foregoing discussion provides examples that are intended to operate by way of example, not by limitation. There may be additions or changes to the processes and programs described above that fall within the scope and spirit of the invention. For example, any processing system may be used to execute the program instructions including systems having distributed processing networks, distributed data storage, and multiple I/O devices, in addition to the system shown in FIG. 2. Accordingly, the inventors hereby state their intention to rely upon the Doctrine of Equivalents to protect their full rights in the invention.

We claim:

1. A method for performing coupled finite analyses to resolve a joint problem between finite analysis programs, the method comprising:
   providing first and second finite analysis programs, wherein one of the first and the second finite analysis programs is a computational fluid dynamics program;
   identifying the joint problem through use of a graphical user interface operable to identify the joint problem and to specify at least one criterion for a joint solution, wherein both the first and the second finite analysis programs can jointly and in combination solve the joint problem using the at least one criterion;
   providing first program input values to the first finite analysis program;
   executing the first finite analysis program to obtain first program output values including a first joint data set;
   providing the second finite analysis program with second program input values including the first joint data set;
   executing the second finite analysis program to provide second program output values including a second joint data set; and
   providing the first finite analysis program with the first program input values including the second joint data set.

2. The method according to claim 1, wherein the at least one criterion for the joint solution specified by the graphical user interface includes an iterative convergence criterion for a threshold convergence of the joint solution and the method further comprises repeating the acts of providing first program input values, executing the first finite analysis program, providing the second finite analysis program, executing the second finite analysis program, and providing the first finite analysis program, until the threshold convergence is achieved.

3. The method according to claim 2, wherein repeating the acts is performed automatically and without user intervention.

4. The method according to claim 1, wherein the act of providing the first and the second finite analysis program further comprises selecting another of the first and the second finite analysis programs from the group consisting of a structural analysis program, a heat transfer program, a chemical reaction program, a chemical equilibrium analysis program, an internal ballistics program, and a fracture mechanics program.

5. The method according to claim 1, further comprising:
   providing third program input values to a third finite analysis program, wherein the third program input values include data selected from the group consisting of the first joint data set, the second joint data set, and combinations thereof; and
   executing the third finite analysis program to provide third program output values including a third joint data set.

6. The method as set forth in claim 5, further comprising providing the third joint data set as input values to the first finite analysis program, the second finite analysis program, or combinations thereof.

7. The method according to claim 6, wherein the at least one criterion for the joint solution specified by the graphical user interface includes an iterative convergence criterion for a threshold convergence of the joint problem and the method further comprises repeating the acts of providing first program input values, executing the first finite analysis program, providing the second finite analysis program, executing the second finite analysis program, providing the first finite analysis program, providing third program input values, executing the third finite analysis program, and providing the third joint data set, until threshold convergence is achieved.

8. The method according to claim 1, wherein providing the second finite analysis program with second program input values is performed automatically and without user intervention.

9. The method according to claim 1, wherein providing the first finite analysis program with first program input values is performed automatically and without user intervention.

10. The method according to claim 1, wherein the graphical user interface includes an interface for selecting the joint problem as including an additional program and for creating a user-specified data link operable to provide the additional program with shared input values selected from the group consisting of the first program output values, the second program output values, and combinations thereof, and the method further comprises selecting the joint problem including the additional program through use of the interface.

11. The method according to claim 10, wherein the additional program acts upon the shared input values and creates shared output values selected from the group consisting of the first program input values, the second program input values, and combinations thereof, and the method includes providing the shared output values to the first and the second finite analysis programs as specified by the user.

12. The method as set forth in claim 1, wherein the computational fluid dynamics program comprises a crack-combustion program.

13. The method as set forth in claim 12, wherein the method further comprises a means for modeling crack combustion in a missile based upon a computed tomography taken from a missile.

14. The method as set forth in 13, wherein another of the first and the second finite analysis programs comprises a structural mechanics program.

15. The method according to claim 1, wherein the act of identifying the joint problem includes using the graphical user interface to select from a list of preprogrammed functions.

16. A system for obtaining a solution to a joint problem, the system comprising:
a storage medium configured for storing:
  first and second finite analysis programs, wherein one of the first and the second finite analysis programs is a computational fluid dynamics program; and
  a graphical user interface operable to identify the joint problem and to specify at least one criterion for a joint solution, wherein both the first and the second finite analysis programs can jointly and in combination solve the joint problem;
a processor operably coupled to the storage medium for executing:
  the first finite analysis program to obtain first program output values including a first joint data set;
  the second finite analysis program to obtain second program output values including a second joint data set; and
  the graphical user interface; and
an input device operably coupled to the processor and configured for providing first program input values and second program input values;
wherein the storage medium is further configured for providing the second finite analysis program with the second program input values including the first joint data set; and wherein the storage medium is further configured for providing the first finite analysis program with the first program input values including the second joint data set.

17. The system as set forth in claim 16, wherein the at least one criterion for the joint solution specified by the graphical user interface includes an iterative convergence criterion for a threshold convergence of the joint solution and the system comprises program instructions for repeating calculations until the threshold convergence is achieved.

18. The system as set forth in claim 17, wherein the program instructions for repeating calculations operates automatically until the threshold convergence is achieved.

19. The system as set forth in claim 16, wherein the graphical user interface comprises a menuing system for selecting the joint problem as a problem combining the computational fluid dynamics program with another of the first and the second finite analysis programs selected from the group consisting of a structural analysis program, a heat transfer program, a chemical reaction program, a chemical equilibrium analysis program, an internal ballistics program, and a fracture mechanics program.

20. The system as set forth in claim 16, wherein:
the processor is further configured for executing a third finite analysis program to obtain third program output values including a third joint data set;
the input device is further configured for providing third program input values; and
the storage medium is further configured for storing the third finite analysis program and providing the third finite analysis program with the third program input values including input values selected from the group consisting of the first joint data set, the second joint data set, and combinations thereof.

21. The system as set forth in claim 20, including a predetermined data linkage for providing the third joint data set as input values to the first finite analysis program, the second finite analysis program, or combinations thereof.

22. The system as set forth in claim 21, wherein the criterion for the joint solution specified by the graphical user interface includes an iterative convergence criterion for a threshold convergence of the joint problem and the system comprises program instructions for repeating calculations until the threshold convergence is achieved.

23. The system as set forth in claim 16, wherein the graphical user interface includes an interface for selecting the joint problem as one including an additional program and for creating a user-specified data link operable to provide the additional program with shared input values selected from the group consisting of the first program output values, the second program output values, and combinations thereof.

24. The system as set forth in claim 23, wherein the additional program acts upon the shared input values and creates shared output values selected from the group consisting of the first program input values, the second program input values, and combinations thereof, and
the system comprises a predetermined data linkage for providing the shared output values to the first and the second finite analysis programs as specified by the user.

25. The system as set forth in claim 16, wherein the computational fluid dynamics program comprises a crack combustion program.

26. The system as set forth in claim 25, wherein the system comprises means for modeling crack combustion through use of the crack combustion program in a missile based upon a computed tomography taken from the missile.

27. The system as set forth in claim 26, wherein another of the first and the second finite analysis programs is a structural mechanics program.

28. The system as set forth in claim 16, wherein the system comprises program instructions for identifying the joint problem by use of the graphical user interface to select from a list of preprogrammed functions.

29. The system as set forth in claim 28, comprising the preprogrammed functions being in an extensible object oriented scripting language possessing looping and decisional logic capabilities.

30. A computer readable form for use in an operating environment including an input device for providing user input, a storage medium for storing instructions, and a processor operably coupled to the storage medium, the computer readable form comprising the instructions for execution on the processor to perform a process comprising:
executing a graphical user interface operable to accept the user input, identify a joint problem, and to specify at least one criterion for a joint solution, wherein both a first and a second finite analysis program can jointly and in combination solve the joint problem and one of the first and the second finite analysis programs is a computational fluid dynamics program;
executing the first finite analysis program acting upon first program input values, which include at least some of the user input, to provide first program output values including a first joint data set;
executing the second finite analysis program acting upon second program input values, which include at least some of the user input and the first joint data set, to provide second program output values including a second joint data set; and providing the first finite analysis program with the first program input values including the second joint data set.

31. The computer readable form as set forth in claim 30, wherein the at least one criterion for the joint solution specified by the graphical user interface includes an iterative convergence criterion for a threshold convergence of the joint solution, and the computer readable form comprises instructions for repeating calculations until the threshold convergence is achieved.

32. The computer readable form as set forth in claim 30, wherein the graphical user interface comprises instructions for selecting the joint problem as one in which one of the first and the second finite analysis programs is the computational fluid dynamics programs and another of the first and the second finite analysis programs is selected from the group consisting of a structural analysis program, a heat transfer program, a chemical reaction program, a chemical equilibrium analysis program, an internal ballistics program, and a fracture mechanics program.

33. The computer readable form as set forth in claim 30, including instructions for executing a third finite analysis program acting upon third program input values, which include the first joint data set, the second joint data set, or combinations thereof, to provide third program output values including a third joint data set.

34. The computer readable form as set forth in claim 33, including instructions for providing the third joint data set as input values to the first finite analysis program, the second finite analysis program, or combination thereof.

35. The computer readable form as set forth in claim 34, wherein the at least one criterion for the joint solution specified by the graphical user interface includes an iterative convergence criterion for a threshold convergence of the joint problem and the computer readable form comprises instructions for iterating until the threshold convergence is achieved.

36. The computer readable form as set forth in claim 30, wherein the graphical user interface includes instructions for an interface for identifying the joint problem as one including an additional program and for creating a user-specified data link operable to provide the additional program with shared input values selected from the group consisting of the first program output values, the second program output values, and combinations thereof.

37. The computer readable form as set forth in claim 36, wherein:
the additional program includes instructions for acting upon the shared input values and creating shared output values, and
the computer readable form comprises instructions for providing the shared output values to the first finite analysis program, the second finite analysis program, or combinations thereof, as specified by the user.

38. The computer readable form as set forth in claim 30, wherein the computational fluid dynamics program is a crack combustion program, and the computer readable form comprises instructions for modeling crack combustion in a missile based upon a computed tomography taken from the missile through use of the crack combustion program.

39. The computer readable form as set forth in claim 30, wherein the instructions are operable for identifying the joint problem by use of the graphical user interface to select from a list of preprogrammed functions.

40. The computer readable form as set forth in 39, comprising the preprogrammed functions written in an extensible object oriented scripting language possessing looping and decisional logic capabilities.

41. A computer readable form for use in an operating environment including an input device for providing user input, a storage medium for storing instructions, and a processor operably coupled to the storage medium, the computer readable form comprising the instructions for execution on the processor to perform a process comprising:

executing a scripting language with a preprogrammed function library operable to identify a joint problem and to specify at least one criterion for a joint solution, wherein both a first and a second finite analysis program can jointly and in combination solve the joint problem and one of the first and the second finite analysis programs is a computational fluid dynamics program;

executing the first finite analysis program acting upon first program input values to provide first program output values including a first joint data set;

executing the second finite analysis program acting upon second program input values, which include the first joint data set, to provide second program output values including a second joint data set; and providing the first finite analysis program with the first program input values including the second joint data set.

42. The computer readable form as set forth in claim 41, wherein the at least one criterion for the joint solution specified by the scripting language includes an iterative convergence criterion for a threshold convergence of the joint solution, and the computer readable form comprises instructions for repeating calculations until the threshold convergence is achieved.

43. The computer readable form as set forth in claim 41, wherein the function library comprises instructions for selecting the joint problem as one in which one of the first and the second finite analysis programs is the computational fluid dynamics program and another of the first and the second finite analysis programs is selected from the group consisting of a structural analysis program, a heat transfer program, a chemical reaction program, a chemical equilibrium analysis program, an internal ballistics program, and a fracture mechanics program.

44. The computer readable form as set forth in claim 41, including instructions for executing a third finite analysis program acting upon third program input values, which include the first joint data set, the second joint data set, or combinations thereof, to provide third program output values including a third joint data set.

45. The computer readable form as set forth in claim 44, including instructions for providing the third joint data set as input values to the first finite analysis program, the second finite analysis program, or combinations thereof.

46. The computer readable form as set forth in claim 45, wherein the at least one criterion for the joint solution specified by the scripting language includes an iterative convergence criterion for a threshold convergence of the joint problem and the computer readable form comprises instructions for iterating until the threshold convergence is achieved.

* * * * *